United States Patent
Tsujimoto

(10) Patent No.: US 7,336,394 B2
(45) Date of Patent: Feb. 26, 2008

(54) DISCRIMINATING METHOD FOR RECORDING MEDIUM AND RECORDING APPARATUS

(75) Inventor: Takuya Tsujimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1001 days.

(21) Appl. No.: 10/614,047

(22) Filed: Jul. 8, 2003

(65) Prior Publication Data

US 2004/0008869 A1   Jan. 15, 2004

(30) Foreign Application Priority Data

Jul. 10, 2002   (JP) .............................. 2002-201468

(51) Int. Cl.
G06F 15/00 (2006.01)
G06K 15/00 (2006.01)
(52) U.S. Cl. ..................... 358/1.9; 358/1.1; 358/1.18
(58) Field of Classification Search .............. 358/1.1, 358/1.2, 1.9, 1.12, 1.13, 1.15, 1.18, 1.6; 347/105, 347/14, 101, 100, 5, 16, 19; 382/108, 100; 356/600
See application file for complete search history.

(56) References Cited

U.S. PATENT DOCUMENTS 5,109,236 A     4/1992  Watanabe et al. ........... 347/193
5,974,160 A *  10/1999  Shiratori et al. ............ 382/112
6,984,034 B2 *  1/2006  Tsujimoto .................... 347/105
2004/0008244 A1  1/2004  Tsujimoto .................... 347/105

FOREIGN PATENT DOCUMENTS

JP    02-138805    5/1990
JP    11-271037   10/1999

* cited by examiner

Primary Examiner—Dov Popovici
(74) Attorney, Agent, or Firm—Fitzpatrick, Cella, Harper & Scinto

(57) ABSTRACT

A method for discriminating the kind of a recording medium comprises generating image information composed by plural pixels corresponding to a specific area on the surface of a recording medium as image information indicating the surface condition of the recording medium, obtaining a first parameter regarding the surface roughness of the recording medium, from the image information, obtaining a second parameter regarding the surface configuration of the recording medium, and discriminating the kind of the recording medium in accordance with the first parameter and the second parameter. With the structure thus affanged, the method obtains the characteristics of the surface of the recording medium from an image on the surface of the recording medium, and discriminates the kind of recording medium reliably in high precision.

20 Claims, 33 Drawing Sheets

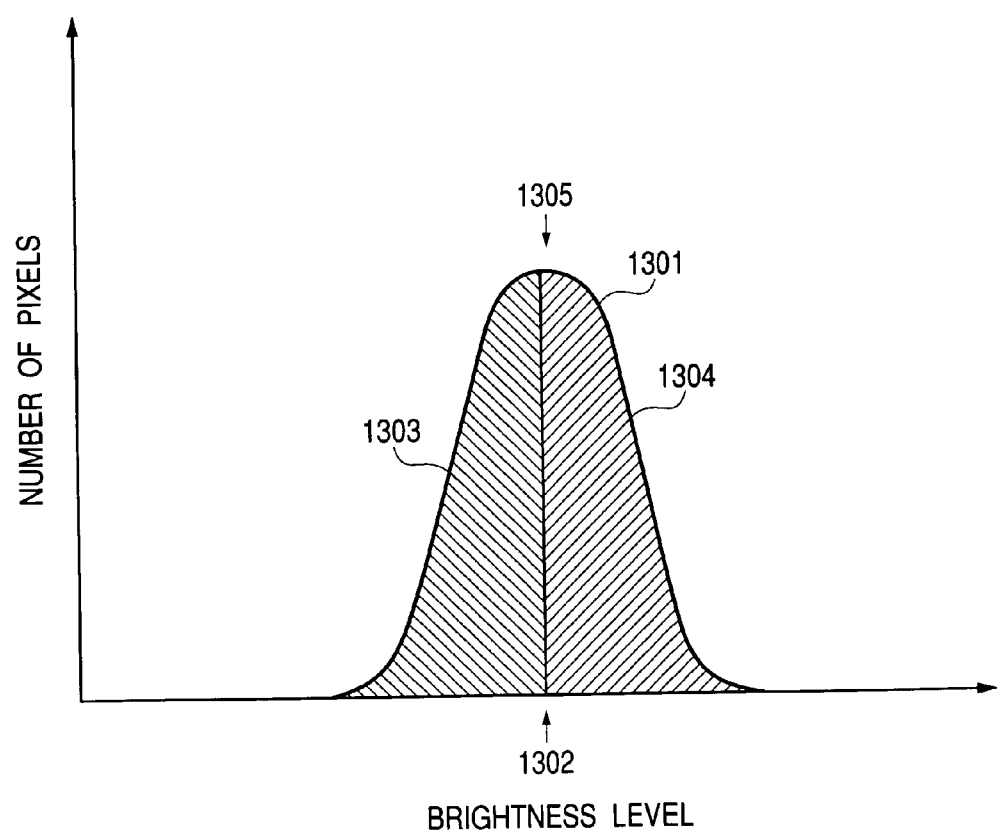

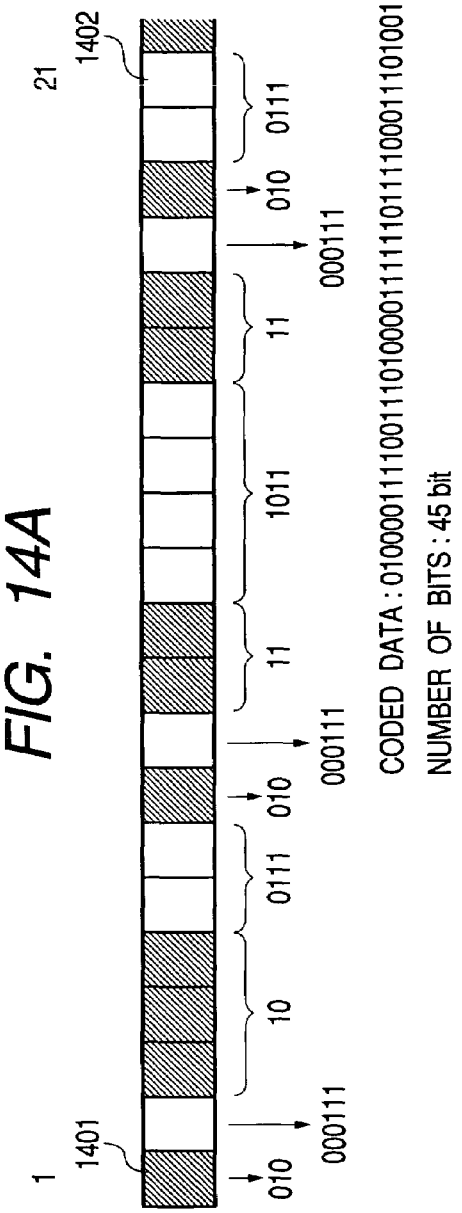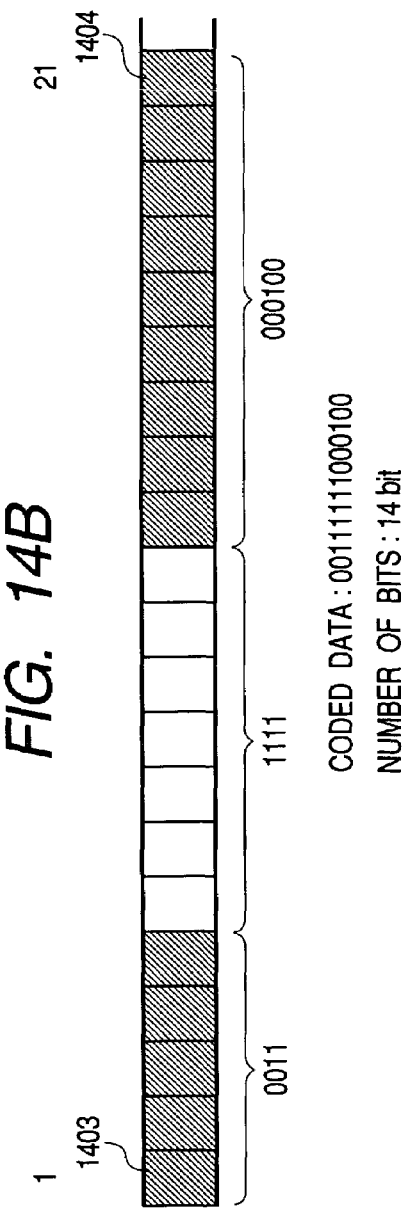

DISCRIMINATING METHOD FOR RECORDING MEDIUM AND RECORDING APPARATUS

BACKGROUND OF THE INVENTION

1. Field of the Invention

The present invention relates to a method for discriminating recording medium that discriminates the kind thereof, and a recording apparatus, which is provided with a function to discriminate the kind of recording medium. The invention also relates to a program that executes the discrimination of the kind of recording medium, and a storage that stores such program as well. More particularly, the invention relates to the technology of discriminating the kind of recording medium in accordance with image information obtainable form the surface of recording medium.

2. Related Background Art

Conventionally, as the output apparatus of a printing system that expels recording medium having images recorded thereon by the formation of color images with the adhesion of color toners or ink on the recording surface of such recording medium, there have been made available those of various methods, such as electro-photographic method, wire-dot method, and ink jet method, among some others.

Of the aforesaid methods, the ink jet method provides a mode, in which ink is directly discharged form a recording head to a recording medium, with such advantages that the number of processes required up to the formation of images on a recording medium is smaller; the running cost is economical; and the method is preferably suitable for color recording with a lesser amount of noises at the time of recording operation. With these advantages, this method is given particular attention in the wide range of application fields for office to home use. In recent years, the output apparatus having the ink jet method applied thereto has been widely adopted for a recording apparatus (a printer), facsimile equipment, a copying machine, and many others.

It is generally known that the recording apparatus that adopts the ink jet method is capable of using various kinds of recording medium adequately depending on the uses. As the kind of recording medium, there are a plain paper sheet, which is generally used irrespectively of recording methods; a coated paper sheet for ink jet use (including postcard size greeting cards or the like dedicated to ink jet use) treated with coating agent, such as silica, on the recording surface of the recording medium in order to suppress ink spread and obtain a better coloring effect; a glossy paper sheet and a glassy film, which are used for the formation of photograph or image like a photographic glossy print sheet having glossiness on the recording surface of the recording medium; an OHP film for use of transparent source document; a transfer paper sheet for transferring images to a T-shirt or other cloth by use of an iron after recording them on the recording medium; and a back printing film, which has the recording face on the backside of the recording medium, among some others. There are many kinds of various mediums, beginning with those regularly and often used by the users.

For the recording apparatus of the ink jet method, the recording conditions under which a good recording image is made obtainable are different by the kind of recording medium, because the permeability and fixation of ink are different depending on the coating agent applied to the surface of a recording medium. Consequently, before the initiation of recording on a recording medium, the user must select or set by input the kind of the recording medium to be used for recording so as to set a suitable recording mode for the kind of recording medium. Then, however, if the user should wrongly set the suitable recording mode for the kind of the recording medium to be used, the user may fail in obtaining the quality of recorded image as desired in some cases. In order to avoid the user's complicated operation and wrong setting, there have made studies for the development of an apparatus capable of automatically discriminating the kind of recording medium in order to select and set the optimal recording mode. The setting of a recording mode, which is preferably suitable for the kind of a recording medium to be used, is not only needed for the recording apparatus of the ink jet method, but also, needed for those of other methods.

Here, as one of the methods for discriminating the kind of recording medium, there is cited a method for measuring the light intensity with the reflection light from the surface of a recording medium by use of the optical sensor that adopts the photoelectric converting element with the irradiation of light from the light source structured as shown in FIG. 31. In FIG. 31, a reference numeral 3101 designates a light source that irradiates light on a recording medium 3103, the target recording medium, the kind of which should be discriminated, at an incident angle θ (any value). Also, a reference numeral 3102 designates a light-receiving element that receives the regularly reflected light, that is, the light reflected from the light irradiated from the light source 3101 at a reflecting angle θ equal to the incident angle θ, which measures the intensity of the regularly reflected light. The intensity of this regularly reflected light changes depending on the degree of glossiness of the surface, thus making it possible to know that of the target-recording medium. The arrangement position of the light source 3101 and light-receiving element 3102 is established so that the light-receiving element 3102 is able to receive the regularly reflected light reflected from the surface of the recording medium 3103 when irradiated by the light from the light source 3101. For the light-receiving element 3102, a photodiode, a phototransistor, or some other semiconductor device is used. In accordance with the conventional structure, it has been practiced to made discrimination of the kind of recording medium by means of comparison between the intensity of the regularly reflected light thus obtained, and the intensity of the regular refection light of the kind of the recording medium, which has been measured in anticipation of the use thereof.

Also, there is a disclosure in the specification of Japanese Patent Application Laid-Open No. 11-271037 as to the image formation method and image formation apparatus whereby to form a high-quality image without depending on the kind and the surface roughness of a recording medium to be used. In the specification of this application, it is disclosed that the intensity distribution of the reflection light from a recording medium is detected as the three-dimensional image information when light is irradiated to the recording medium from the light source, and subsequently, the surface roughness is detected by converting such information into the fractal that serves as the one-dimensional information, thus controlling the toner amount appropriately to match the surface roughness of the recording medium.

However, in the conventional technology that has been described above, problems are encountered as given below.

There is a tendency that the intensity of the regularly reflected light, that is, glossiness, presents the value proportional to the surface roughness for recording medium formed by the same material. Therefore, this can be used as parameters for discriminating the kind of recording medium.

However, most of the various kinds of recording medium use different materials, and there are some of them that actually indicate almost the same intensity of regularly reflected light even if the kind of recording medium are different. One of the examples therefor is the coated sheet for ink jet use. FIG. 32 shows such relations.

FIG. 32 is a view that shows the relations between each recording medium and the intensity of regularly reflected light. A reference numeral 3201 designates the intensity of regularly reflected light obtainable from a plain sheet. Likewise, a reference numeral 3202 designates that of a coated sheet for ink jet use; 3203, that of a glossy sheet; 3204, that of a glossy film; and 3205, that of an OHP film, respectively. As shown in FIG. 32, the intensities of the regularly reflected light obtainable form the plain sheet and the coated sheet for ink jet use are overlapped with each other within a range of 3206.

The coated sheet for ink jet use has higher smoothness than that of the plain sheet (the value of which becomes larger for the flatter and smoother surface of the recording medium). Therefore, the intensity of regularly reflected light becomes larger for the coated sheet for ink jet use than the plain sheet if the recording medium use the same material. However, silica or other agent coated on the surface of the coated sheet for ink jet use allows light dispersion to be increased. Then, the resultant value of the regularly reflected light becomes the same as or slightly smaller than that of the plain sheet.

As described above, it is not easy to discriminate the plain sheet from the coated sheet for ink jet use only in accordance with the values of regularly reflected light. Therefore, this presents a large problem for the recording apparatus of ink jet method, because there is a need for different recording condition, such as the amount of ink discharge, the number of passes, which is the scanning frequency of the recording head for recording image of one-line portion, and some others, under which the recording apparatus of ink jet method should operate. Particularly, with respect to these two kinds of recording medium, recording conditions differ from each other greatly, which makes it necessary to discriminate one kind of recording medium from the other exactly.

Also, for the recording apparatus of electro-photographic method, other than the recording apparatus of ink jet method, there is a fear that if the user should set the coated sheet for ink jet use, which is wrongly taken as the plain sheet, in a cassette for retaining recording the recording medium, the coated sheet may be wound around the fixing roller. Like this, it becomes necessary not only for the recording apparatus of ink jet method, but also, for those of other methods to discriminate exactly the various kinds of recording medium, which are on the market widely.

In order to solve the aforesaid problem, there has been proposed a structure shown in FIG. 33, in which a reflective optical sensor is used to measure not only the component of regularly reflected light, but also, to measure the diffused reflection light component. In FIG. 33, a reference numeral 3301 designates a light source that irradiates light on a recording medium 3303, the target recording medium, the kind of which should be discriminated, at an incident angle θ (any value). Also, a reference numeral 3302 designates a light-receiving element that receives the regularly reflected light, that is, the light reflected from the light irradiated from the light source 3301 at a reflecting angle θ equal to the incident angle θ, which measures the intensity of the regularly reflected light, that is, to measure the glossiness.

Further, a reference numeral 3303 designates a light receiving element that receives the diffused reflection light, which reflects at an angle different from the incident angle θ of the light irradiated from the light source 3301 (in FIG. 33, which is the light reflected at an angle perpendicular to the recording medium), and measures the intensity of the diffused reflection light. The intensity of this reflected light changes depending on the white degree of a recording medium. Therefore, this makes it possible to know the whiteness of the recording medium. The arrangement position of the light source 3301 and the light receiving element 3302 that receives the regularly reflected light, is set so that the regularly reflected light irradiated from the light source 3301, which reflects from the recording surface of a recording medium 3304, can be received by the light receiving element 3302. Likewise, the arrangement position of the light source 3301 and the light receiving element 3303 that receives the diffused reflection light, is set so that the diffused reflection light irradiated from the light source 3301, which reflects from the recording surface of the recording medium 3304, can be received by the light receiving element 3303. Here, the discrimination is made for the kind of recording medium by comparison between the intensities of the two reflection lights obtained by the structure thus arranged, and the intensity of reflected light of the kind of a recording medium anticipated to be used, which is measured in advance.

In this case, the discrimination between the plain sheet and the coated sheet for ink jet use is made mainly in accordance with the difference in the intensities of diffused reflection lights, that is, the difference in whiteness thereof. FIG. 34 shows such relations. FIG. 34 is a view that shows the relations between each recording medium and the regularly reflected light, and the diffused reflection light as well. A reference numeral 3401 designates the distribution area of the plain sheet with respect to the intensity of the regularly reflected and that of the diffused reflection light. Likewise, a reference numeral 3402 designates the distribution area of the coated sheet for ink jet use; 3403, that of the glossy sheet; 3404, that of the glossy film; and 3405, that of the OHP film, respectively. The whiteness of the coated sheet for ink jet use is higher than that of the plain sheet. Therefore, it is known that the overlapping area thereof is made smaller than that of the plain sheet and the coated sheet for ink jet use, which are measured by use of only the regularly reflected light shown in FIG. 32. Nevertheless, as shown in FIG. 34, the distribution areas of the plain sheet and coated sheet for ink jet use may be overlapped even by the application of the intensities of the diffused reflection lights for both of them, which makes it difficult to make the discrimination of the kind exactly.

Now, hereunder, the description will be made of the problems with respect to the structure that uses the reflective sensor, including the aforesaid reasons.

1. Conventionally, the coating of calcium carbonate to the surface of a recording medium has not been preferred due to the problem that the fixing roller of a copying machine is worn off by the coating thereof. However, along with the durability of the fixing roller, which has been made higher, this coating is now widely used. The coating of calcium carbonate is effective in enhancing the whiteness of a recording medium, while it becomes more difficult to discriminate the plain sheet having higher whiteness with the coating of calcium carbonate from the coated sheet for ink jet use.

2. In order to suppress the influences resulting from the variations of light sources, it is generally practiced to use a structure that adopts the comparison between the values of the intensities of regularly reflected light and diffused reflection light as the parameters for making the discrimination of the kind of recording medium. However, for the recording medium the kind of which are different, there exist some of them that indicate the same value when the comparison is taken, although the absolute values of the respective intensities of the regularly reflected light and diffused reflection light are different, which makes it difficult to make the discrimination of the kind of recording medium. Also, when the absolute values of the intensities of the regularly reflected light and diffused reflection light are used for parameters to discriminate the kind of the recording medium, not the comparative values between them, there is a need for highly precise correction, which should unavoidably lead to the increased costs of a recording apparatus. Further, it is necessary to consider such correction not only at the time of delivery of the apparatus, but also, consider it in terms of aging deterioration thereof. This makes it difficult to make the discrimination of the kind of recording medium always in good precision.

3. Even with such highly precise correction as described above, the measured values of the plain sheet and coated sheet for ink jet use tend to vary greatly depending on the location where the measurement is given. Therefore, measurements are needed for plural locations. In other words, the movement of the sensor used for measuring the reflected light or the movement of a target-recording medium becomes prerequisite for the measurement of an exact value, which necessitate the provision of a mechanical structure. Also, it takes a time for the sensor that measures the reflected light or it takes a time for effectuating measurements at plural locations along with the movement of a recording medium. As a result, the user is forced to endure a waiting time.

SUMMARY OF THE INVENTION

The present invention is designed to solve the problems discussed above. It is an object of the invention to discriminate the kind of generally used recording medium in high precision with a comparatively simple structure. Also, the present invention aims at providing a method for discriminating recording medium capable of discriminating in high precision the recording medium having different purposes of use, such as recording high quality images, recording materials to be issued publicly, and also, having large difference in recording conditions depending on the kind thereof, such as a plain sheet, a coated sheet for ink jet use, and an OHP film. The invention is also aimed at providing a recording apparatus having the discriminating function for the discrimination of the kind of recording medium, the program for implementing the discrimination of the kind of recording medium, as well as the storage medium that stores such program.

The method of the present invention for discriminating recording medium for discriminating the kind thereof, comprises the steps of: generating image information containing information corresponding to each of plural pixels included in a specific area on the surface of a recording medium as image information indicating the surface condition of the recording medium; for obtaining a first parameter regarding the surface roughness of the recording medium from the image information; obtaining a second parameter regarding the surface configuration of the recording medium from the image information; and discriminating the kind of the recording medium on the basis of the first parameter and the second parameter.

Also, the method of the invention for discriminating recording medium for discriminating the kind thereof comprises the steps of: generating image information composed by plural pixels corresponding to a specific area on the surface of a recording medium, and containing the brightness information corresponding to each of the plural pixels as image information indicating the surface condition of said recording medium; obtaining a first parameter by statistical process in accordance with the brightness information; obtaining a second parameter regarding changes in the brightness information along the arrangement of the plural continuous pixels; and discriminating the kind of the recording medium on the basis of the first parameter and the second parameter.

Also, the method of the invention for discriminating recording medium for discriminating the kind thereof comprises the steps of: generating the image information composed by plural pixels corresponding to a specific area on the surface of a recording medium as image information indicating the surface condition of said recording medium; obtaining as a parameter the number of pixels at peak brightness in the histogram prepared by the plural pixels; and discriminating the kind of recording medium on the basis of the parameter.

Also, the present invention is a program that executes a computer to process the discrimination of the kind of recording medium, which is formed by the programming codes comprising the processes of: generating image information composed by plural pixels corresponding to a specific area on the surface of a recording medium, and containing the brightness information of each of the plural pixels as image information indicating the surface condition of the recording medium; obtaining a first parameter by statistical process in accordance with the brightness information; obtaining a second parameter related to the changes in the brightness information along the arrangement of the plural continuous pixels; and discriminating process for discriminating the kind of the recording medium on the basis of the first parameter and the second parameter.

Also, the present invention is a storage medium readable by a computer, which stores the program for discriminating the kind of recording medium having the image information-generation module that generates the image information composed by plural pixels corresponding to a specific area on the surface of a recording medium, and containing the brightness information of each of the plural pixels as image information indicating the surface condition of the recording medium; a module for obtaining a first parameter by statistical process in accordance with the brightness information; a module for obtaining a second parameter related to the changes in the brightness information along the arrangement of the plural continuous pixels; and discrimination module for discriminating the kind of the recording medium on the basis of the first parameter and the second parameter.

Further, the recording apparatus of the present invention, which records on a recording medium conveyed by conveying means in accordance with recording data, comprises image information-generating means for generating image information composed by plural pixels corresponding to a specific area on the surface of the recording medium, and containing the brightness information of each of the plural pixels as the image information indicating the surface condition of the recording medium conveyed by the conveying means; and discriminating means for discriminating the kind of the recording medium in accordance with a first parameter obtainable by statistical process on the basis of the brightness information, and a second parameter obtainable with respect to the changes in the brightness information along the arrangement of the plural continuous pixels.

In accordance with the present invention, it is possible to produce the following effects:

The characteristics needed for discriminating the kind of recording medium are acquired from the image information on any small area on the surface of a target-recording medium, and the kind of recording medium is discriminated on the basis of the result of such acquisition. Thus, as compared with the conventional method for discriminating recording medium by the utilization of reflection type optical sensor, it becomes possible to discriminate the kind of recording medium in higher precision. Particularly, the precision of discrimination can be enhanced for a plain sheet, a coated sheet for ink jet use, and an OHP film in particular. As a result, it is made possible to provide the environment under which various kinds of recording conditions can be selected and set optimally without forcing the user to carry out any complicated operation.

Also, the structure is arranged to use an image sensor, which makes it possible to confine the measuring location to one point when generating the image information of the surface of recording medium. As a result, it becomes unnecessary to move the recording medium or the sensor. Any mechanical structure for the movement thereof no longer needed as a matter of course.

BRIEF DESCRIPTION OF THE DRAWINGS

FIG. 13 is a histogram that shows the relations between the pixel numbers and brightness with respect to an image in accordance with the second embodiment.

FIGS. 14A and 14B are views that illustrate the run-length coding and bit numbers in accordance with the second embodiment.

DETAILED DESCRIPTION OF THE PREFERRED EMBODIMENTS

First Embodiment

Hereunder, with reference to the accompanying drawings, the detailed description will be made of a first embodiment that materializes the present invention.

Figure 1:
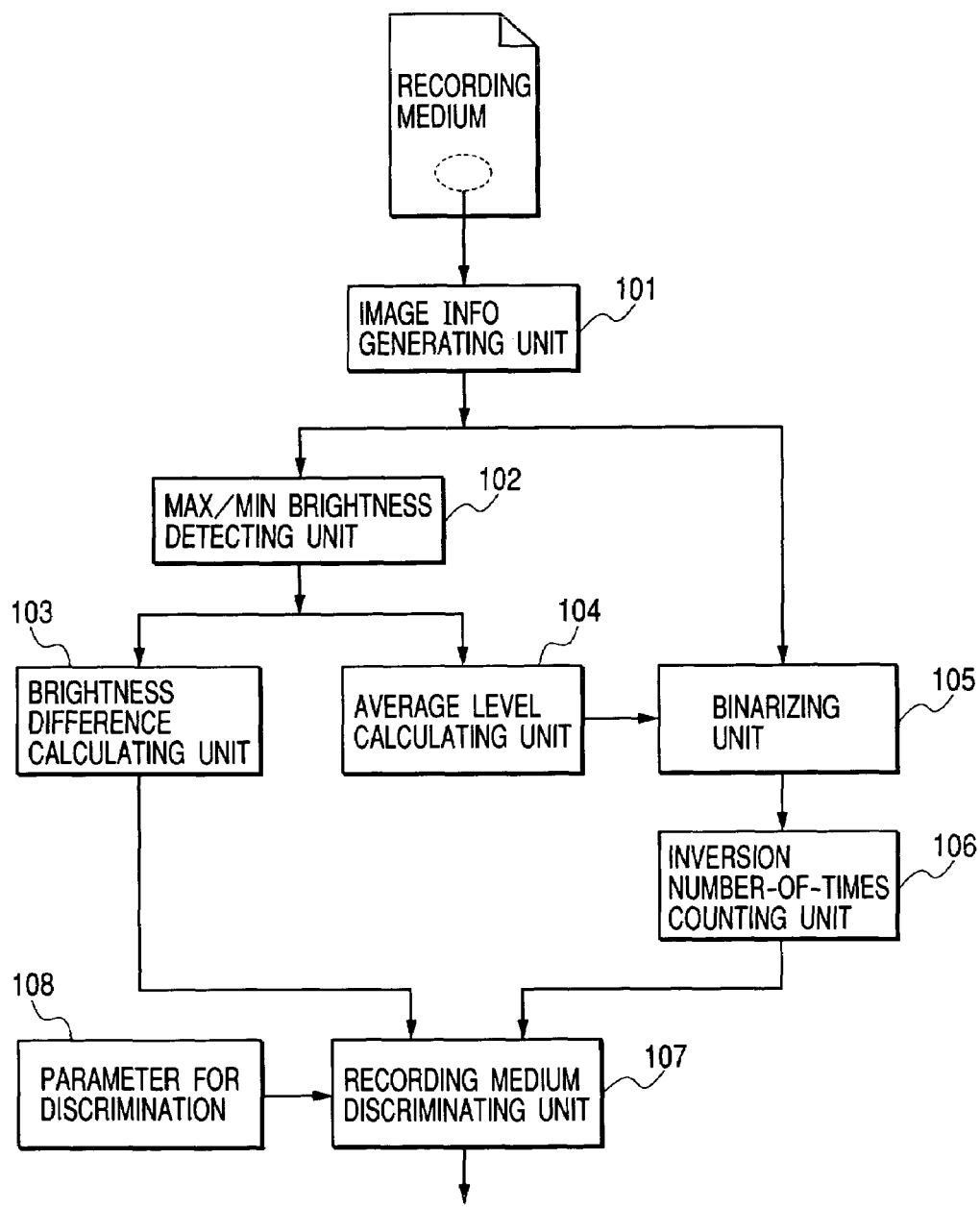
FIG. 1 is a functional block diagram that shows the method for discriminating medium in accordance with a first embodiment of the present invention.

FIG. 1 is a functional block diagram that shows a method for discriminating recording medium in accordance with the first embodiment.

In FIG. 1, a reference numeral 101 designates an image information-generating unit that generates image information from any (or arbitrary) fine area on the surface of a recording medium. The image, which is generated in this image information-generating unit, is formed by plural pixels having the brightness value larger than the binary. Here, it is assumed that such image is the aggregation of pixels having 8-bit brightness information. At this time, it is not needed to give heed to whether each pixel has color information of RGB or not. For the present embodiment, the image information is generated by the component of diffused reflection light, and each pixel that forms the image is assumed to provide brightness information but not any color information. Also, any fine area of the image may be able to provide one-dimensional or two-dimensional image without any problem. Only the specific area among the images obtained at the outset is used for the discrimination of the recording medium. Therefore, it may be possible to re-form a new image. The detailed contents of the image generation in the image-information generating unit 101 will be described later in conjunction with FIG. 2.

A reference numeral 102 designates a maximum/minimum value-detecting unit (or max/min brightness detecting unit) that detects the maximum brightness and minimum brightness in accordance with the image information formed by plural pixels with reference to the brightness of each pixel. The pixel of the detection target is each of pixels that form the aforesaid fine area of an image to be used for the discrimination of a recording medium.

A reference numeral 103 designates a brightness difference calculating unit that works out the brightness difference between the maximum brightness and the minimum brightness obtained from the maximum/minimum value-detecting unit 102; 104, an average level calculating unit that works out the arithmetic mean value (the arithmetic mean value of the maximum and minimum values; hereinafter, unless otherwise stated, the arithmetic mean value of these two values is called "average level") of the maximum brightness and the minimum brightness obtained from the maximum/minimum value-detecting unit 102.

A reference numeral 105 designates a binarizing unit that binarizes the image information obtained from the image information-generating unit 101 with the average level obtaining from the average level calculating unit 104 as the threshold value; 106, a number of inversions-counting unit (or inversion number-of-times counting unit) that works out the number of inversions of 0 and 1 serving as the value of each pixel on the basis of the binary image (also referred to as binary data) obtained from the binarizing unit 105. The detailed contents of the counting of the inversions will be described later in conjunction with FIG. 5.

A reference numeral 107 designates a recording medium discriminating unit that discriminates the kind of recording medium. The kind of recording medium are discriminated by means of the brightness difference obtained from the brightness difference calculating unit 103, and the number of inversions obtained from the number of inversions-counting unit 106. The discrimination of the kind of recording medium is made using discriminating parameters 108, which is obtainable from the discriminating map that shows in advance the relations between various kinds of recording medium, the brightness differences, and the inversion frequencies. The detailed contents of the method for discriminating recording medium will be described later, too; 108, the discriminating parameter used by the recording medium discriminating unit 107 when it makes the discrimination of recording medium, which is the threshold value determined on the basis of the distribution that each kind of recording medium may be able to secure.

As described above, the brightness difference and the number of inversions are worked out in accordance with the image information obtainable from any fine area on the surface of a recording medium, and the structure and flow are arranged for discriminating the kind of recording medium on the basis thereof.

Figure 2:
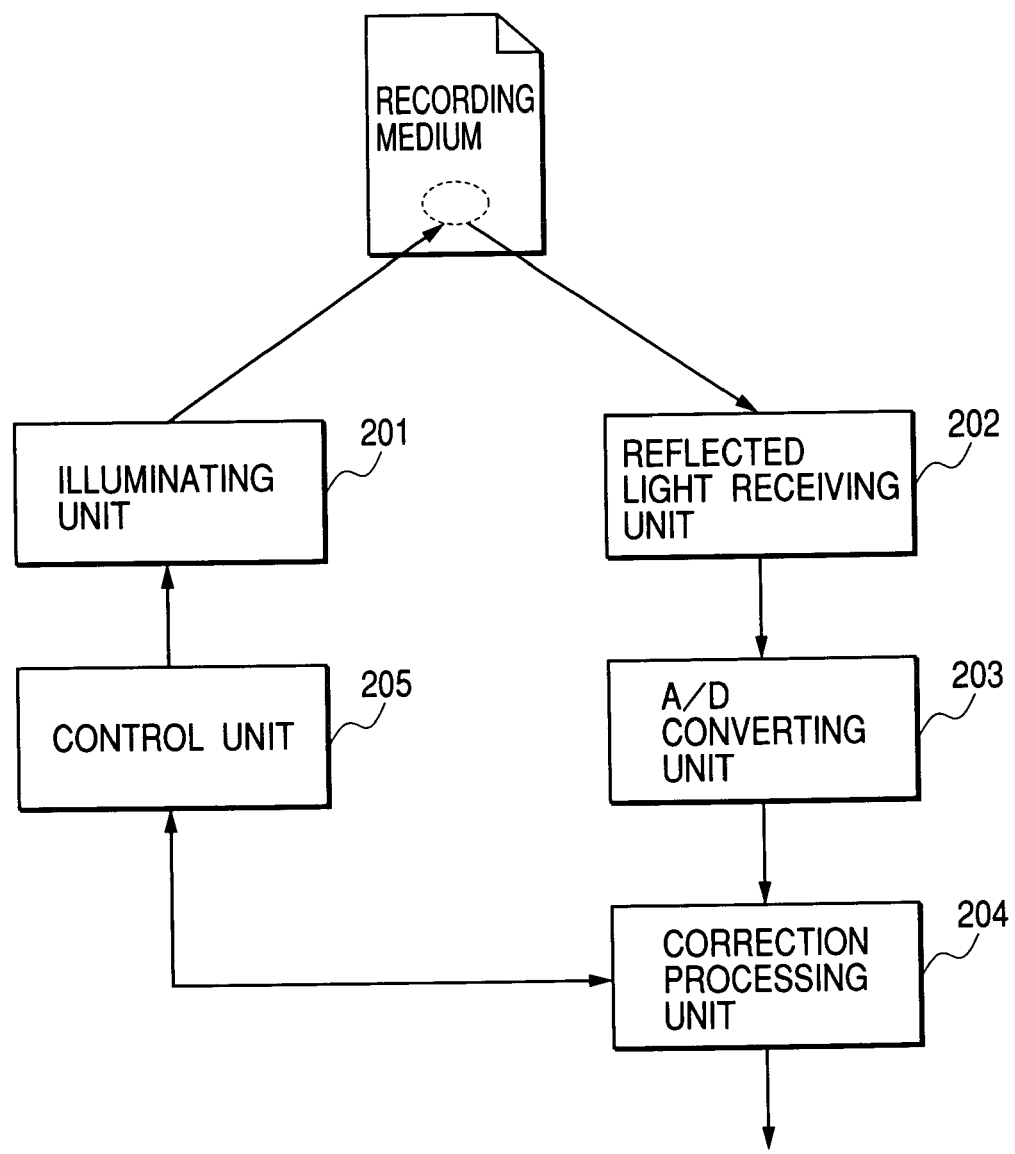
FIG. 2 is a functional block diagram that shows the image-information generating unit in accordance with the first embodiment.

FIG. 2 is a functional block diagram that shows the image information-generating unit 101 represented in FIG. 1.

A reference numeral 201 designates an irradiating (or illuminating) unit that irradiates light to the surface of a recording medium. More specifically, this unit is formed by a light source, such as LED, and a lens for use of illumination; 202, a light receiving unit that receives reflected light from the surface of a recording medium. The light receiving unit 202 is formed by an image sensor, an area sensor or a line sensor, such as CCD or CMOS, for example, and these sensors are formed by plural light receiving elements.

A reference numeral 203 designates a digital signal converting unit (or A/D converting unit) formed by the A/D converter in order to convert analogue signals form the light receiving unit 202, which is an aggregation of light receiving elements, into digital signals per pixel; 204, a correction processing unit that makes correction for signals from the digital signal converting unit 203. As the contents of correction, there are the shading correction of the light source, the correction for suppressing the variations between the pixels, and also, a process to convert the bit length of the digital signal output from the digital signal converting unit 203 into a smaller value or the like.

A reference numeral 205 designates a control unit, which is formed by a CPU and logic circuitry, to execute various controls for the image information-generating unit, such as the irradiating unit 201 and the correction processing unit 204, and others. The control unit 205 controls the irradiating unit 201 at first so as to irradiate light to the surface of a recording medium, and then, controls to output a measured value by enabling the light receiving unit 202 to receive the reflected light from the surface of the recording medium. Next, this unit controls so that the measured value, which is the analogue signal of reflected light of each pixel received by the light receiving unit 202, is converted into the digital signal by use of the digital signal converting unit 203. Further, the control is made to enable various correction processes to be made by the correction processing unit 204 for the digital signal thus converted. Thereafter, process is executed using the image information formed by each of the brightness information of the plural pixels output from the correction processing unit 204. At this juncture, it may be possible to add a process whereby to limit by use of the light receiving unit 202 the target image area for processing out of the areas for which the image information can be generated.

Figure 3:
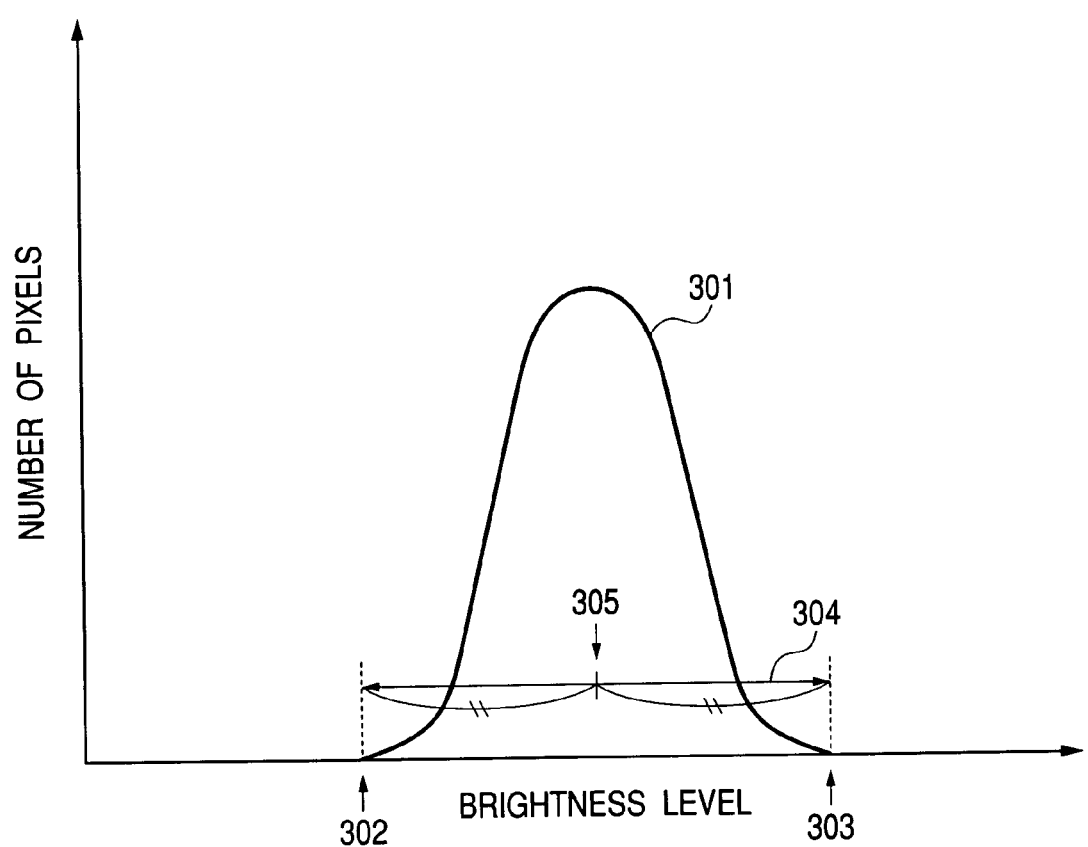
FIG. 3 is a histogram that shows the relations between the pixel numbers and brightness with respect to images in accordance with the first embodiment.

FIG. 3 is a histogram that shows the relations between the pixel numbers and brightness levels for an image. The axis of abscissa indicates brightness level, and the axis of ordinate indicates the pixel numbers having the brightness level thus indicated.

A reference numeral 301 designates a histogram of each of the pixels that form the image information. The object is the brightness thereof. If the target is an image, which is formed by pixels the number of which is greater than a certain value, such regular distribution as shown in FIG. 3 is indicated ideally; 302, the minimum brightness value among each of the pixels that form the image information; 303, the maximum brightness value among each of the pixels that form the image information; 304, a difference between the minimum and maximum values of the brightness among the pixels that form the image information; 305, a value obtainable by dividing the brightness difference 304 equally, that is, the average level of the maximum brightness and the minimum brightness. In accordance with the present embodiment, this average level is used as the threshold value when the average level is binarized. Hereinafter, it is assumed in the present invention that a value at 304 indicates the brightness difference, and a value at 305 indicates the average level (that is, the arithmetic mean value).

Figure 4A:
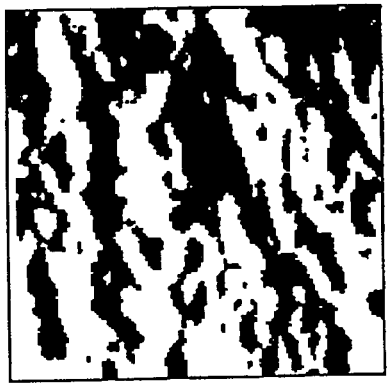
FIGS. 4A and 4B are views that illustrate the surface conditions of recording medium, and image examples after binarization process in accordance with the first embodiment.
Figure 4B:

FIGS. 4A and 4B are views that provide the image examples before and after the binarizing process to be executed by the binarizing unit 105 shown in FIG. 1.

FIG. 4A shows the photograph before the execution of the binarizing process, in which image information is generated with a plain sheet as an object. In this respect, the image on the surface of the recording medium obtained by the image information-generating unit 101 is formed by multi-valued brightness information. Also, in an actual case, the contrast is not as clear as the one shown in FIG. 4,A. Thus, for this example, the contrast is adjusted to make it readily recognizable. FIG. 4B shows the image, which is obtained by giving binarizing process to the image shown in FIG. 4A with the average level 305 obtained in the average level calculating unit 104. In this way, the image becomes the one having the aggregation of pixels provided with binary information of white or black (1 or 0 as data) after the execution of the binarizing process.

Figure 5:
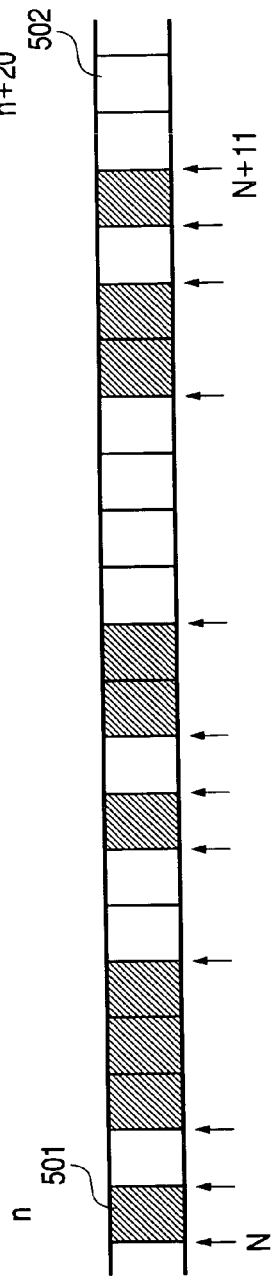
FIG. 5 is a view that illustrates the number of inversions of 0 and 1, each of pixel values, after binarization process in accordance with the first embodiment.

FIG. 5 is a view that illustrates the number of inversions of the values 0 and 1 in the number of inversions-counting unit 106 shown in FIG. 1, said values corresponding to the values of each pixel after the execution of the binarizing process. The image in the one-dimensional linear form as shown in FIG. 5 is the target image, and after the execution of binarizing process, this image is formed by the rows of white pixels and black pixels. The white pixel and the black pixel are actually those having the value of 0 or 1, respectively. In accordance with the present embodiment, it is exemplified that the value of the black pixel is 0, and that of the white pixel is 1, but it may be possible to change the provision of the values for the white and black pixels without any problem, that is, the white pixel may be given 0 and the black pixel, 1.

A reference numeral 501 designates certain pixels in any position of an image after the execution of binarizing process, which is black pixel having the 0 value. The adjacent pixel on the right side of the pixel 501 is white one.

Further, as shown in FIG. 5, pixels continue like black, black, black, white, white, . . . in that order. Also, a reference numeral 502 designates the 20th pixel from the pixel 501 in any position, and this one is the white pixel having the value of 1.

The inversion of the white and black pixels (or the values 0 and 1) after the execution of binarizing process takes place at the locations indicated by arrows, which means that there are changes from the black pixel to the white pixel (0 to 1) or the white pixel to the black pixel (1 to 0). Given the number of inversions up to the pixel 501 as N times, the image inversion between the pixels 501 to 502 occurs 11 times. Therefore, the number of inversions at the pixel 502 is N+11 times.

In accordance with the present invention, two kinds of characteristics on the surface of a recording medium are acquired as parameters, and on the basis of such parameters, the kind of recording medium are discriminated. With the brightness difference, which is made obtainable by means of the aforesaid statistical process, it becomes possible to obtain the characteristics regarding the magnitude of irregularities (or unevenness) on the surface of a recording medium. Also, in accordance with the number of inversions that corresponds to the changes of brightness information along with the arrangement of continuous pixels, it is possible to obtain the cycle of irregularities on the surface of a recording medium. Now, given the magnitude of irregularities of the surface of the recording medium as the surface roughness, and the cycle of irregularities of the surface thereof as the characteristics of the surface configuration, the structure is formed to discriminate the kind of recording medium on the basis of these two points of characteristics, the description of which will be given below.

Figure 6:
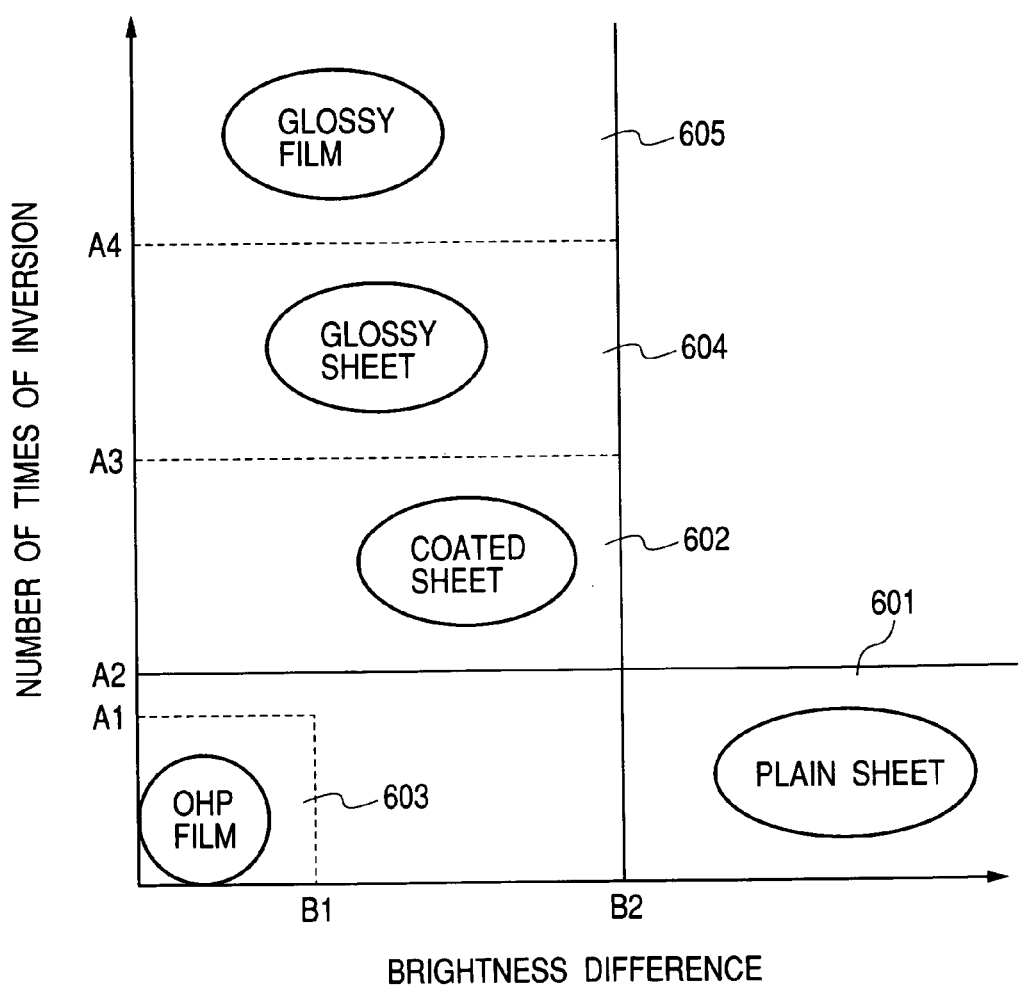
FIG. 6 is a discriminating map that shows the relations between each recording medium, number of inversions, and brightness difference in accordance with the first embodiment.

FIG. 6 is a discriminating map that shows the relations between each recording medium, the number of inversions, and the brightness difference. The values indicated at reference marks A1 to A4, and B1 and B2 shown in FIG. 6 are the discriminating parameters 108 shown in FIG. 1. In FIG. 6, each elliptical area indicates the aggregate of resultant points of measurement, and then, on the basis thereof, the discriminating areas are divided as shown in FIG. 6.

A reference numeral 601 designates an area, which should be discriminated as that of a plain sheet; 602, an area, which should be discriminated as that of a coated sheet for ink jet use; 603, an area, which should be discriminated as that of an OHP film; 604, an area, which should be discriminated as that of a glossy sheet; and 605, an area, which should be discriminated as that of a glossy film.

An area above the plain sheet-discriminated area 601 is not given any allocation for the discrimination of any specific recording medium. This area may be allocated to an area for discriminated a plain sheet by the utilization of the discrimination reference provided for the case where the brightness difference is larger than that of the B2. Also, by the utilization of the discrimination by means of the number of inversions, this area may be allocated to an area for discriminating a glossy film if the value thereof is larger than that of the A4 or for discriminating a glossy sheet if the value thereof is larger than the A3 and less than the A4. Likewise, the area above the discriminating area for the OHP film may be used for plain sheet, OHP film or coated sheet for ink jet use. In this way, there is a need for the area elliptically encircled to be used for the discrimination of the corresponding recording medium. However, as described above, it is possible to determine each area for the corresponding use flexibly.

Now, the brief description will be made of the characteristics of the five kinds of recording medium currently targeted for the discrimination thereof, and also, of the tendency in which relations are made between each recording medium and the two parameters, that is, the brightness difference and the number of inversions.

At first, with the surface shape-measuring device of non-contact method that utilizes interference of light, the surface roughness of each recording medium is measured, respectively. The results thereof are shown in the Table 1.

TABLE 1

|  | Plain sheet | Coated sheet | Glossy sheet | Glossy film | OHP film |
|---|---|---|---|---|---|
| Average roughness Ra [μm] | 2.75 to 3.20 | 1.19 | 0.21 | 0.05 | 0.15 |
| Maximum roughness Rmax [μm] | 28.9 to 33.5 | 21.9 | 16.0 | 0.83 | 10.9 |

The plain sheet is a general recording medium used also for a copying machine, and textures of pulp that forms the sheet can be seen on the surface thereof. As shown in Table 1, the irregularity (or unevenness) of this sheet is larger than that of other recording medium, and there is a tendency that such irregularity appears as the darker and lighter brightness on the image information generated therefor. In other words, the surface roughness is considered to be large. Also, changes in the undulations of such irregularity are moderate as compared with those other recording medium. In other words, the cycle of irregularities is great, and the undulations are large, that is, the difference between darkness and lightness is more conspicuous. This is interrelated with the fact that the brightness difference is great. Further, the moderate changes in the undulations are interrelated with the smaller number of inversions when the image is binarized. This tendency is also indicated on the discriminating map shown in FIG. 6, too.

The coated sheet for ink jet use is the recording medium prepared by coating silica or other pigment on the surface of plain sheet. Although depending on the amount of coated pigment, this sheet has smaller irregularity than the plain sheet, because coating is generally given in the configuration so that the irregularity resulting from the textures of pulp is buried to make the undulations smaller than those of the plain sheet. The surface roughness is small, and the cycle of undulations is also made smaller. In other words, as compared with the plain sheet, the brightness difference is small, and the number of inversions tends to be greater.

The gloss sheet is the recording medium prepared by giving multiple layers to be coated on the surface of paper sheet. On the surface layer of the recording medium that serves as the ink-receiving layer, alumina pigment or PVA swelling resin is used. As compared with the plain sheet and the coated sheet for ink jet use, this sheet has small undulations, and smoothness is high. Glossiness is high. Also, the cycle of undulations becomes smaller than those of the plain sheet and coated sheet for ink jet use. As a result, the brightness difference is small, and the number of inversions tends to be greater.

The glossy film is the recording medium prepared by coating ink-receiving layer on the surface of white PET or other film serving as the base thereof. The smoothness thereof is higher than that of the glossy sheet. As a result, the brightness difference is slightly smaller than that of the glossy sheet. The number of inversions tends to be greater slightly.

The OHP film is the recording medium prepared by coating ink-receiving layer on the surface of a transparent film serving as the base thereof. Particularly, for the present invention, the one, which has fine silica powder added to prevent sticking, is used as target medium of measurement. Therefore, although the surface roughness of OHP film should fundamentally be smaller than that of the glossy film due to the higher smoothness of the OHP film, the result of measurement here is such that the surface roughness of the OHP film is greater due to the influence brought about by the additive silica serving as roughing particles. Also, most of the light irradiated from the light source is not allowed to reflect on the surface of this recording medium, but to transmit it. Consequently, the brightness indicates an extremely small value. There is almost no brightness difference, either. Likewise, the number of inversions becomes smaller, because almost no change is indicated for the brightness.

The relations between each kind of recording Medium, the brightness differences, and the number of inversions, which have been described above, are summarized and shown in Table 2 given below.

TABLE 2

|  | Plain sheet (a) | Coated sheet (b) | Glossy sheet (c) | Glossy film (d) | OHP film (e) |
|---|---|---|---|---|---|
| Brightness difference | Large | Medium | Medium | Small | Very small |
| Number of inversions | Small | Medium | Large | Larger than (c) | Almost none |

As described above, each recording medium has the surface roughness that indicates the magnitude of undulations on the surface of the recording medium, and the characteristics of the surface configuration that indicates the cycle of undulations on the surface of the recording medium and the surface roughness as well. In accordance with the present embodiment, it is arranged to reflect these characteristics as the two parameters, that is, the brightness difference and the number of inversions, and use them for the intended discrimination. Then, it is made possible to enhance the precision of discrimination reliably by the utilization of the brightness difference or the number of inversion or both of them, particularly for the discrimination between the plain sheet and the coated sheet for ink jet use, which has been difficult to make in the case where only the intensity of reflected light, that is, only glossiness, is used as the parameter for the purpose.

The present invention is designed to grasp the characteristics of the target recording medium in advance, and discriminate it by comparison with the parameters interrelated with such characteristics. It is also important for the present invention to be designed so as to enable the surface roughness and the surface configuration to be constituents used for the intended discrimination.

Also, the enhancement of the precision thereof is largely influenced by the size of the area to be referenced, and the number of pixels that forms the target image (resolution). Here, therefore, the description will be made of the number of pixels and the pixel pitches. The number of pixels used for the discrimination is 50 or more, and the pixel pitches at that time is 50 μm or less (the resolution being 500 dpi or more).

However, in order to materialize the discrimination reliably at least to a certain extent, it is desirable to make the number of pixels 100 or more, and the pixel pitches 20 µm or less (the resolution being 1200 dpi or more). This does not necessarily mean that the materialization is impossible unless these conditions are satisfied. The conditions of the needed pixel numbers and pixel pitches are also changeable depending on the conditions of optical systems or the sensitivity of the sensor or the like used for measuring the reflected light. Further, these are made different by the target-recording medium for the intended kind discrimination.

Figure 7:
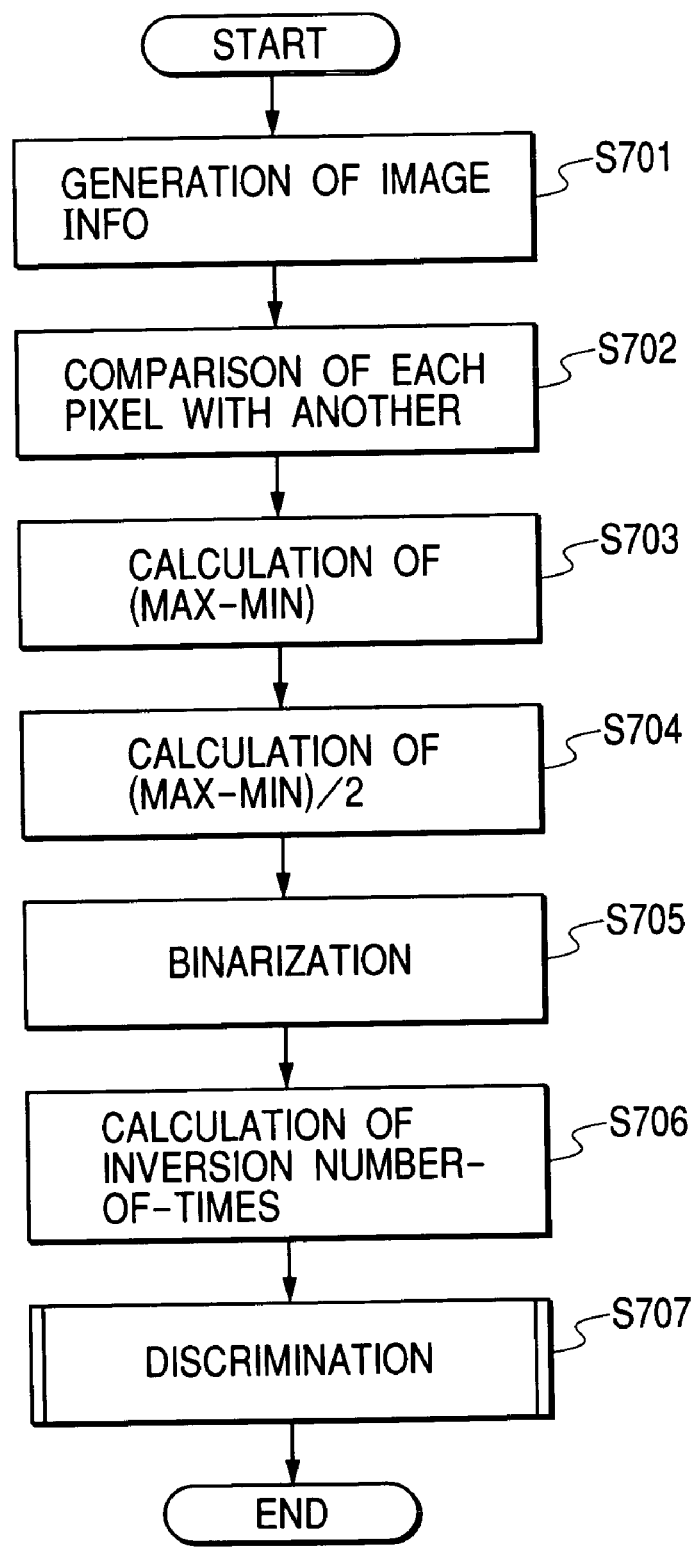
FIG. 7 is a flowchart that shows the process flow of discriminating the kind of recording medium in accordance with the first embodiment.

FIG. 7 is a flowchart that shows the flow of process for discriminating the kind of recording medium.

In step 701, the image information is generated. In step 702, comparison of each pixel with another is made in accordance with the image information obtained in the step 701. More specifically, the maximum value and the minimum value of brightness are detected, respectively. In step 703, calculation is made to obtain the brightness difference between the maximum and minimum values of brightness obtained in the step 702. Likewise, in step 704, calculation is made to obtain arithmetic means (the average level) of the maximum and minimum values of brightness obtained in the step 702. At this juncture, the processes in the step 703 and the step 704 should not be necessarily performed in that order. The order of processes may be reversed without any problem. In step 705, binarizing process is executed with the average level obtained in the step 704 as the threshold value. In step 706, calculation is made for the number of inversions of 0 and 1, which are the pixel values, on the basis of the image after the execution of the binarizing process. In step 707, the kind of recording medium is discriminated in accordance with the brightness difference, which is the characteristic amount obtained in the step 703, and the number of inversions, which is the characteristic amount obtained in the step 706.

Figure 8:
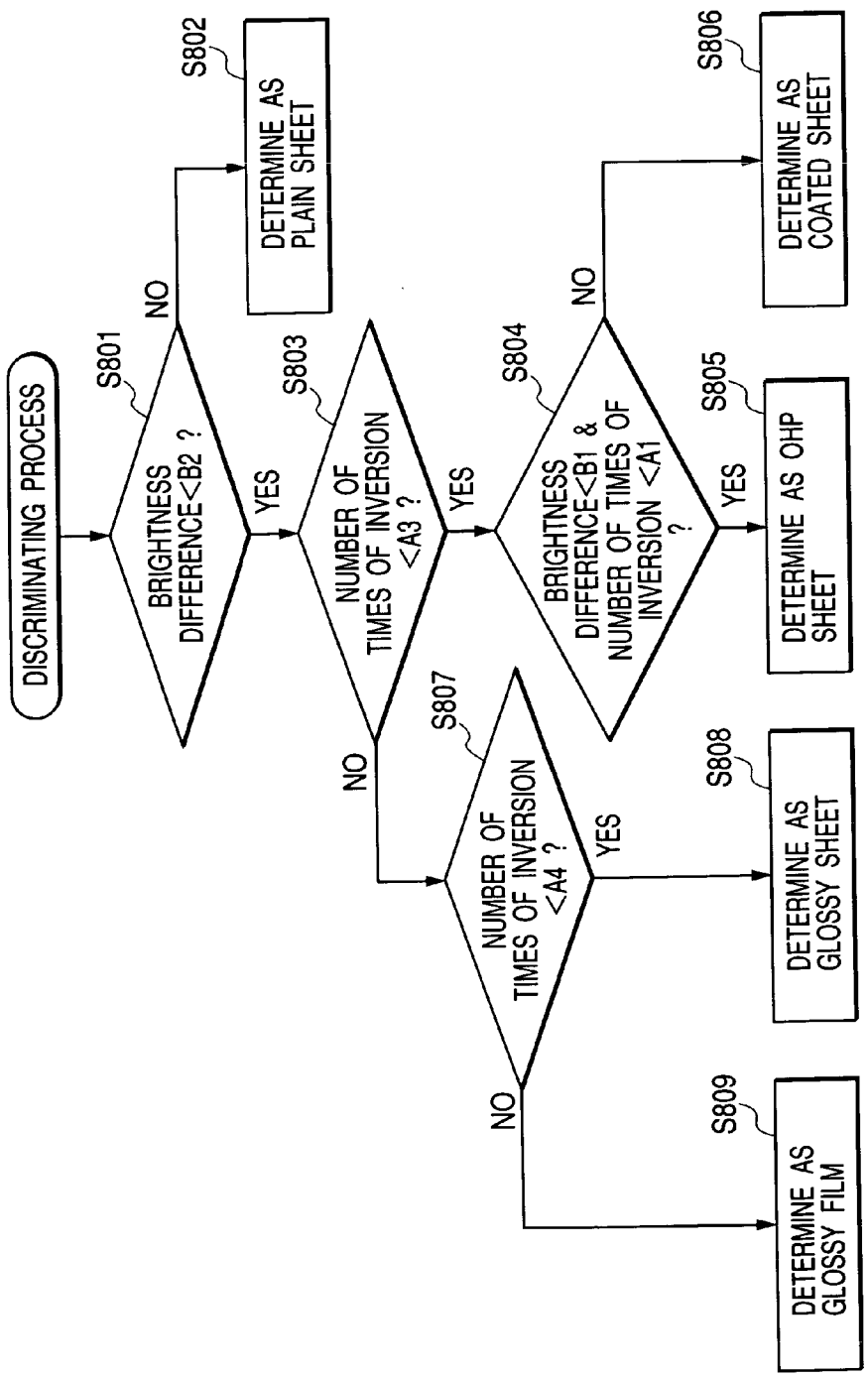
FIG. 8 is a flowchart that shows the flow of discriminating recording medium in accordance with the first embodiment.

FIG. 8 is a flowchart that shows the flow of discriminating the kind of recording medium in the step 707 in FIG. 7.

With the two parameters obtained on the basis of the discriminating map shown in FIG. 6, the discrimination is made as given below. In this respect, it is assumed that the values, A1, A2, A3, A4, B1, and B2, which are used for illustration, have the following relations: The B1 and B2 are values of the brightness difference, having the relations of B1 <B2. Also, the A1, A2, A3, and A4 are the values of inversion numbers, having the relations of A1<A2<A3<A4, respectively.

In step 801, it is determined whether or not the brightness difference is smaller than the B2. If it is smaller, the process proceeds to step 803. If not, the process proceeds to step 802 accordingly.

In the step 802, with the brightness difference being equal to or larger than the B2, the kind of the recording medium is determined to be a plan sheet.

In the step 803, it is determined whether or not the number of inversions is smaller than the A3. If affirmative, the process proceeds to step 804. If negative, the process proceeds to step 807 accordingly.

In the step 804, it is determined whether or not the brightness difference is smaller than the B1, and the number of inversions is smaller than the A1. If affirmative, the process proceeds to step 805. If negative, it proceeds to step 806 accordingly.

In the step 805, the kind of the recording medium is determined to be an OHP film. In the step 806, the kind of the recording medium is determined to be a coated sheet for ink jet use.

In the step 807, it is determined whether or not the number of inversions is smaller than the A4. If it is smaller than the A4, the process proceeds to step 808, otherwise to step 809 accordingly.

In the step 808, the kind of the recording medium is determined to be a glossy sheet. In the step 809, the kind of recording medium is determined to be a gloss film.

For the present embodiment, one example of processing procedures as shown in FIG. 8 is given as the process to determine at first whether the kind of recording medium is a plane sheet or not promptly on the assumption that the use frequency of the plain sheet, which is a general recording medium, is high. However, it is conceivable that different processing procedures are needed for a recording apparatus having a different usage, necessitating the higher use frequency of recording medium other than the plain sheet. The realization thereof is also possible. In such a case, too, there is no change in the execution of the discrimination along with the discriminating map illustrated in FIG. 6.

With respect to the area shown in FIG. 6, which is not allocated to any specific kind of recording medium, where the number of inversions is larger than the A2, and the brightness difference is more than the B2, and also, the area where the number of inversions is smaller than the A2, and the brightness difference is smaller than the B2 with the exception of the area where the recording medium is determined to be an OHP film, it is determined in accordance with the flowchart shown in FIG. 8 that these areas of a plane sheet and a coated sheet for ink jet use, respectively. However, it may be arranged to make decision on these areas that any corresponding recording medium is absent on them, respectively, and then, the processes may be executed, again to discriminate the kind of recording medium as required. Also, it may be arranged to from a structure so that an error processing is executed to return the error to the effect that no corresponding recording medium exists, and indicate the corresponding error message on a display screen.

Figure 9:
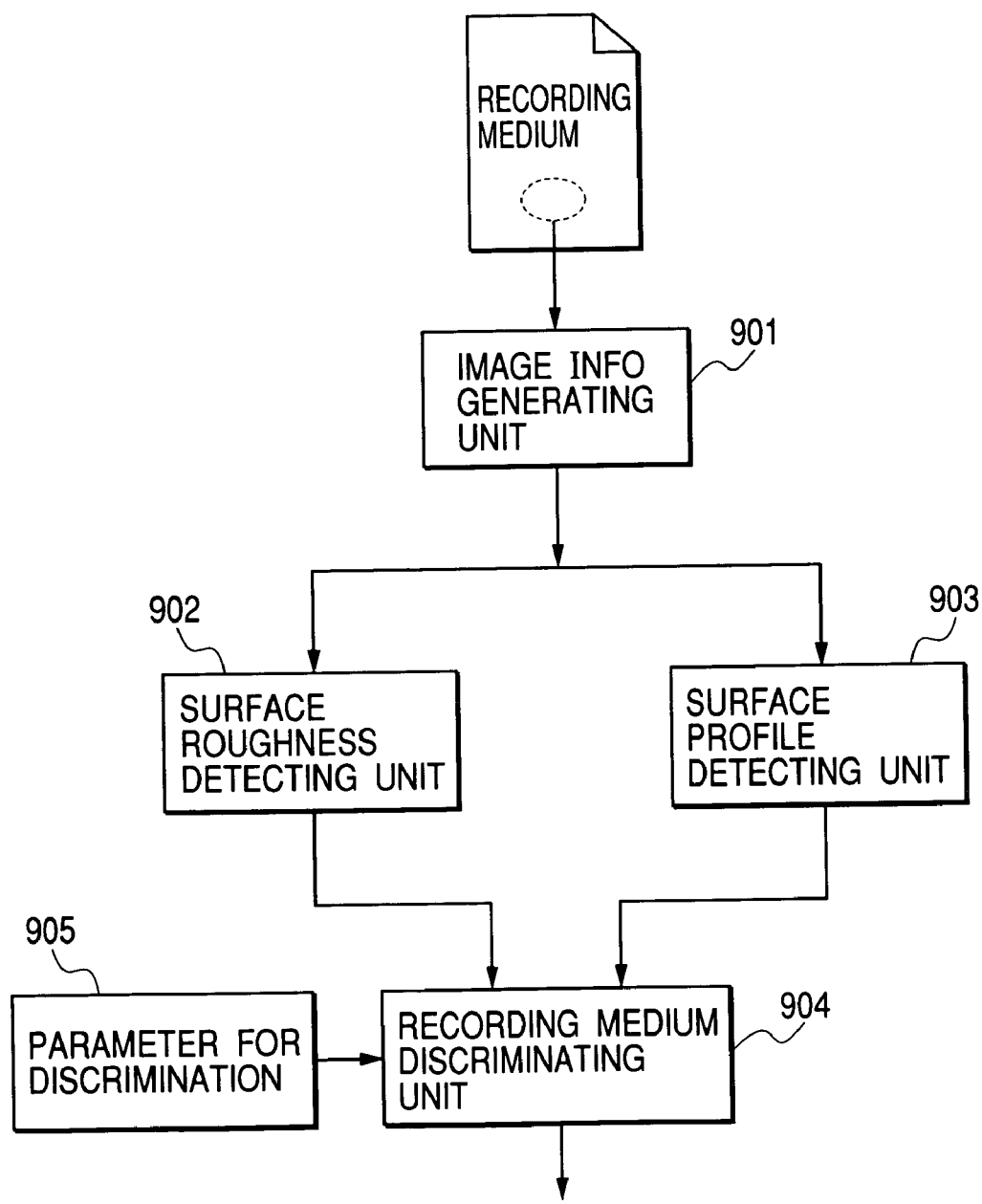
FIG. 9 is a functional block diagram that shows the method for discriminating recording medium, which becomes a superordinate concept, in accordance with the first embodiment.

FIG. 9 is a functional block diagram that shows the recording medium-discriminating method, which becomes a superordinate concept in the first embodiment.

A reference numeral 901 designates an image information-generating unit that generates image information from any small area on the surface of recording medium. The image is formed by plural pixels the brightness of which is larger than binary; 902, a surface roughness-detecting unit that detects parameters characterizing the surface roughness in accordance with the irregularity of the surface of the recording medium. This corresponds to the brightness difference-calculating unit 103 shown in FIG. 1 and the functional block to follow. A reference numeral 903 designates a surface configuration-detecting unit (or surface profile detecting unit) that detects also using the image information the parameters characterizing the surface configuration with the cycle of undulations on the surface of the recording medium, and the surface roughness as well. This corresponds to the number of inversion-counting unit 106 shown in FIG. 1 and the functional block to follow. A reference numeral 904 designates a kind of recording medium-discriminating unit that discriminate the kind of recording medium, which discriminate the kind thereof on the basis of detected values obtainable from the surface configuration-detecting unit; and 905, discriminating parameters used by the kind of recording medium-discriminating unit 904. The present invention can be also grasped as the concept, which is made more abstractional such as this.

Figure 10:
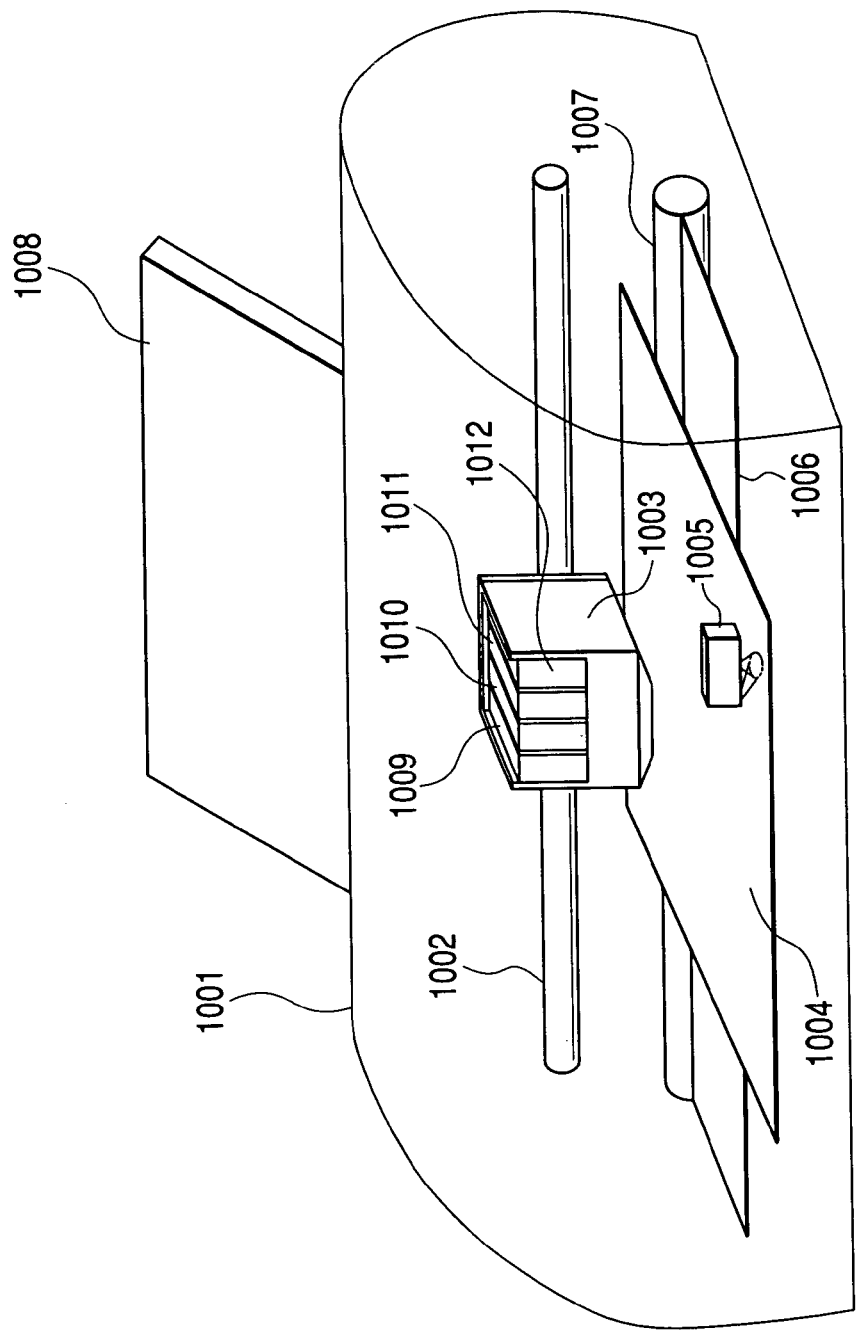
FIG. 10 is a perspective view that schematically shows a recording apparatus in accordance with the first embodiment.

FIG. 10 is a perspective view that schematically shows the structural example of a recording apparatus in accordance with the first embodiment.

A reference numeral 1001 designates a main body of the recording apparatus. Here, it is assumed tat the apparatus is that of ink jet method in the serial printing mode. As shown in FIG. 10, the apparatus comprises a guide rail 1002; a carriage 1003; an image sensor 1005; a platen 1006; a feed roller 1007; an automatic sheet feeder 1008, and some others.

A reference numeral 1002 designates the guide rail that enables the carriage 1003 to reciprocate for scanning along the main scan direction; 1003, the carriage having the recording heads of carriage mode 1009, 1010, 1011, and 1012 detachably mounted corresponding to ink tanks of plural colors (for example, four colors, black (K), cyan (C), magenta (M), yellow (Y)); 1004, a target recording medium to be recorded by this recording apparatus 1001; 1005, the image sensor for generating image information on the surface of the recording medium 1004 in order to discriminate the kind of the recording medium; 1006, the platen for regulating the recording surface of the recording medium 1004 to be smooth and flat; 1007, the feed roller for conveying the recording medium 1004 in the sub-scanning direction. The image information is generated by use of the image sensor 1005 from the surface condition of the recording medium 1004 to be conveyed by the feed roller 1007. A reference numeral 1008 designates the automatic sheet feeder for conveying the recording medium 1004 to the recording position.

Reference numerals 1009 to 1012 designate recording heads of cartridge type corresponding to ink tanks of plural colors. Here, as the recording head, various type ones can be used. For example, it may be possible to arrange the structure so that the ink tank containing ink serving as recording agent, which is detachably mountable on the cartridge main body, and the ink head cartridge having ink discharge portion, which is held on the cartridge main body, are separated. Here, the structure may be such that the ink discharge portion is made inseparable from the ink tank. However, the structure may also be arranged to make it possible to exchange only ink tanks when ink remains no longer if the discharge portion and ink tank are made separable. Also, only the ink discharge portion is arranged in the cartridge mode, and then, the structure may be arranged so as to receive ink supply from the ink tank located in some other portion of the apparatus through a tube or the like. Also, besides the above, it is possible for the recording head to use cartridges, which correspond to plural kinds of ink having different densities for one and the same color. These may be prepared in the plural number depending on the different recording densities needed.

As shown in FIG. 10, the image sensor 1005 is arranged in the main body of the recording apparatus, and then, the recording apparatus can be structured to provide an additional function of discriminating the kind of recording medium on the bases of the image information obtainable by use of such sensor.

Figure 11:
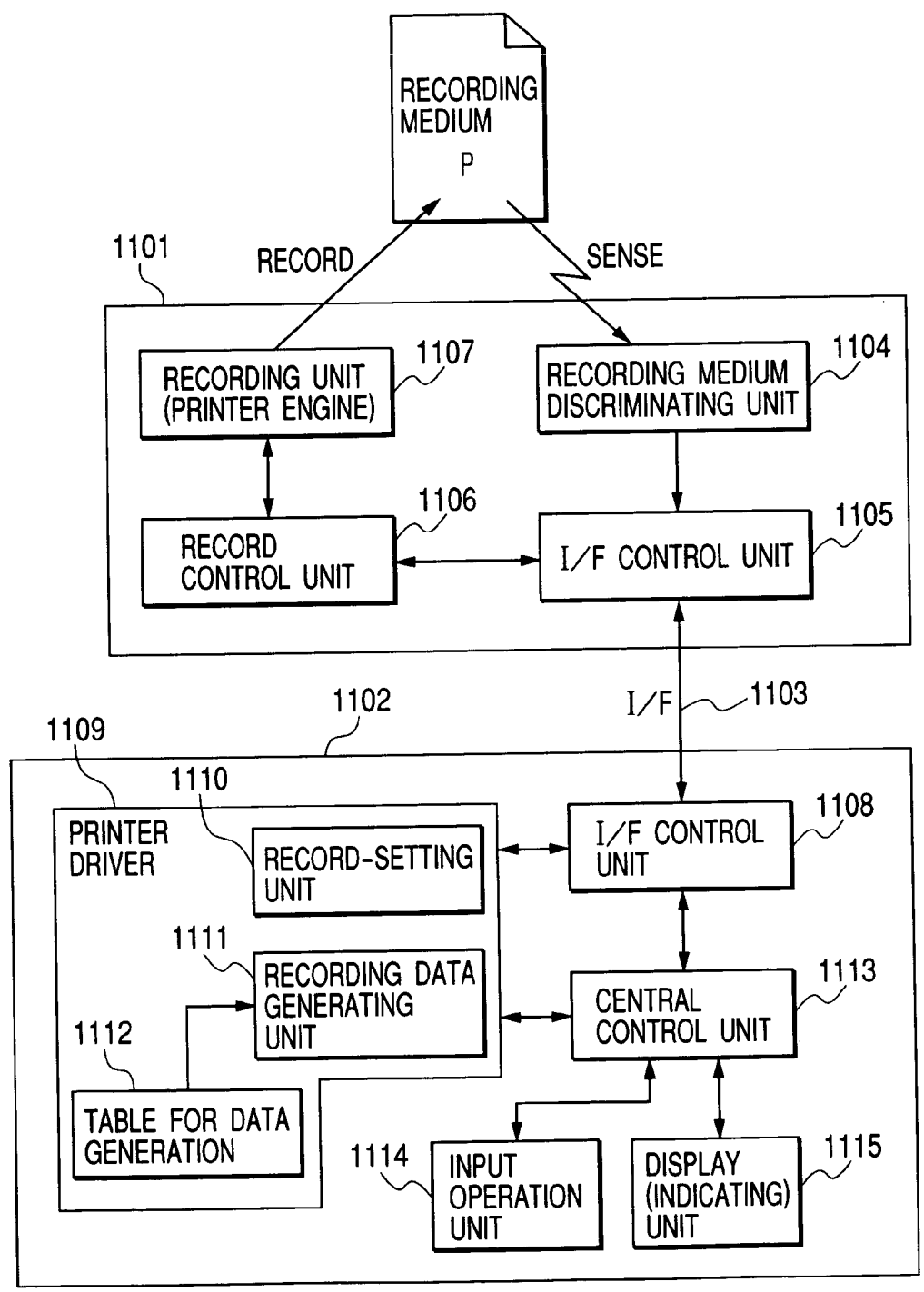
FIG. 11 is a functional block diagram that shows the systems structure in accordance with the first embodiment.

FIG. 11 is a functional block diagram that shows the system structure.

A reference numeral 1101 designates a color recording apparatus of ink jet method that makes image formation and performs recording on a recording medium P. Those at 1104 to 1107 are structured by each of the functional blocks. A reference numeral 1102 designates a host apparatus connected with the color recording apparatus 1101, which supplies recording data to be recorded on a recording medium. Those at 1108 to 1115 are structured by each of the functional blocks. However, both for the color recording apparatus 1101 and the host apparatus 1102, the functions, which are considered unnecessary for the description of the characteristics of the present embodiment in particular, are omitted here.

A reference numeral 1103 designates a communication interface, which connects the recording apparatus 1101 and the host apparatus 1102. As the communication interface, there are IEEE1284, USB (Universal Serial Bus), IEEE1394, and others. Here, the USB is taken into consideration.

The reference numeral 1104 designates a recording medium-discrimination processing unit that discriminates the kind of recording medium P. Functionally, this unit is divided into the image information-generating portion that generates any image information on the surface of the recording medium P by use of the image sensor 1005, and the recoding medium-discriminating portion that discriminates the kind of recording medium on the bases of the image information thus generated. The recording medium P is assumed to be stacked on a sheet-feeding tray, a cassette, or the like, which is provided for the recording apparatus 1101.

The reference numeral 1105 designates an I/F control unit that controls the ink face function of the recording apparatus 1101. Here, since the interface taken into consideration is the USB, it is assumed that a controller on the USB peripheral device side provides this control in order to executes the transmission and reception of information regarding the kind of recording medium, and the transmission and reception of recording data, and control commands as well, among some others. Also, the control unit returns the status information of the main body of the recording apparatus, such as the occurrence of errors and condition of communications, to the host apparatus 1102 as required.

The reference numeral 1106 designates a recording control unit that receives recording data transmitted from the host apparatus 1102, and develops them for the printer engine. Here, the printer engine is controlled in accordance with the commands for use of recording control, which is contained in the recording data. More specifically, the data, which are formed by various commands for controlling the binary data for recording use (intermediate data before being binarized in some cases), the shooting amount of ink, the path numbers, the direction of recording, and the carrying amount of the recording medium, respectively, are transmitted from the host apparatus 1102 as recording data.

The reference numeral 1107 designates a recording unit, which is also called printer engine, and executes recording on a recording medium P in accordance with the recording data developed by the recording control unit 1106. For the present embodiment, since the color recording apparatus 1101 adopts the ink jet method, the image formation is carried out by ink discharges.

A reference numeral 1108 designates an I/F control unit that controls the interface function of the host apparatus 1102, which is structured by the USB controller on the host side. This control unit functions as the USB host. Part of the function as the USB host may be formed by software, such as an OS and a driver.

A reference numeral 1109 designates a printer driver, which is software for executing various settings for recording, generating recording data, and controlling the recording apparatus on the host apparatus 1102 side. This driver is formed by various kinds of functional blocks at 1110 to 1112.

The reference numeral 1110 designates a recording setting-processing unit (or record-setting unit) that executes various kinds of recording setting including the setting of a recording medium, setting of the recording quality, and the like. This unit is provided with functions to receive the instructions and inputs from the user, and indicate on the screen of the display or notify the contents thereof. Also, this unit may be provided with a function to automatically make the recording settings in accordance with the information regarding the kind of recording medium, which is transmitted from the recording apparatus 1101.

The reference numeral 1111 designates a recording data generation-processing unit (or recording data generating unit) that executes the generation of recording data. This unit executes various image processes, such as color conversion and binarization, in accordance with the settings for recording, which is executed by the recording apparatus 1101 and recording setting-processing unit 1110, and then, generates data for recording use and commands for use of controlling the recording apparatus that controls recording. The data for recording use and the commands for controlling use are transmitted to the recording apparatus 1101 as recording data.

The reference numeral 1112 designates a table to be used when the recording data generation-processing unit 1111 generates the recording data. This table can be updated. Also, additional contents can be shown on this table.

A reference numeral 1113 designates a central control unit that controls each of the functions of the host apparatus 1102, which corresponds to the functions provided by the CPU thereof; 1114, an input operation unit, which comprises various kinds of input devices used for reflecting recording settings as intended by the user; 1115, a display (indication) unit that notifies to use of the settings made for recording. As the method for indicating or notifying the settings of recording, there are conceivably the cases where the displaying device, such as a monitor, is used or notification is made by means of voice, among some others.

As described above, the printing system embodying the present invention here comprises the color recording apparatus having the image sensor 1005 mounted thereon, which is provided with the function for the discrimination of the kind of recording medium; the data processing apparatus, such as host apparatus, which is provided with the function for generating the recording data and control commands in accordance with the instructions or selections made by the user, as well as with the information obtained for the kind of recording medium to be used; and the interface for by-directional communications, which connects these two apparatuses. In accordance with the present embodiment, it has been exemplified that all the functions of the recording medium discrimination-processing unit 1104 (more specifically, the contents described in conjunction with FIG. 1) are provided for the recording apparatus 1101 so as to constitute the system therein. However, it may be possible to arrange the structure so that a part or all of such functions are provided for the host apparatus that serves as the data processing apparatus in this respect. With such functions partly arranged for the host apparatus side, it becomes possible to execute operation more flexibly than the case where all of the processes should be executed within the main body of the recording apparatus. More specifically, it becomes possible to implement the modification or updating of the parameters for use of discriminating the kind of recording medium or the addition of new kinds of recording medium with ease.

As described above, the characteristics that indicate the surface condition of a recording medium are obtained from an image within a specific area on the surface of the recording medium, and then, in accordance with such characteristics thus obtained, the kind of recording medium is discriminated. In this way, it becomes possible to materialize the discrimination of the kind of recording medium in higher precision. Particularly, it is made possible to significantly enhance the precision with which to discriminate a plain sheet from a coated sheet for ink jet use.

In accordance with the present embodiment, the arithmetic mean value or the average level (the arithmetic mean of the maximum value and the minimum value) is used as the threshold value for binarizing process. However, it is possible to obtain the effect equally even by use of some other parameters that indicate the magnitude of irregularities of the surface of recording medium, such a arithmetic mean value of brightness of more pixels than two or the brightness at the peak of a histogram.

Also, in accordance with the present embodiment, the discriminating parameters 108 are used for the discrimination of the kind of recording medium, but it is possible to obtain the effect equally by use of the discriminating table on which it is arranged to coordinate the kind of recording medium, and the number of inversions and the average level as shown in FIG. 6.

Also, in accordance with the present embodiment, the number of inversions is taken as the number of times when changes are made from the black pixel to the white pixel or the white pixel to the black pixel. However, it is possible to obtain the effect equally even if the number of times is taken only for the change from the black pixel or from the white pixel to the black pixel.

Second Embodiment

Hereunder, with reference to the accompanying drawings, the description will be made of a second embodiment of the present invention.

The recording medium-discriminating method that materializes the present embodiment is characterized in that whereas the first embodiment uses the brightness difference and the number of inversions after the execution of the binarizing process for discriminating the kind of recording medium, this embodiment is designed to discriminate the kind of recording medium by use of arithmetic mean value and the amount of run-length codes. Therefore, the description will be made centering on such event.

Figure 12:
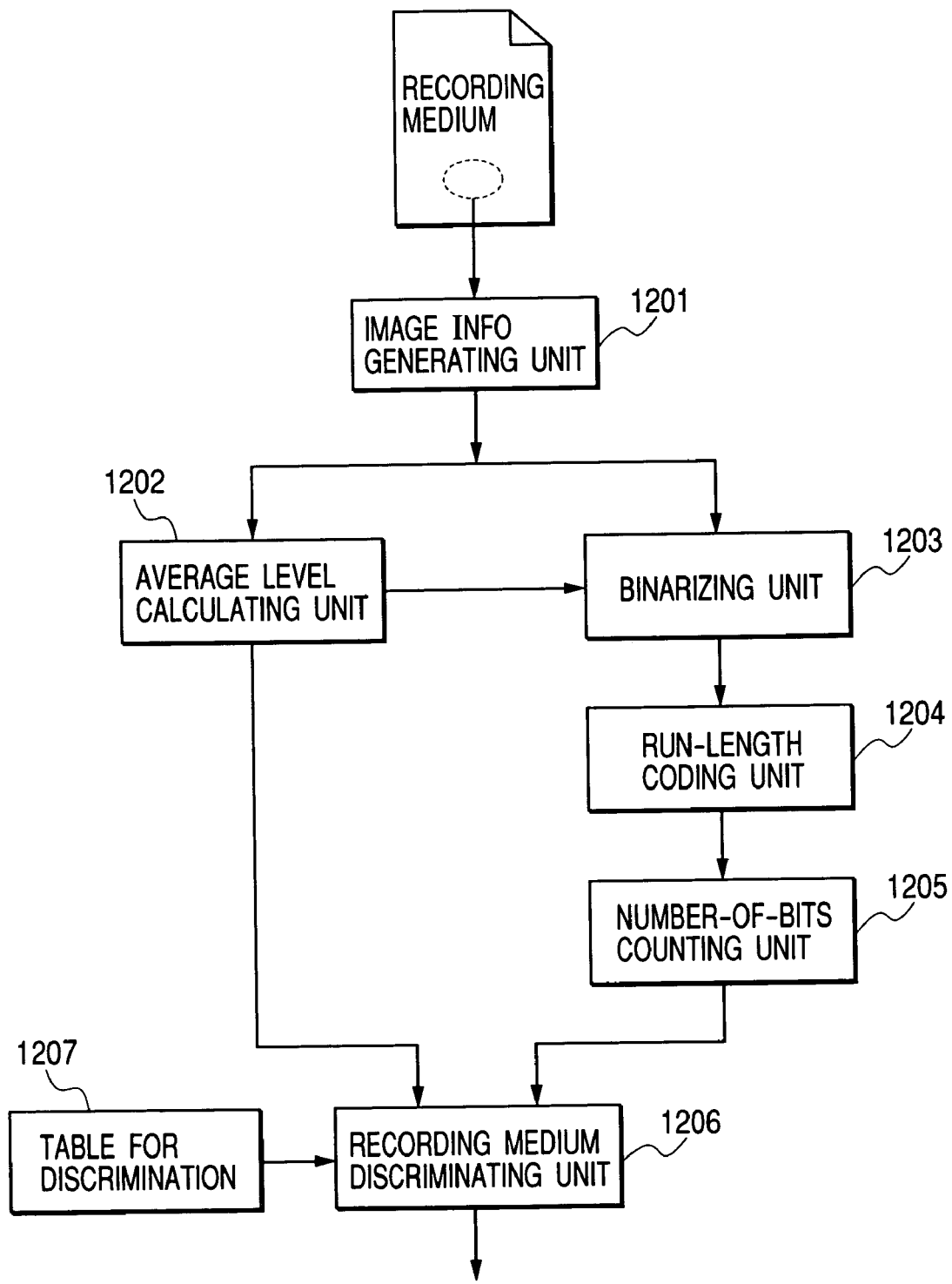
FIG. 12 is a functional block diagram that shows a method for discriminating recording medium in accordance with a second embodiment of the present invention.

FIG. 12 is a functional block diagram that shows the recording medium-discriminating method in accordance with the second embodiment.

A reference numeral 1201 designates an image information-generating unit that generates image information form any small area on the surface of a recording medium. As in the case of the first embodiment, the image information is generated by means of the diffused reflection light component, and also, the prerequisite of each of the pixels that form an image, and the like are the same.

A reference numeral 1202 designates an arithmetic mean value-calculating unit (or average level calculating unit) that works out the sum of products of brightness of each pixel from the image information formed by plural pixels, which is obtained by the image information-generating unit 1201.

Further, it is arranged here to divide the sum of products by the number of all pixels that forms the image in order to obtain the arithmetic mean value.

A reference numeral 1203 designates a binarization-processing unit that binarizes the image information obtained by the image information-generating unit 1201 with the arithmetic mean value obtained by the mean value-calculating unit 1202 as the threshold value; and 1204, a run-length coding unit that executes run-length coding for the binary image (may also be referred to as binary data) obtained by the binarization-processing unit 1203. The detailed contents of the run-length coding unit will be described later in conjunction with FIGS. 14A and 14B. A reference numeral 1205 designates a code amount (or number of bits)-calculating unit that works out the number of bits of the image coded by the run-length coding unit 1204. The detailed contents of the number of bits-calculating unit will be also described later in conjunction with FIGS. 14A and 14B.

A reference numeral 1206 designates a recording medium discriminating unit that discriminates the kind of recording medium. The discrimination of the kind of recording medium is executed in accordance with the arithmetic mean value obtained by the mean value-calculating unit 1202, and the run-length code amount (or run-length number of bits) obtained by the number of bits-calculating unit 1205. The discrimination of the kind of recording medium is made by use of a table for discrimination 1207 induced from the discriminating map that indicates in advance the relations between the various kinds of recording medium, the arithmetic mean values, and the run-length code amounts. The details of the discriminating method for the kind of recording medium will also be described later. A reference numeral 1207 designates the discriminating table used when the kind of recording medium are discriminated by the kind of recording medium-discriminating unit 1206. This discriminating table 1207 indicates various kinds of recording medium, the run-length code amounts, and the arithmetic mean values, which are given coordination on the table.

As described above, the flow and structure for discriminating the kind of recording medium are such as to calculate the arithmetic mean value of brightness and the run-length code amount in accordance with the image information obtainable from any small area on the surface of the recording medium, and then, to discriminate the kind of the recording medium on the basis thereof.

FIG. 13 is a histogram that shows the relations between the pixel numbers and brightness levels for an image. The axis of abscissa indicates brightness level, and the axis of ordinate indicates the pixel numbers having the brightness level thus indicated.

A reference numeral 1301 designates a histogram of each pixel that forms an image; 1302, arithmetic mean value of brightness per pixel that forms the image. The arithmetic mean value is the one obtainable by equally dividing the total pixel number that forms the histogram, that is, the area of the domains indicated by slanted lines. Here, such value is simply referred to as mean value. For the present embodiment, this mean value is used as the threshold value of binarizing process to be carried out. This mean value indicates the averaged brightness of all the pixels, that is, the whiteness of the recording medium. Reference numerals 1303 and 1304 designate the respective domains obtained by dividing an area of the domains indicated by slanted lines; and 1305, the brightness at the peak of the histogram. In the ideal condition, the average level (arithmetic mean value) of the first embodiment, the mean value of the present embodiment, and the brightness at this peak are identical. Hereinafter, for the present invention, it is assumed to indicate the value at 1302 as the mean value, and the value at 1305 as the brightness at the peak.

FIGS. 14A and 14B are views that illustrate the run-length coding and the number of bits by the run-length coding unit 1204 and the number of bits-calculating unit 1205 shown in FIG. 12. In FIGS. 14A and 14B, the linear image information, which is one-dimensional, is dealt with as the target image.

FIG. 14A is a view that shows the example in which the run-length is short. A reference numeral 1401 designates certain pixels at any position in an image after the execution of binarizing process. This is a black pixel having 0 value. Also, a reference numeral 1402 designates the 20th pixel from a pixel 1401 existing at any point, which is the white pixel having the value 1. FIG. 14B is a view that shows the example in which the run-length is long. A reference numeral 1403 designates a certain pixel at any position in the image after the execution of binarizing process. This is a black pixel having 0 value. Also, a reference numeral 1404 designates the 20th pixel from the pixel 1403 existing at any point, which is the black pixel having 0 value. In either case shown in FIGS. 14A and 14B, the image is formed by the row of white and black pixels after the execution of binarizing process. Actually, however, each pixel has the value of 0 or 1.

Here, the brief description will be made of the run-length coding. For the run-length coding, the same data element often appears continuously. Then, this coding gives attention to the combination of such data element and the number of appearances thereof, which is mainly used for facsimile equipment or the like. When allocating codes, a small number of bits is allocated to the combination that appears often, and a large number of bits is allocated to the combination that seldom appears. In this manner, it is possible to curtail the total number of bits. For the present embodiment, the run-length number of bits is calculated to know the brightness for plural pixels that form an image, and the cycle of brightness changes as well. In other words, it becomes possible to obtain the surface roughness and surface configuration of recording medium.

At first, the contents of FIG. 14A will be described. The allocation of codes here is the terminating codes of the MH (Modified Huffman) coding used for facsimile equipment. For example, if only a pixel of black one exists, 3 bits are allocated like 010. Likewise, if only a pixel of white one exists, 6 bits are allocated like 000111. In this way, if the run-length of pixels having the same value is short, that is, if a coding, which makes the number of bits larger against the image information having smaller cycle of brightness changes, the number of bits, which is larger than the target pixel numbers of 21, is allocated eventually as shown in FIG. 14A. Generally, there is a need for the provision of one bit in order to indicate the status of one pixel for binary image. Therefore, if the image carries 21 pixels, it is possible to represent it with 21 bits. However, if the combination of pixels having short run-length as shown in FIG. 14A is allowed to continue, it has as extremely large number of bits as 45 bits eventually.

Next, the description will be made of the contents of FIG. 14B. For the code allocation here, too, the MH coding terminating codes are used in the same manner as shown in FIG. 14A. Here, against the image information, smaller number of bits is allocated in such a manner that if 5 black pixels continue, 0011 is allocated; if 7 white pixels continue, 1111, and if 9 black pixels continue, 000100. Thus, the number of bits allocated for 21 pixels is 14 bits as shown in FIG. 14B, and it is readily understandable that this becomes smaller value than the number of target pixels (21).

As described above, against the row of pixels, the run-length coding is used. Then, it becomes possible to show not only the tendency of the number of white and black pixels, but also, reliably and distinctly indicate the condition under which the pixels having the same value continuously exist, such as the run-length being long or short.

In this respect, as an example of run-length coding, the Huffman codes are adopted, but it may be possible to allocate codes originally depending on the pixel numbers and tendency of the target image. Also, what is needed here is not the bit-sequence after the execution of coding, but the indication that the run-length shows after all. Therefore, it is still possible to implement the function sufficiently only by the allocation of the amount of coded data, such as simply the number of bits without allocating terminating codes against a specific run-length.

It is designed for the present invention to acquire two kinds of characteristics of the surface of recording medium as parameters, and then, on the basis of such parameters, the kind of recording medium are discriminated. In accordance with the mean value obtained by the statistical processing described above, it is possible to secure the characteristics as to the latitude of the diffused reflection light of the surface of recording medium. Also, in accordance with the run-length number of bits corresponding to the changes in the brightness information along with the arrangement of continuous pixels, it is possible to secure the characteristics as to the cycle of the surface irregularity of recording medium. This latitude of the diffused reflection light of the recording medium is taken as the whiteness thereof, and the cycle of surface irregularity of the recording medium is taken as the surface configuration thereof. Now, hereunder, the description will be made of the structure whereby to discriminate the kind of recording medium on the basis of these two points of characteristics.

Figure 15:
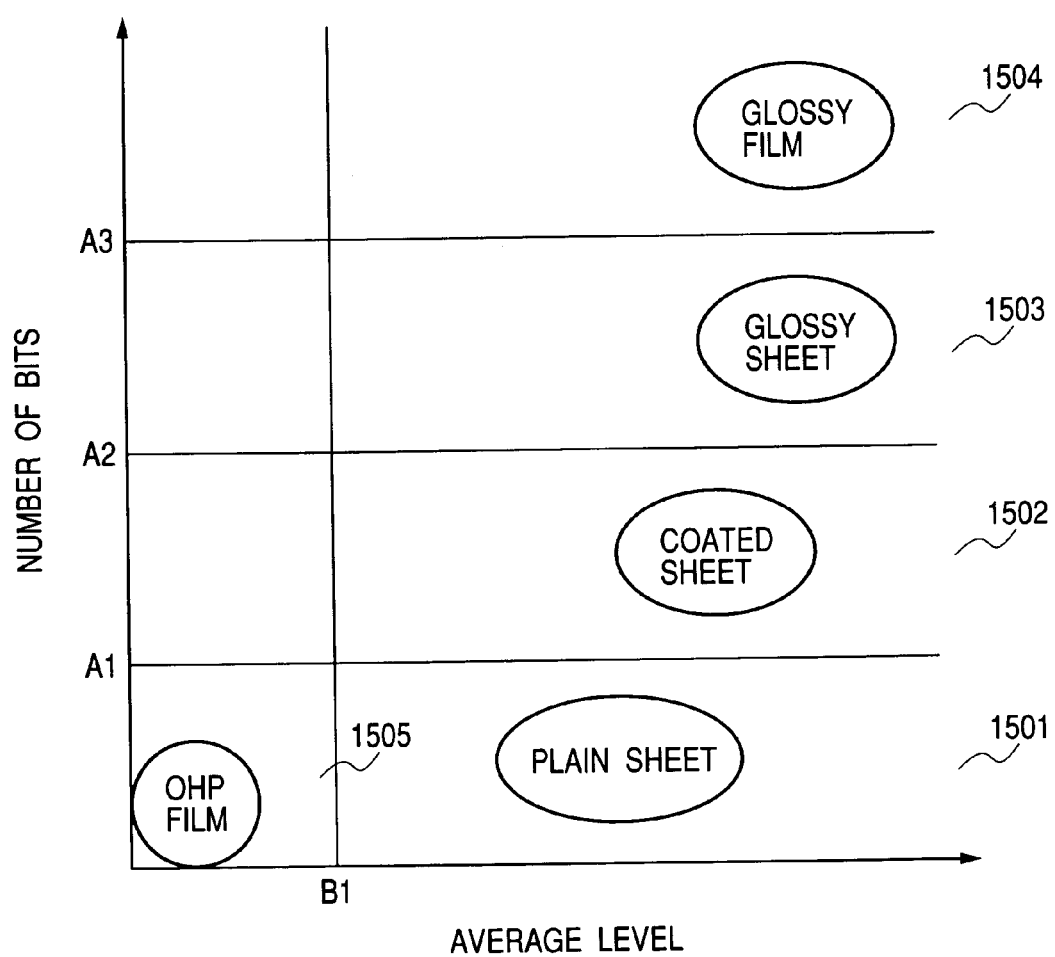
FIG. 15 is a discriminating map that shows the relations between each kind of recording medium, the run-length bit numbers, and the average level in accordance with the second embodiment.

FIG. 15 is the discriminating map that indicates the relations between each kind of recording medium, the run-length number of bits, and the mean value. In FIG. 15, each elliptical area indicates the aggregate of resultant points of measurement, and then, on the basis thereof, the discriminating areas are divided as shown in FIG. 15.

A reference numeral 1501 designates an area, which should be discriminated as that of a plain sheet; 1502, an area, which should be discriminated as that of a coated sheet for ink jet use; 1503, an area, which should be discriminated as that of a gloss sheet; 1504, an area, which should be discriminated as that of a glossy film; and 1505, an area, which should be discriminated as that of an OHP film.

The relations between each kind of recording medium, the run-length number of bits, and mean values are summarized as shown in Table 3.

TABLE 3

|  | Plain sheet (a) | Coated sheet (b) | Glossy sheet (c) | Glossy film (d) | OHP film (e) |
| --- | --- | --- | --- | --- | --- |
| Mean value | Medium | Medium to large | Large | Large | Small |
| Number of bits | Small | Medium | Large | Larger than (c) | Almost none |

Like this, it is readily understandable that the run-length number of bits has the same tendency as that of the number of inversions in the first embodiment.

Figure 16:
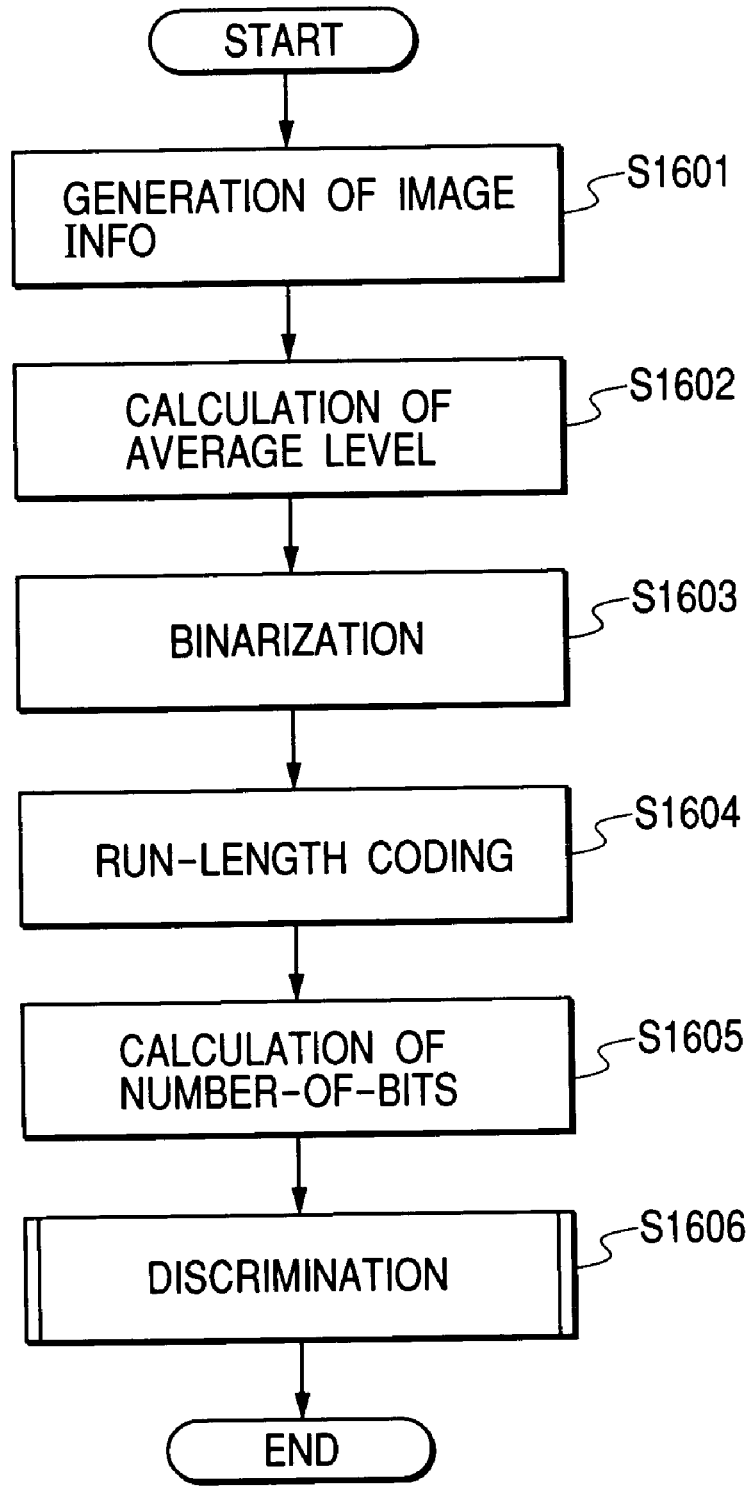
FIG. 16 is a flowchart that shows the process of discriminating the kind of recording medium in accordance with the second embodiment.

FIG. 16 is a flowchart that shows the flow of discriminating process of the kind of recording medium.

In step 1601, image information is generated. In step 1602, the sum of products is worked out per pixel from the image information obtained in the step 1601. Then, arithmetic mean value (average level) is worked out by diving the obtained value by the total pixels that form the image. In step 1603, the binarizing process is carried out with the average level obtained in the step 1602 as the threshold value. In step 1604, the run-length coding is executed for the image after the execution of the binarizing process. In step 1605, the number of run-length bits is worked out. In step 1606, the recording medium is discriminated on the basis of the average level obtained in the step 1602, which indicates a characteristic amount, and the run-length number of bits obtained in the step 1605, which also indicates a characteristic amount.

Figure 17:
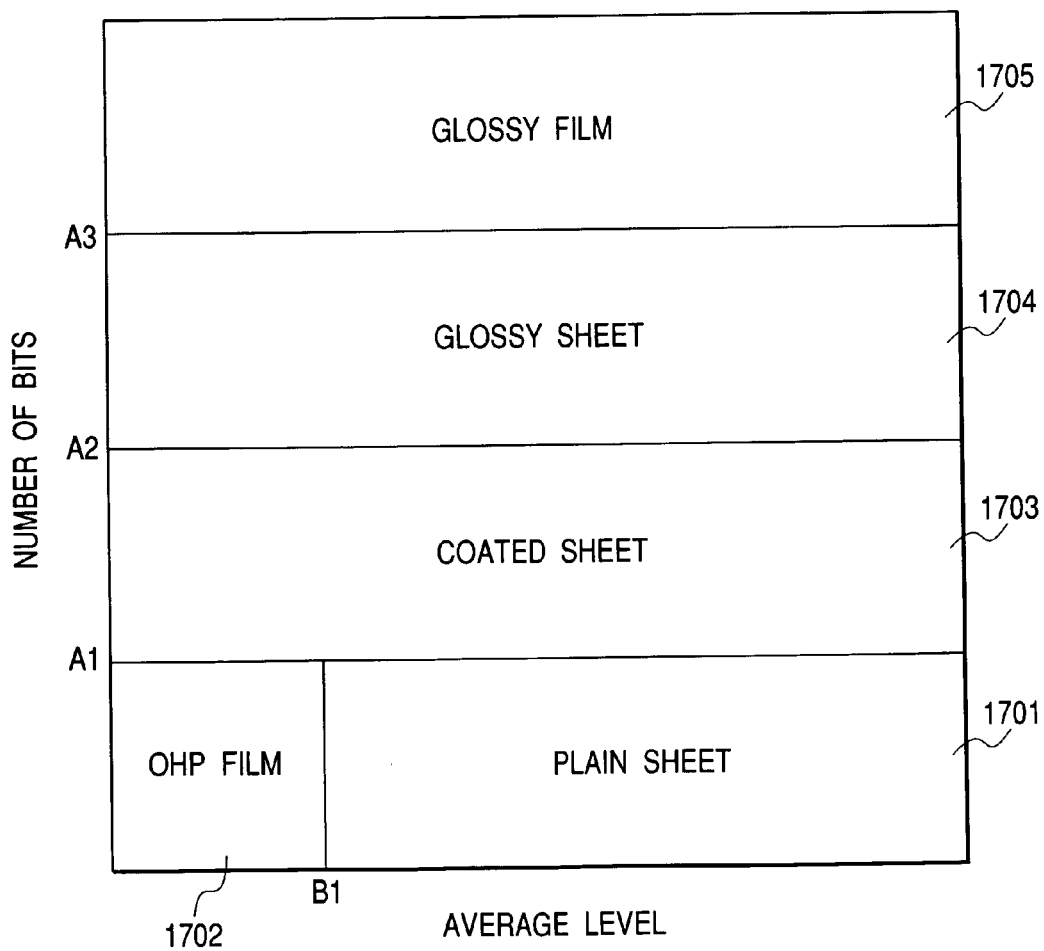
FIG. 17 is a discrimination table that shows the kind of recording medium in accordance with the second embodiment.

FIG. 17 is a view of the discriminating table used for discriminating the kind of recording medium in the step 1606 in FIG. 16. This discriminating table is prepared on the basis of the discriminating map shown in FIG. 15.

A reference numeral 1701 designates an area that should be discriminated as that of a plan sheet; 1702, an area that should be discriminated as that of an OHP film; 1703, an area that should be discriminated as that of a coated sheet for ink jet use; 1704, an area that should be discriminated as that of a gloss sheet; and 1705, an area that should be discriminated as that of a gloss film.

As in the first embodiment, the present embodiment, too, is structured to acquire the characteristics that indicate the surface condition of recording medium from the image on a specific area on the surface of the recording medium, and then, on the basis of such characteristics, the kind of recording medium are discriminated. When discriminating the kind of recording medium, the run-length number of bits is used to make the difference of surface configuration of recording medium more conspicuous. In this manner, the discriminating precision of the kind of recording medium is enhanced. Therefore, it is preferable to execute optimization such as to allocate coded data with the statistical process of patterns having the run-length to appear therefor. With the optimization, it becomes possible to discriminate by use of the indication containing the intention of the party that makes such discrimination, which is additionally provided for the characteristics of the image as compared with the parameters used for the first embodiment in which the number of undulations, such as the number of inversions, is simply integrated. Also, with the attention given to the combination of the white and black run-lengths, it becomes possible to grasp the relations of roughness and fineness.

Also, by use of the arithmetic mean value (average level), it becomes possible to make a tolerance larger for the distance of the image formation of the image sensor. This is because the calculation of mean value itself is fundamentally arranged to eliminate acuteness, and even if the image is blurred due to a slight gap in the distance between the image sensor and the recording medium, the influence that may be exerted on this operation should be small. Also, likewise, it becomes possible to make the influence of such gap in the image formation smaller for the run-length coding, because the run-length coding process is executed for the image after the execution of binarizing process.

For the present embodiment, the arithmetic mean value (average level) is used as one of the parameters for discriminating the kind of recording medium, but it may be possible to use the brightness difference as in the case of the first embodiment. In this case, the tolerance for possible error in the image-formation distance cannot be made larger. Therefore, it is necessary to make an adjustment so that no gap is allowed to take place in the image formation. However, it is still possible to material the same precision in the discrimination as the present embodiment by the application of the interrelations between the brightness difference and the run-length number of bits. In this respect, with the interrelations between the brightness and the run-length number of bits, it becomes possible to material the higher precision for the discrimination than that of the present embodiment as far as the discrimination between a plan sheet and a coated sheet for ink jet use is concerned. This is because the difference of irregularities of the plain sheet and coated sheet for ink jet use is more conspicuous than the whiteness difference between them.

Also, for the present embodiment, the discriminating table 1207 is used for discriminating the kind of recording medium. Here, however, the same effect is obtainable even by use of the value serving as a threshold value, which is determined on the basis of the distribution that the arithmetic mean value of each recording medium and the run-length number of bits may be able to take.

Third Embodiment

Hereunder, with reference to the accompanying drawings, the description will be made of a third embodiment of the present invention.

The recording medium-discriminating method that materializes the present embodiment is characterized in that the kind of recording medium are discriminated by use of the rightness difference and the isolated number of pixels. Therefore, the description will be made centering on such event. The process flow and the flow of discrimination are almost the same as those of the first embodiment, and the description thereof will be omitted.

Figure 18:
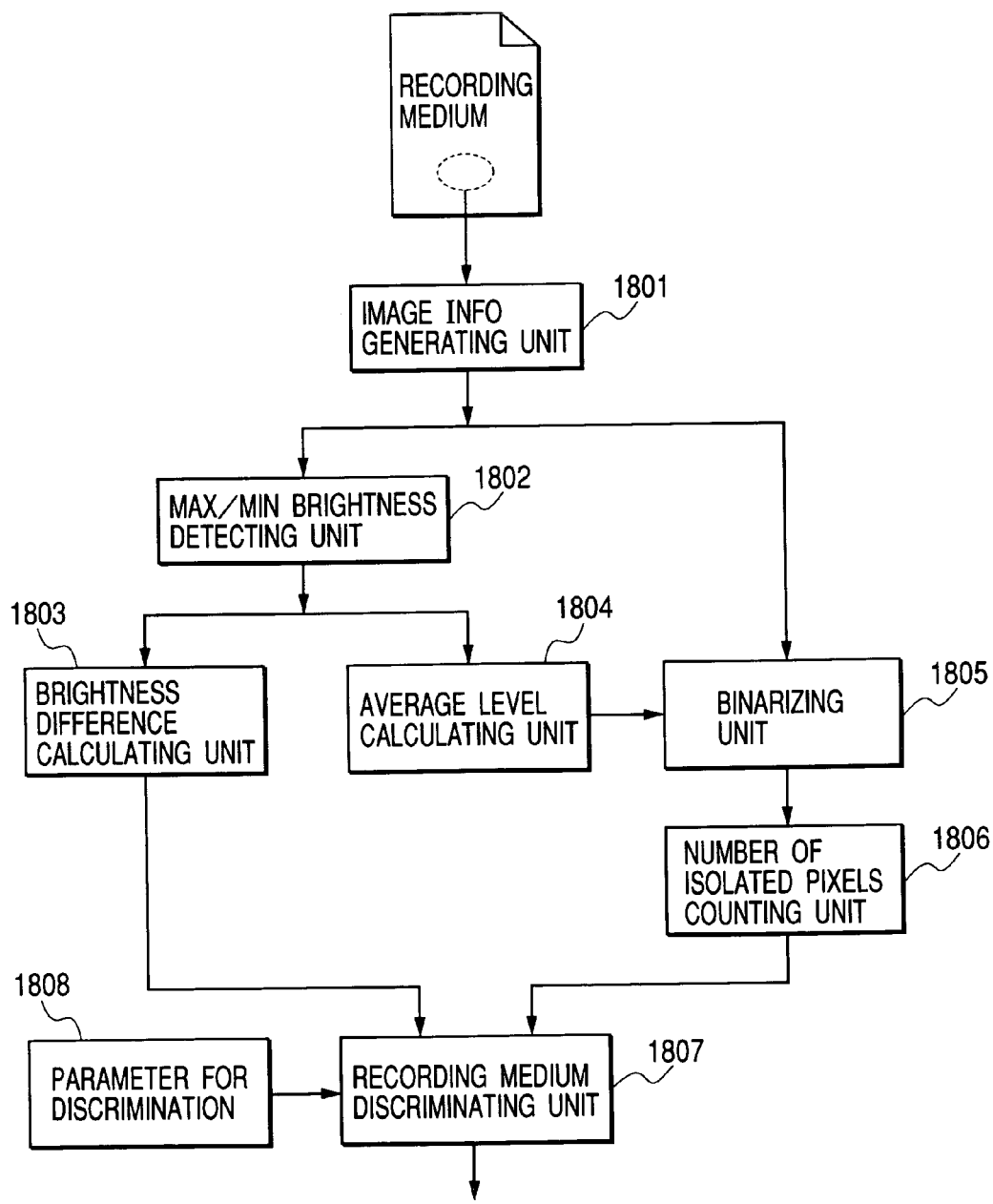
FIG. 18 is a functional diagram that shows a method for discriminating recording medium in accordance with a third embodiment of the present invention.

FIG. 18 is a functional block diagram that shows the recording medium-discriminating method in accordance with the third embodiment.

A reference numeral 1801 designates an image information-generating unit that generates image information form any small area on the surface of a recording medium. The process in which the image information is generated from the diffused reflection light component, the prerequisite of each of the pixels that form an image, and the like are the same as those of the first embodiment.

A reference numeral 1802 designates a maximum value/minimum value-detecting unit that detects the maximum brightness and minimum brightness, respectively, with reference to the brightness of each pixel of the image information formed by plural pixels obtained by the image information-generating unit 1801; 1803, a brightness difference-calculating unit that works out the brightness difference, which is the difference between the maximum brightness and the minimum brightness obtained by the maximum value/minimum value detecting unit 1802; 1804, an arithmetic mean value-calculating unit that works out the arithmetic mean value of the maximum brightness and the minimum brightness (the value arriving at by dividing the added sum of the maximum value and the minimum value by two) obtained by the maximum value/minimum value-detecting unit 1802.

A reference numeral 1805 designates a binarizing unit that binarizes the image information obtained by the image information-generating unit 1801 with the arithmetic mean value obtained by the arithmetic mean value-calculating unit 1804 as the threshold value; and 1806, an isolated pixel number calculating unit (or number of isolated pixels counting unit) that works out the isolated pixel numbers, which are the numbers to be determined as the number of isolated pixels from the values of pixels adjacent on both sides in accordance with the binary image (may be also referred to as binary data) obtained by the binarizing unit 1805. The detailed contents of the isolated pixel numbers-calculating unit will be described later in conjunction with FIG. 19.

A reference numeral 1807 designates a kind of recording medium-discriminating unit that discriminates the kind of recording medium. The discrimination is carried out in accordance with the brightness difference obtained by the brightness difference-calculating unit 1803, and the isolated pixel numbers-calculating unit 1806. The kind of recording medium are discriminated by use of discriminating parameters 1808, which are induced from the discriminating map indicating the relations between various kinds of recording medium, the brightness differences, and the isolated pixel numbers; 1808, the discriminating parameters used when discriminating the kind of recording medium in the kind of recording medium-discriminating unit 1807, which are threshold values determined on the basis of the distribution that each kind of recording medium is able to take.

As described above, the structure and process flow are arranged so as to discriminate the kind of recording medium by calculating the brightness difference and the number of isolated pixels from the image information on any small area on the surface of a recording medium, and then, discriminating the kind of recording medium based on them.

Figure 19:
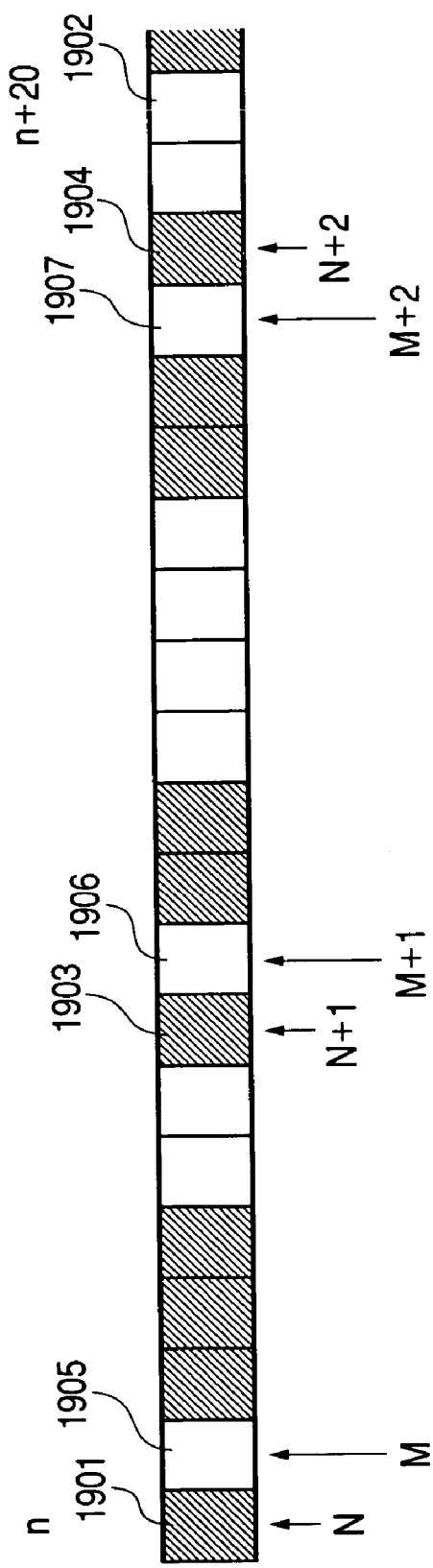
FIG. 19 is a view that illustrates the numbers of isolated pixels after binarizing process in accordance with the third embodiment.

FIG. 19 is a view that illustrates the number of isolated black or white pixels after the execution of binarizing process by the isolated pixel numbers-calculating unit 1806 shown in FIG. 18. In FIG. 19, the one-dimensional linear image information is used as the target image.

A reference numeral 1901 designates certain pixels at any position in an image after the execution of binarizing process. This is a black pixel having 0 value. Also, a reference numeral 1902 designates the 20th pixel from the pixel 1901 existing at any point, which is the white pixel having the value 1. In the image shown in FIG. 19, there are locations where the pixels that reside adjacent to a certain specific pixel on both sides are inverted to black or white altogether. These adjacent pixels on both sides, and the inverted pixels are called isolated pixels, and in accordance with the present embodiment, the number of such isolated pixels is adopted as one of parameters used for discriminating the kind of recording medium. The 7th pixel 1903, and the 18th pixel 1904 from the pixel 1901 are isolated pixels having 0 value. Also, if the specific pixels are assigned as white pixels, these are the first pixel 1905, the 8th pixel 1906, and the 17th pixel 1907 from the pixel 1901.

Given the number of isolated black pixels up to the pixel 1901 as N, two isolated pixels exist between the pixel 1901 and the pixel 1902. Therefore, the number of black isolated pixels for the pixel 1902 becomes N+2. Likewise, given the number of white isolated pixels up to the pixel 1905 as M, two isolated pixels exist between the pixel 1905 and Pixel 1902. Therefore, the number of white isolated pixels becomes M+2 for the pixel 1902.

The isolated pixels are often observed when any acute brightness change takes place in an image, and the isolated pixels appear conspicuously in a recording medium having a higher smoothness and smaller cycle of irregularities (or unevenness), such as a glossy sheet or a glossy film. Therefore, the number of isolated pixels becomes larger accordingly. On the contrary, in a recording medium indicating moderate changes in undulations, such a plain sheet, the pixels having the same value (black pixels, for instance) continue, and the number of isolated pixels becomes smaller.

In accordance with the present invention, the two kinds of characteristics of the surface of recording medium are obtained as parameters, and on the basis of such parameters, the kind of recording medium are discriminated. In accordance with the brightness obtained by means of the aforesaid statistical process, it is possible to obtain the characteristic as to the magnitude of irregularities on the surface of recording medium as in the first embodiment. Also, in accordance with the isolated pixel numbers corresponding to the changes in brightness information along the arrangement of continuous pixels, it is possible to obtain the characteristics as to the cycle of irregularities on the surface of recording medium. Hereunder, the description will be made of the structure for discriminating the kind of recording medium on the basis of these two characteristic points, that is, the magnitude of irregularities on the surface of recording medium is used as the indication of surface roughness, and the cycle of irregularities on the surface of recording medium is used as the indication of surface configuration.

Figure 20:
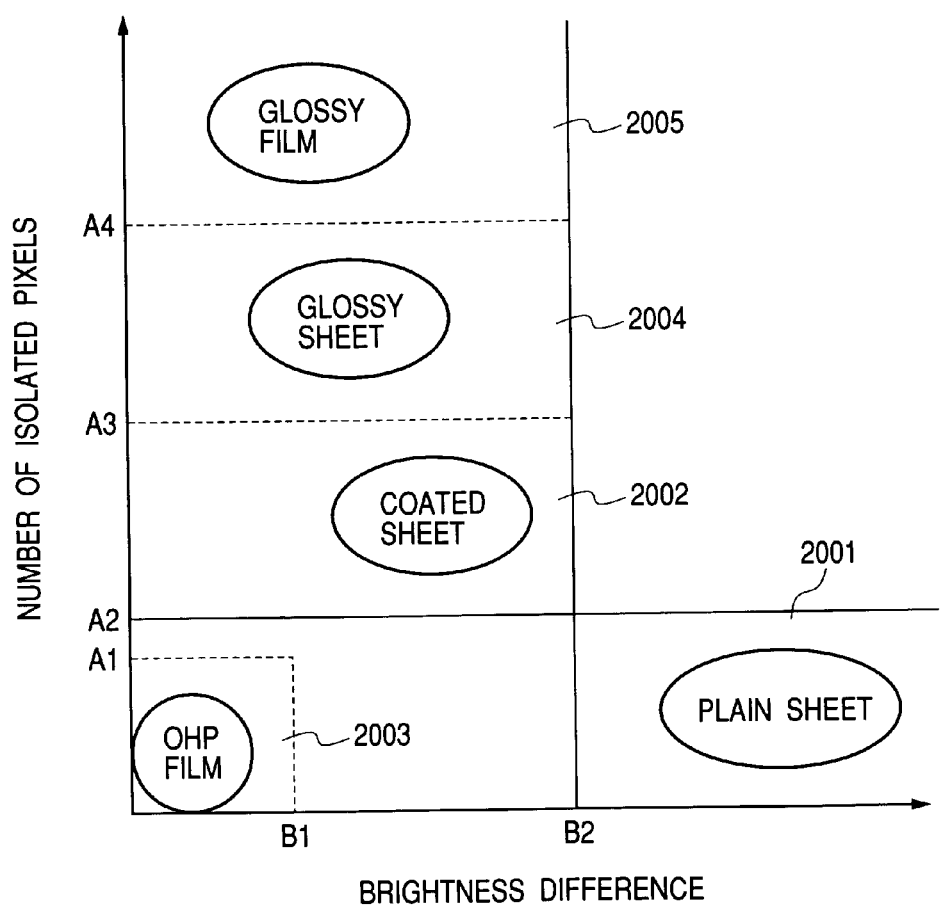
FIG. 20 is a discriminating map that shows the relations between each kind of recording medium, the number of isolated pixels, and the brightness difference in accordance with the third embodiment.

FIG. 20 is a discriminating map that shows the relations between each recording medium, the number of isolated pixels, and the brightness difference.

The values indicated at reference marks A1 to A4, and B1 and B2 shown in FIG. 20 are the discriminating parameters 1808 shown in FIG. 18. In FIG. 20, each elliptical area indicates the aggregate of resultant points of measurement, and then, on the basis thereof, the discriminating areas are divided as shown in FIG. 20.

A reference numeral 2001 designates an area, which should be discriminated as that of a plain sheet; 2002, an area, which should be discriminated as that of a coated sheet for ink jet use; 2003, an area, which should be discriminated as that of an OHP film; 2004, an area, which should be discriminated as that of a glossy sheet; and 2005, an area, which should be discriminated as that of a glossy film.

The relations between each kind of recording medium, the number of isolated pixels, and the brightness difference are summarized as shown in

TABLE 4

|  | Plain sheet (a) | Coated sheet (b) | Glossy sheet (c) | Glossy film (d) | OHP film (e) |
|---|---|---|---|---|---|
| Brightness difference | Large | Medium | Medium | Small | Very small |
| Number of isolated pixels | Small | Medium | Large | Larger than (c) | Almost none |

Like this, the number of isolated pixels indicates the same tendency as the number inversions in the first embodiment or the run-length number of bits in the second embodiment.

As in the cases of the first and second embodiments, the present embodiment is structured to acquire the characteristics of the surface condition of a recording medium from the specific area on the surface of the recording medium, and then, discriminate the kind of recording medium on the basis of such characteristics. With the number of isolated pixels used for discriminating the kind of medium, it becomes possible to produce almost the same effect using the simpler structure and lighter process with respect to the controlling systems than the calculation of number of bits in the run-length coding in accordance with the second embodiment. Also, by use of the number of isolated pixels, it is possible to obtain the same effect with almost the same structure for providing the number of inversions in accordance with the first embodiment. In such case, the discriminating parameters increase by one with the attention given to the respective isolated pixels of black and white.

For the present embodiment, the brightness difference is used as one of parameters for discriminating the kind of recording medium. Here, it may be possible to use the arithmetic mean value (average level), too, which is used for the second embodiment.

Also, for the present embodiment, the discriminating parameters 1808 are used for discriminating the kind of recording medium. It is also possible to obtain the same effect by use of the discriminating table in which the kind of recording medium, the brightness differences, and the number of isolated pixels are coordinated as in the case of the second embodiment.

Fourth Embodiment

Hereunder, with reference to the accompanying drawings, the description will be made of a fourth embodiment of the present invention.

The recording medium-discriminating method that materializes the present embodiment is characterized in that the kind of recording medium are discriminated by use of the brightness difference (the difference between the maximum and minimum brightness values), and the number of inversions of plus/minus signs of brightness difference between adjacent pixels. Therefore, the description will be made centering on such points. The process flow and the flow of discrimination are almost the same as those of the first embodiment. The description thereof will be omitted.

Figure 21:
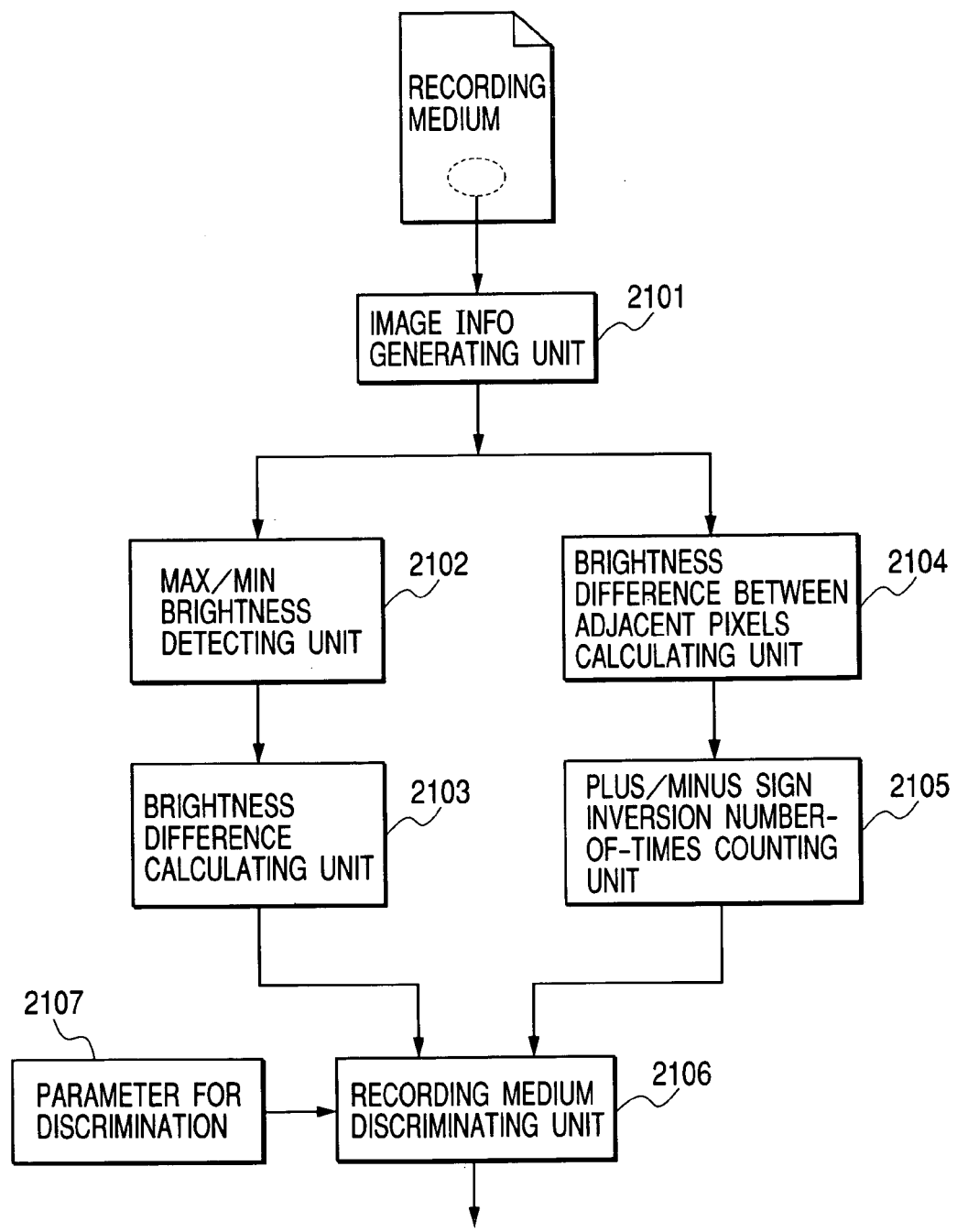
FIG. 21 is a functional block diagram that shows a method for discriminating recording medium in accordance with a fourth embodiment of the present invention.

FIG. 21 is a functional block diagram that shows the recording medium-discriminating method in accordance with the fourth embodiment.

A reference numeral 2101 designates an image information-generating unit that generates image information form any small area on the surface of a recording medium. The process in which the image information is generated from the diffused reflection light component, the prerequisite of each of the pixels that form an image, and the like are the same as those of the first embodiment.

A reference numeral 2102 designates a maximum value/minimum value detecting unit that detects the maximum brightness and minimum brightness, respectively, with reference to the brightness of each pixel of the image information formed by plural pixels obtained by the image information-generating unit 2101; and 2103, the brightness difference-calculating unit that works out the brightness difference, which is the difference between the maximum brightness and the minimum brightness obtained by the maximum value/minimum value detecting unit 2102.

A reference numeral 2104 designates a calculating unit for the brightness difference between adjacent pixels works out the brightness difference between each of adjacent pixels from the image information obtained by the image information-generating unit 2101. The detailed contents of the calculating unit for brightness difference between adjacent pixels will be described later in conjunction with FIG. 22. A reference numeral 2105 designates the plus/minus signs inversion-calculating unit that grasps the codes of brightness difference obtained by the calculating unit for brightness difference between adjacent pixels 2104, and adds the number of inversions if such codes change from the positive to the negative or the negative to the positive. The detailed contents of the plus/minus signs inversion-calculating unit will be described later in conjunction with FIG. 22.

A reference numeral 2106 designates a kind of recording medium-discriminating unit that discriminates the kind of recording medium. The kind of recording medium are discriminated in accordance with the brightness difference obtained by the brightness difference-calculating unit 2103, and the number of plus/minus sign inversions obtained by the plus/minus sign inversion number-calculating unit 2105. The kind of recording medium are discriminated using discriminating parameters 2107 induced from the discriminating map that shows in advance the relations between various kinds of recording medium, the brightness differences, and the number of plus/minus sign inversions; 2107, the parameters used by the kind of recording medium-discriminating unit 2106 for discriminating them, which are threshold values determined by the distribution that each kind of recording medium is able to take.

As described above, the number of plus/minus sign inversions is calculated from any small area of the image information on the surface of a recording medium. The structure and flow are arranged to discriminate the kind of recording medium on the basis of the characteristics thereof.

Figure 22:
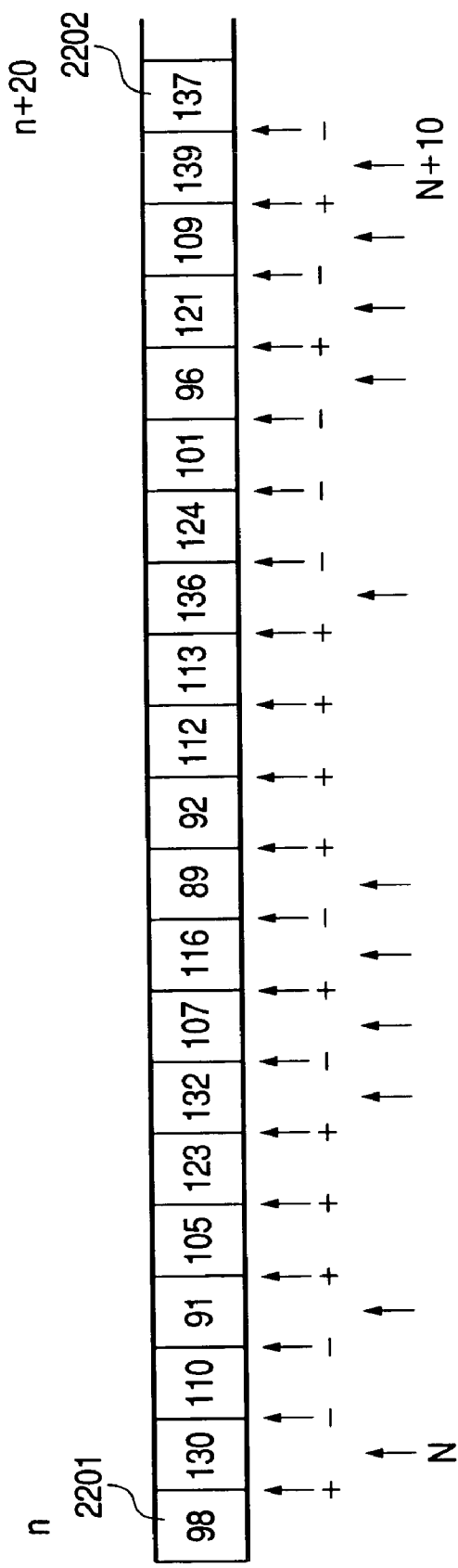
FIG. 22 is a view that illustrates the number of inversions of plus/minus signs for the brightness difference between adjacent pixels in accordance with the fourth embodiment.

FIG. 22 is a view that illustrates the calculating unit for the brightness difference between adjacent pixels 2104 shown in FIG. 21, and the number of plus/minus sign inversions of the brightness difference between adjacent pixels in the plus/minus sign inversion number-calculating unit 2105. In FIG. 22, the one-dimensional linear image information is the target image. Then, it is assumed that each of the pixels has the brightness data of 8 bits.

A reference numeral 2201 designates a certain pixel at any position having the brightness of 98. Also, a reference numeral 2202 designates the 20th pixel from the pixel 2201 at any position. This pixel has the brightness of 137.

In the calculating unit 2104 for the bright difference between adjacent pixels shown in FIG. 21 works out the brightness difference with the adjacent pixel on the right side in FIG. 21. Given the brightness of mth pixel as $Y_m$, the brightness of the adjacent m+first pixel as $Y_{m+1}$, the brightness difference between the adjacent pixels becomes $Y_{m+1} - Y_m$. Now, for example, if m=n, the difference between the pixel 2201 and the adjacent pixel on the right side in FIG. 21 (having the brightness of 130) becomes 130−98=+32. Likewise, when calculating the respective brightness differences, the resultant differences become −20, −19, +14, . . . . Then, if attention is given to the signs of brightness differences thus obtained, it is observable that the sign of the brightness difference between the adjacent pixels of the pixel 2201 is plus, and the next one is minus, and then, the next one is also minus, and the next one is plus, . . . . Also, the plus/minus sign inversion number-calculating unit 2105 shown in FIG. 21 works out the number of plus/minus inversions when the sign changes from plus to minus, and also, when the sign changes from minus to plus.

In FIG. 22, the arrows on the upper row indicate the positions of adjacent pixels for which the brightness difference is calculated, and the signs (+, −) given beneath them indicate the respective brightness differences. The arrows on the lower row indicate the respective points at which the signs change from plus to minus or minus to plus.

Now, given the number of inversions of plus and minus signs up to the pixel 2201 as N−1 times, the changes of signs of inversions (11 times) take place between the pixels at 2201 to 2202 as indicated by the arrows on the lower row. Therefore, it becomes possible to obtain the number of inversions of plus and minus signs by adding the numbers indicated by these arrows. In this case, the plus/minus inversion number at the pixel 2202 is N+10 times.

For the present embodiment, the inversion number of plus and minus signs is used as the parameter for discriminating the kind of recording medium on the assumption that each of the pixels has multiply valued data. If the multiply valued data are converted into binary data, there indicated the same tendency as the number of inversions after the execution of binarizing process in accordance with the first embodiment. In other words, the inversion number of plus and minus signs serves as one of the methods for extracting from the image information the indication of changes in undulations, which is one of the characteristics of the surface configuration the image information. When the aforesaid process is executed under condition that the multiply valued data, which is larger than those having binary value, is provided for the operation, it becomes possible to grasp the tendency even for comparatively small changes, which may hardly be recognizable as inversions after the execution of binarizing process.

In accordance with the present invention, two kinds of characteristics on the surface of a recording medium are acquired as parameters, and on the basis of such parameters, the kind of recording medium are discriminated. With the brightness difference, which is made obtainable by means of the aforesaid statistical process, it becomes possible to obtain the characteristics regarding the magnitude of irregularities on the surface of a recording medium as in the first embodiment. Also, in accordance with the number of inversions of plus and minus signs that corresponds to the changes of brightness information along with the arrangement of continuous pixels, it is possible to obtain the cycle of irregularities on the surface of a recording medium. Now, given the magnitude of irregularities of the surface of the recording medium as the surface roughness, and the cycle of irregularities of the surface thereof as the characteristics of the surface configuration, the structure is formed to discriminate the kind of recording medium on the basis of these two points of characteristics, the description of which will be given below.

Figure 23:
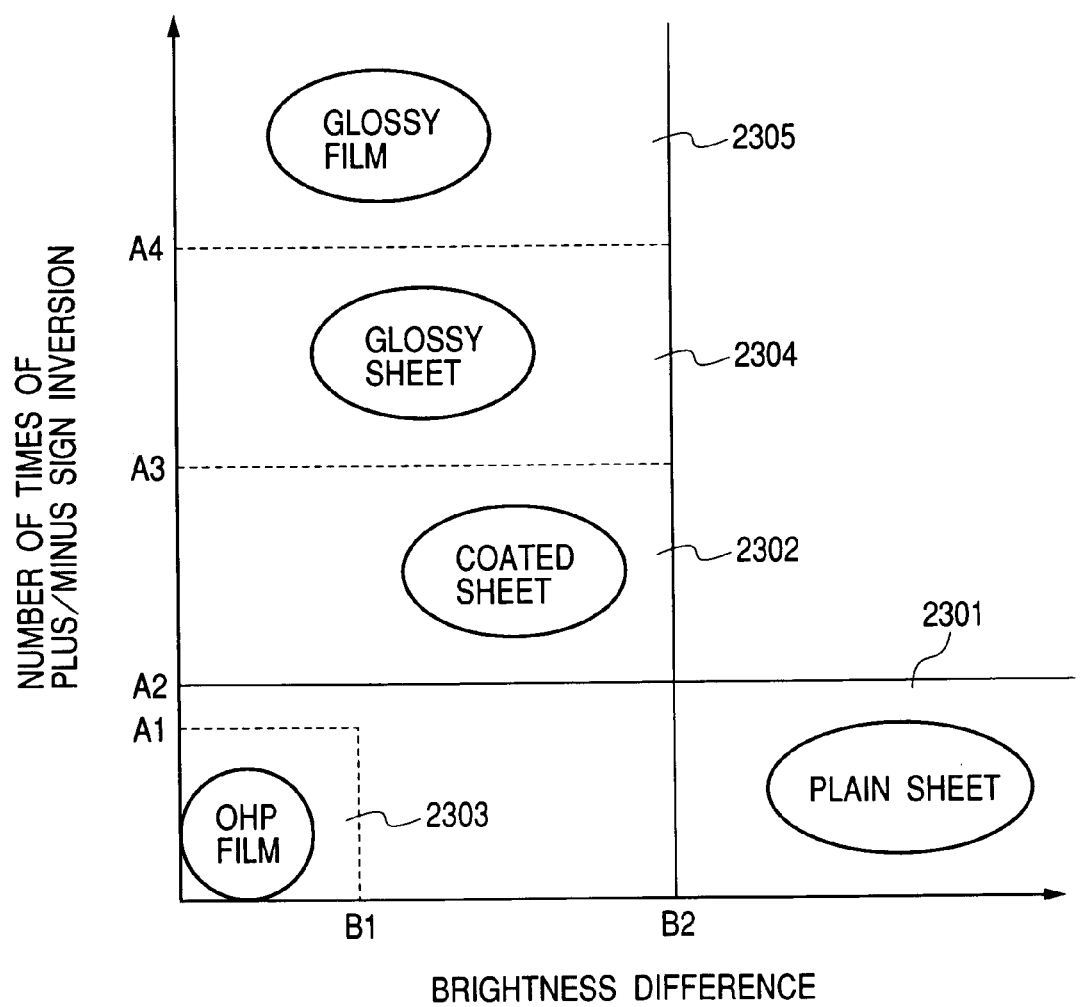
FIG. 23 is a discriminating map that shows the relations between each kind of recording medium, number of inversions plus/minus signs, and brightness difference in accordance with the fourth embodiment.

FIG. 23 is a discriminating map that shows the relations between each recording medium, the number of plus/minus inversions, and the brightness difference. The values indicated at reference marks A1 to A4, and B1 and B2 shown in FIG. 21 are the discriminating parameters 2107 shown in FIG. 23. In FIG. 23, each elliptical area indicates the aggregate of resultant points of measurement, and then, on the basis thereof, the discriminating areas are divided as shown in FIG. 23.

A reference numeral 2301 designates an area, which should be discriminated as that of a plain sheet; 2302, an area, which should be discriminated as that of a coated sheet for ink jet use; 2303, an area, which should be discriminated as that of an OHP film; 2304, an area, which should be discriminated as that of a glossy sheet; and 2305, an area, which should be discriminated as that of a glossy film.

The relations between each kind of recording medium, the number of plus and minus sign inversions, and the brightness difference are summarized in the Table 5 given below.

TABLE 5

|  | Plain sheet (a) | Coated sheet (b) | Glossy sheet (c) | Glossy film (d) | OHP film (e) |
| --- | --- | --- | --- | --- | --- |
| Brightness difference | Large | Medium | Medium | Small | Very small |

TABLE 5-continued

|  | Plain sheet (a) | Coated sheet (b) | Glossy sheet (c) | Glossy film (d) | OHP film (e) |
|---|---|---|---|---|---|
| Number of plus/minus inversions | Small | Medium | Large | Larger than (c) | Almost none |

Like this, it is readily understandable that the number of plus and minus sign inversions indicates the same tendency as the number of inversions after the execution of binarizing process in accordance with the first embodiment, the run-length number of bits in accordance with the second embodiment, and the number of isolated pixels in accordance with the third embodiment.

For the present embodiment, too, it is arranged to obtain as in the cases of the first, second, and third embodiments the characteristics of the surface condition from an image in a specific area on the surface of a recording medium, and then, to discriminate the kind of recording medium on the basis of such characteristics. For the present embodiment, the number of plus and minus sign inversions is used when discriminating the kind of recording medium, This number of inversions can be used as the indication of smaller changes in brightness than the cases where each of the parameters, such as the number of inversions extracted after the execution of binarizing process, is used for the first to third embodiments.

Also, for the present embodiment, the brightness difference is used as one of parameters for discriminating the kind of recording medium. Here, it is possible to use the arithmetic mean value (average level) used in accordance with the second embodiment.

For the present embodiment, the discriminating parameters 2108 are used for discriminating the kind of recording medium. However, it is still possible to obtain the same effect by use of a discriminating table on which it is arranged to coordinate the kind of recording medium, the brightness differences, and the number of plus and minus sign inversions as in the case of the second embodiment.

Also, for the present embodiment, the number of plus and minus sign inversions is defined to be the one where the number of times for the changes from plus to minis and that for the changes from minus to plus are added. Here, it is still possible to obtain the same effect even with the number of times for the changes from plus to minus or the changes from minus to plus.

Further, for the present embodiment, the brightness difference between adjacent pixels is worked out, and the respective signs are given depending on the brightness difference. Here, it may be possible to absorb the variations or errors at the time of generating image information by setting threshold value when giving the respective signs in accordance with the brightness difference, that is, by the same process as to adjust sensitivity.

Fifth Embodiment

Hereunder, with reference to the accompanying drawings, the description will be made of a fifth embodiment of the present invention.

The recording medium-discriminating method that materializes the present embodiment is characterized in that the kind of recording medium are discriminated by use of the number of peak pixels in a histogram. Therefore, the description will be made centering on such point.

Figure 24:
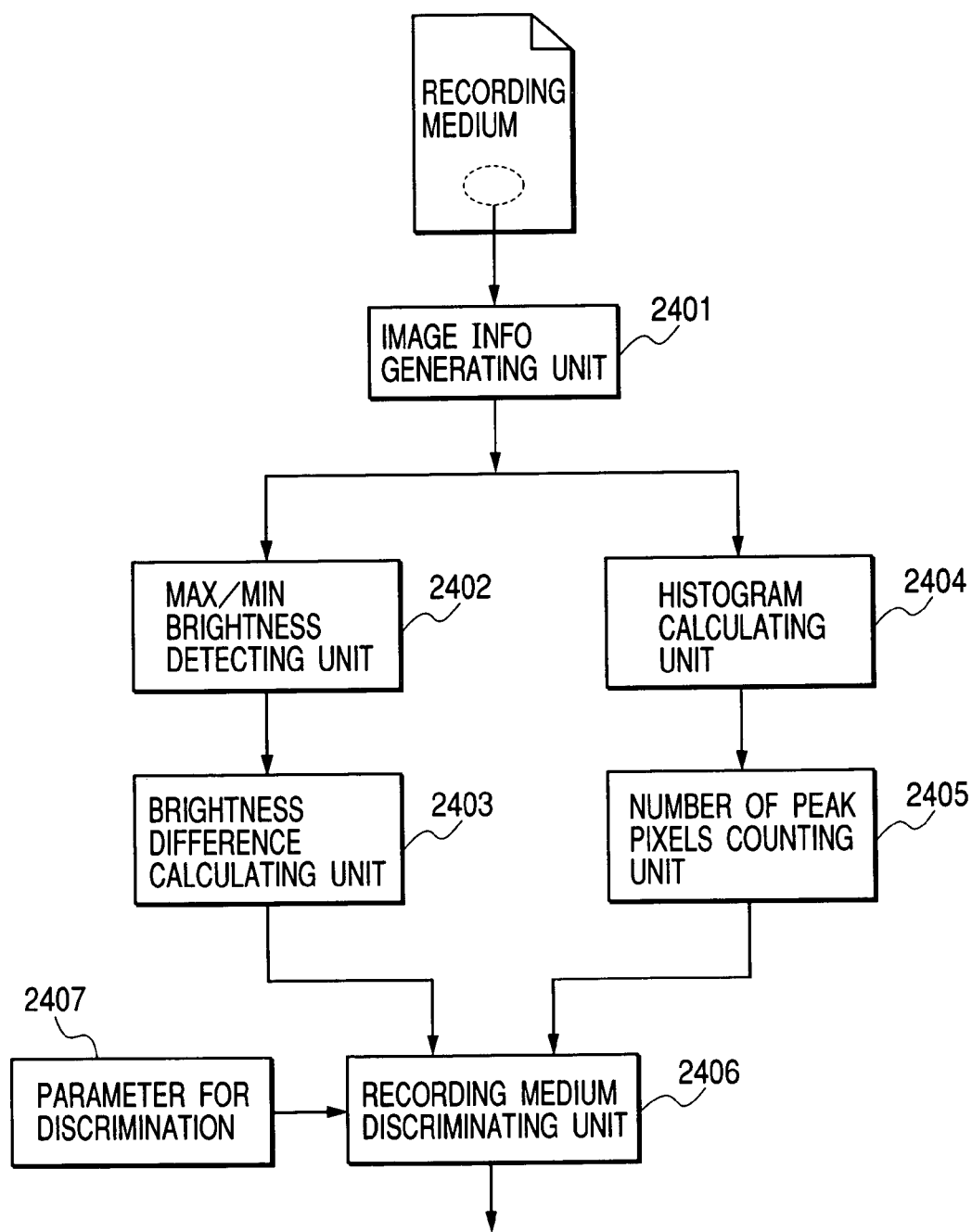
FIG. 24 is a functional block diagram that shows a method for discriminating recording medium in accordance with a fifth embodiment of the present invention.

FIG. 24 is a functional block diagram that shows the recording medium-discriminating method in accordance with the fifth embodiment.

A reference numeral 2401 designates an image information-generating unit that generates image information form any small area on the surface of a recording medium. The process in which the image information is generated from the diffused reflection light component, the prerequisite of each of the pixels that form an image, and the like are the same as those of the first embodiment.

A reference numeral 2402 designates a maximum value/minimum value detecting unit that detects the maximum brightness and minimum brightness, respectively, with reference to the brightness of each pixel of the image information formed by plural pixels obtained by the image information-generating unit 2401; and 2403, a brightness difference-calculating unit that works out the brightness difference, which is the difference between the maximum brightness and the minimum brightness obtained by the maximum value/minimum value detecting unit 2402.

A reference numeral 2404 designates a histogram-calculating unit that acquires a histogram from the image information formed by plural pixels obtained by the image information-generating unit 2401. The detailed contents of the histogram-calculating unit 2404 will be described later in conjunction with FIG. 25. A reference numeral 2405 designates a peak pixel number-calculating unit that works out the number of pixels at the peak by detecting the brightness at the peak of the histogram acquired by the histogram-calculating unit 2404 (that is, the brightness at the point having the largest number of pixels of the same brightness). The detailed contents of the peak pixel number-calculating unit 2405 will be described later in conjunction with FIG. 25.

A reference numeral 2406 designates a kind of recording medium-discriminating unit that discriminates the kind of recording medium. The kind of recording medium are discriminated by use of the brightness difference obtained by the brightness difference-calculating unit 2403, and the number of peak pixels obtained by the peak pixel number-calculating unit 2405. For discriminating the kind of recording medium, the discriminating parameters 2407 are used, which are induced from the discriminating map having the relations between various kinds of recording medium, the brightness differences, and the number of peak pixels indicated in advance; and 2407, the discriminating parameters used by the kind of recording medium-discriminating unit 2406 when discriminating the kind of recording medium, which are threshold values determined by the distribution each kind of recording medium is able to take.

As described above, the brightness difference and the number of peak pixels are worked out from the image information of any small area on the surface of a recording medium, and the structure and flow are arranged to discriminate the kind of recording medium on the bases thereof.

Figure 25:
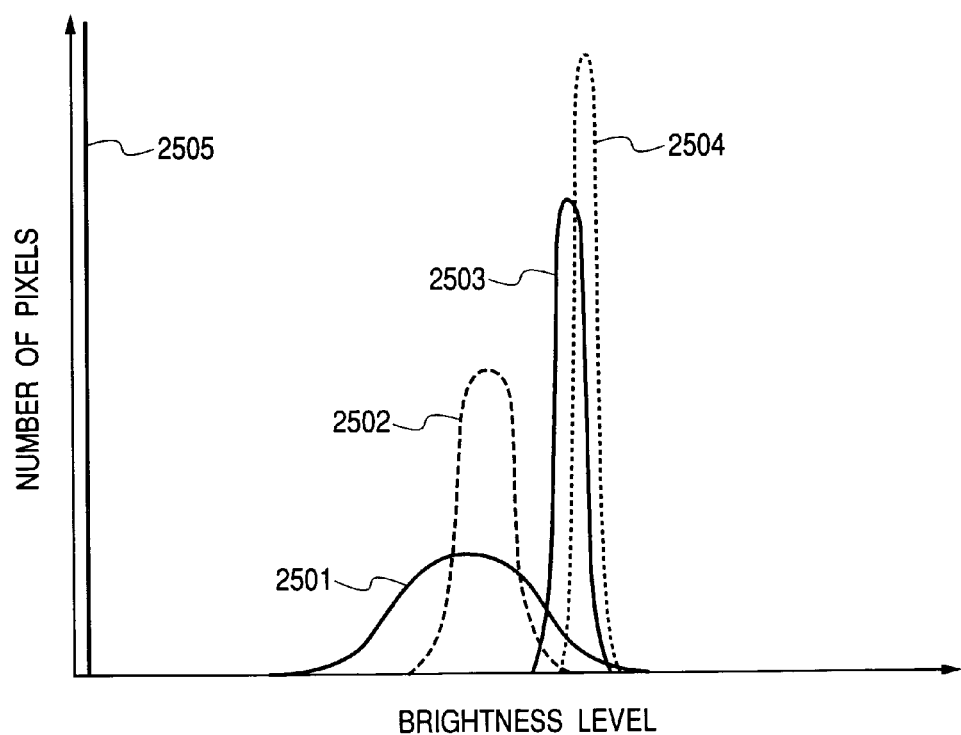
FIG. 25 is a histogram that shows each kind of recording medium in accordance with the fifth embodiment.

FIG. 25 is the histogram of each kind of recording medium. The axis of abscissa indicates brightness level, and the axis of ordinate indicates the pixel numbers having the brightness level thus indicated. The histogram shown in FIG. 25 is prepared by accumulating the number of pixels having specific brightness by the histogram-calculating unit 2404 in accordance with the image information obtained by the image information-generating unit 2401.

A reference numeral 2501 designates a histogram of a plain sheet; 2502, that of a coated sheet for ink jet use; 2503, that of a glossy sheet; 2504, that of a glossy film, and 2505, that of an OHP film.

In accordance with the present invention, the two kinds of characteristics of the surface of recording medium are obtained as parameters, and on the basis of such parameters, the kind of recording medium are discriminated. In accordance with the brightness and the number of peak pixels obtained by means of the aforesaid statistical process, it is possible to obtain the characteristic as to the magnitude and degree of irregularity on the surface of recording medium. Now, hereunder, the description will be made of the structure of discriminating the kind of recording medium, which is arranged on the basis of these characteristics.

Here, the brief description will be made of the relations between the currently targeted-five kinds of recording medium, and the histogram.

The plain sheet has a large magnitude of irregularities, which appears also as the difference between darkness and lightness serving as the image information. As shown in FIG. 25, the histogram 2501 indicates the distribution that has a wide width. As a result, as compared with other kinds of recording medium, the number of peak pixels of this kind of recording medium is small. Also, there is a tendency that the brightness at the peak indicates a smaller value. This is because the brightness at the peak tends to be almost the same as the whiteness of the recording medium.

The coated sheet for ink jet use has a smaller magnitude of irregularities than that of the plain sheet. Therefore, the wide of distribution of the histogram is narrower than that of the plain sheet. The number of peak pixels becomes larger than that of the plain sheet to that extent. Also, the brightness at the peak often indicates almost the same value as that of the plan sheet.

The glossy sheet has a still narrower width of histogram distribution than that of the coated sheet for ink jet use, and the number of peak pixels is large. Also, the brightness at the peak is larger than that of the plain sheet and coated sheet for ink jet use.

The glossy film has almost the same tendency as the glossy sheet, but the wide of histogram distribution is narrower and the number of pixels is larger.

The OHP film is formed by almost the same brightness, and the width of histogram distribution is extremely narrow. The number of peak pixels becomes the largest among the target kinds of recording medium. There is a tendency that the brightness thereof at the peak indicates the smallest value.

Figure 26:
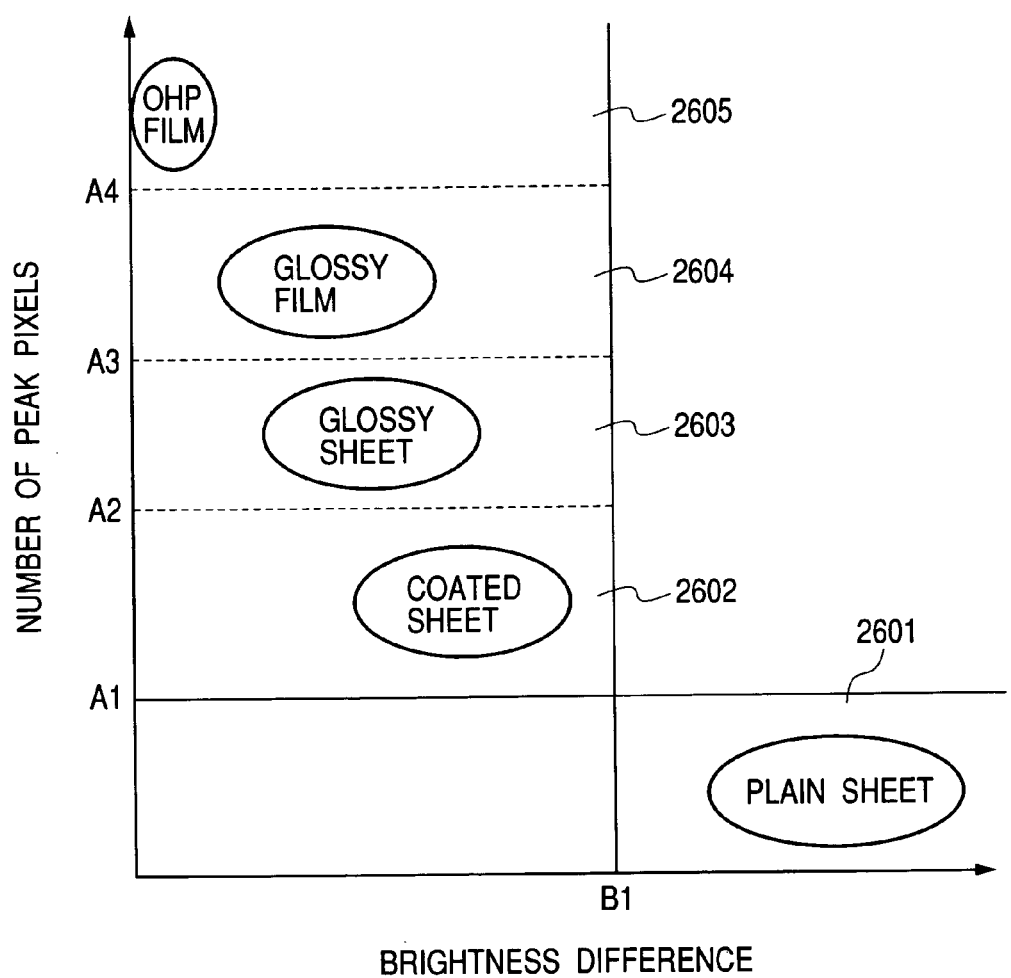
FIG. 26 is a discriminating map that shows the relations between each kind of recording medium, the number of peak pixels, and the brightness difference in accordance with the fifth embodiment.

FIG. 26 is the discriminating map that indicates the relations between each kind of recording medium, the number of peak pixels, and the brightness differences. Each elliptical area shown in FIG. 26 indicates the aggregate of resultant points of measurement, and then, on the basis thereof, the discriminating areas are divided as shown in FIG. 26.

A reference numeral 2601 designates an area, which should be discriminated as that of a plain sheet; 2602, an area, which should be discriminated as that of a coated sheet for ink jet use; 2603, an area, which should be discriminated as that of a gloss sheet; 2604, an area, which should be discriminated as that of a glossy film; and 2605, an area, which should be discriminated as that of an OHP film.

The relations between each kind of recording medium, the number of peak pixels, and brightness differences are summarized as shown in Table 6.

TABLE 6

| | Plain sheet (a) | Coated sheet (b) | Glossy sheet (c) | Glossy film (d) | OHP film (e) |
| --- | --- | --- | --- | --- | --- |
| Brightness difference | Large | Medium | Medium | Small | Very small |
| Number of peak pixels | Small | Medium | Large | Larger than (c) | Larger than (d) |

Figure 27:
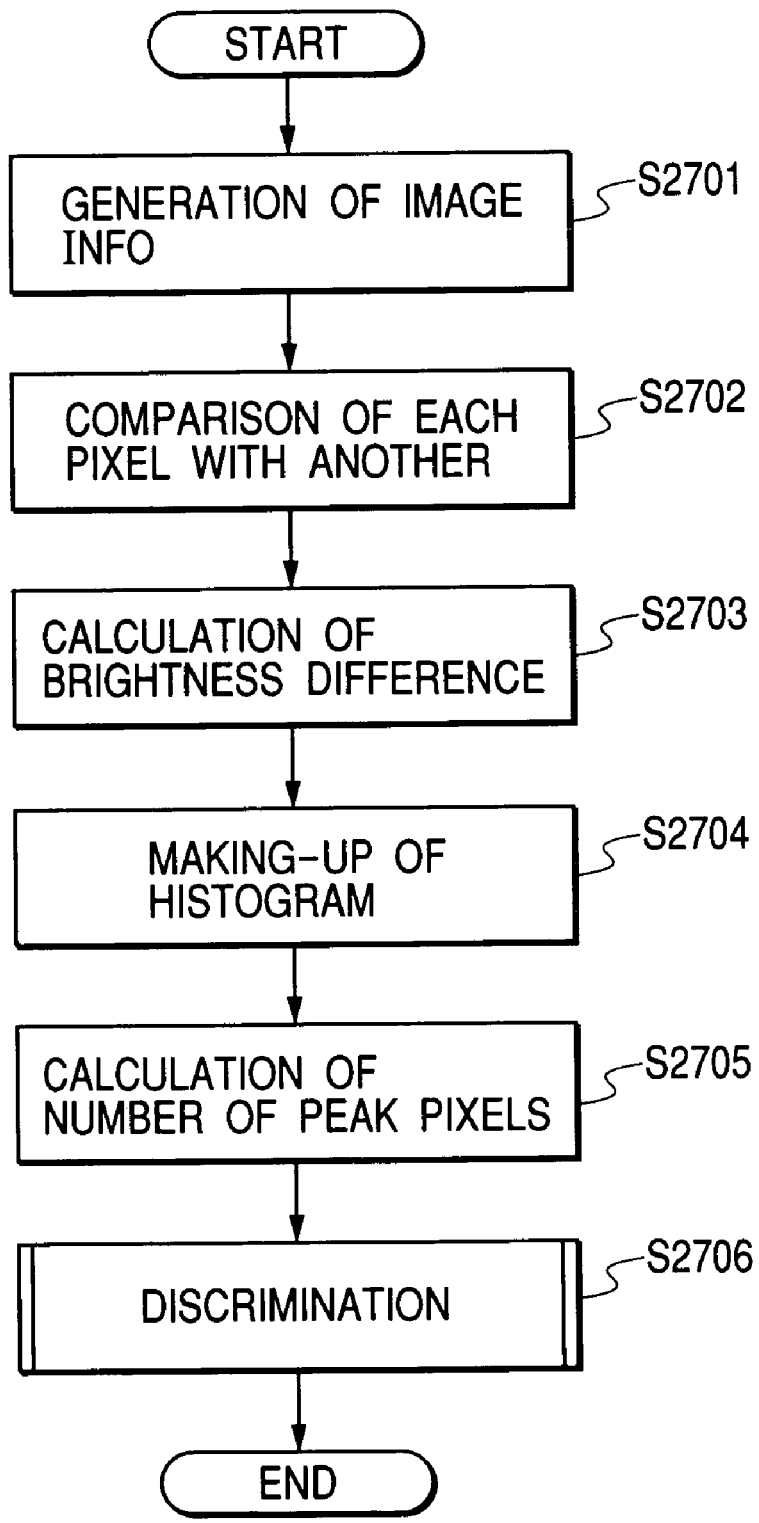
FIG. 27 is a flowchart that shows the process flow of discriminating the kind of recording medium in accordance with the fifth embodiment.

FIG. 27 is a flowchart that shows the flow of process for discriminating the kind of recording medium.

In step 2701, the image information is generated. In step 2702, comparison of the brightness is made for each pixel in accordance with the image information obtained in the step 2701. More specifically, the maximum value and the minimum value of brightness are detected, respectively. In step 2703, calculation is made to obtain the brightness difference between the maximum and minimum values of brightness obtained in the step 2702. In step 2704, the histogram is prepared in accordance with the image information obtained in the step 2701. In step 2705, the brightness at the peak is detected from the histogram prepared in the step 2704, and the number of peak pixels is worked out with the brightness thus detected. In step 2706, the kind of recording medium are discriminated in accordance with the brightness difference, which is the characteristic amount obtained in the step 2703, and the number of peak pixels, which is the characteristic amount obtained in the step 2705. In this respect, in the step 2702 and the step 2703, the brightness difference is worked out. Here, it may be possible to calculate the distribution width from the histogram prepared in the step 2704, and use such distribution wide as the brightness difference.

Figure 28:
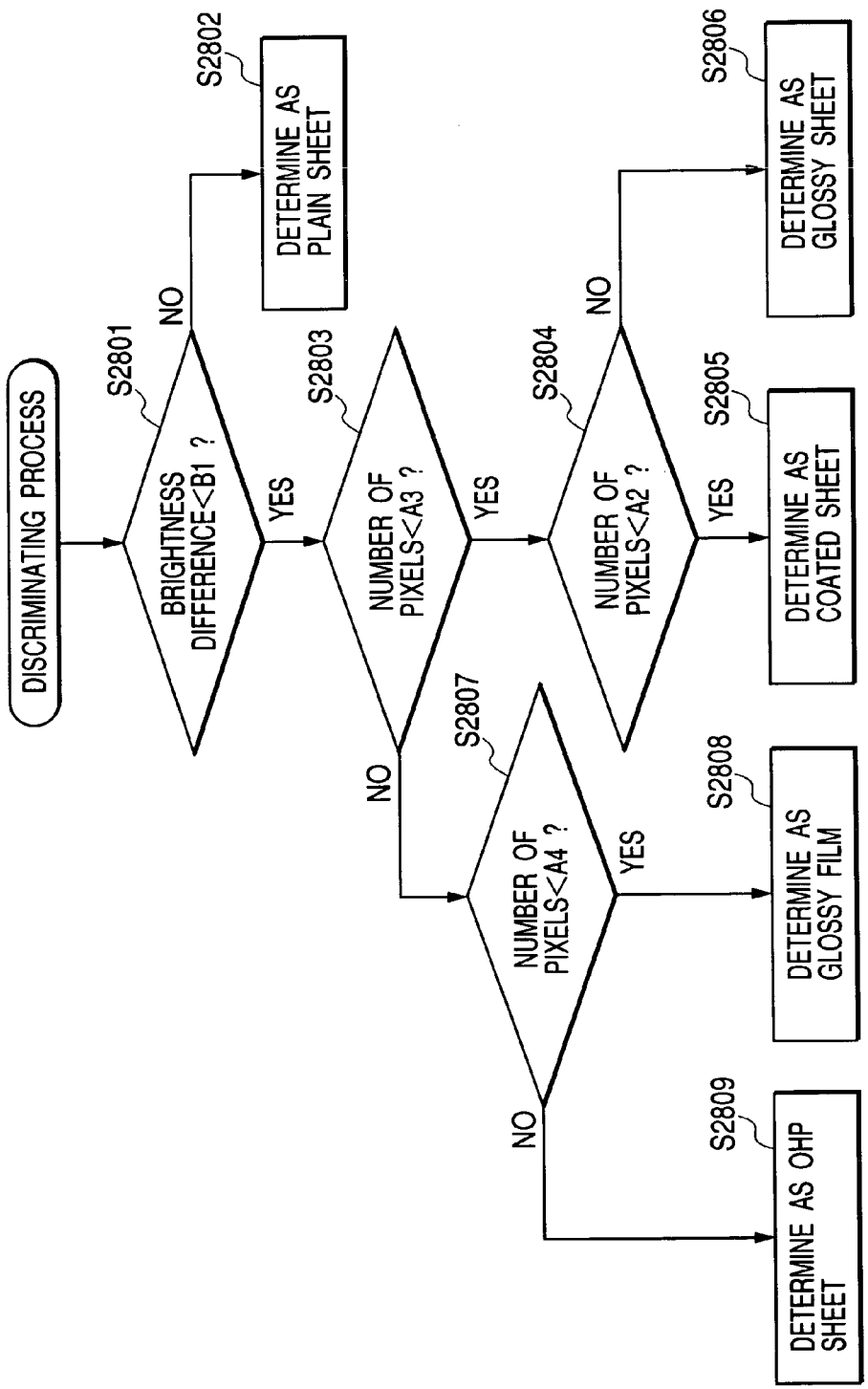
FIG. 28 is a flowchart that shows the flow of discriminating recording medium in accordance with the fifth embodiment.

FIG. 28 is a flowchart that shows the flow of discriminating the kind of recording medium in the step 2706 in FIG. 27.

With the two parameters obtained on the basis of the discriminating map shown in FIG. 26, the discrimination is made as given below. In this respect, it is assumed that the values, A1, A2, A3, A4, and B1, which are used for illustration, have the following relations: The B1 indicates the value of brightness difference. The A1, A2, A3, and A4 indicate the number of peak pixels, respectively, having the relations of A1<A2<A3<A4, respectively.

In step 2801, it is determined whether or not the brightness difference is smaller than the B1. If it is smaller, the process proceeds to step 2803. If not, the process proceeds to step 2802 accordingly.

In the step 2802, with the brightness difference being equal or larger than that of the B1, the kind of the recording medium is determined to be a plan sheet. Here, if attention is given only to the number of peak pixels, it is possible to determine whether or not the kind of recording medium is a plane sheet by examining at first whether or not such number is smaller than the A1.

In the step 2803, it is determined whether or not the number of peak pixels is smaller than the A3. If affirmative, the process proceeds to step 2804. If negative, the process proceeds to step 2807 accordingly.

In the step 2804, it is determined whether or not the number of peak pixels smaller than the A2. If affirmative, the process proceeds to step 2805. If negative, it proceeds to step 2806 accordingly.

In the step 2805, the kind of the recording medium is determined to be a coated film for ink jet use. In the step 2806, the kind of the recording medium is determined to be a glossy sheet.

In the step 2807, it is determined whether or not the number of peak pixels is smaller than the A4. If it is smaller than the A4, the process proceeds to step 2808, otherwise to step 2809 accordingly.

In the step 2808, the kind of the recording medium is determined to be a glossy film. In the step 2809, the kind of recording medium is determined to be an OHP film.

With respect to the areas shown in FIG. 26, which are not allocated to any specific kind of recording medium, where the brightness difference is smaller than the B1, and the number of peak pixels is smaller and the A1, for example, it is determined in the flowchart shown in FIG. 28 that such areas indicate the coated sheet for ink jet use. However, it may be possible to determine that there is no medium present on either of them, and execute again the process for discriminating the kind of recording medium, or the process that returns error indicating the absence of any corresponding recording medium, and then, the structure is arranged to notify the user accordingly through the error message indicated on the screen of a display.

The present embodiment is also structured as the first, second, third, and fourth embodiments to acquire the characteristics the indicate the surface condition of a recording medium from the specific area on the surface of the recording medium for the discrimination of the kind thereof on the basis of such characteristics. When discriminating the kind of recording medium, the number of peak pixels of the histogram, which is generated from the image information, is used to make it possible to discriminate the kind of recording medium only by this parameter. Also, with the distribution width (having the same meaning as the brightness difference) obtainable when preparing the histogram, and some other parameter, such as brightness at the peak, the parameters usable for the discrimination increase. Therefore, it becomes possible to implement the discrimination in higher precision.

For the present embodiment, the number of pixels is worked out with the brightness at the peak as the number of peak pixels. However, it may be possible to obtain the total pixel number including the number of pixels at the brightness around the peak. In this case, the effect of suppressing variations is made obtainable. Also, it may be possible to obtain some other tendency to use the characteristics thereof for the discrimination.

Also, for the present embodiment, the discriminating parameters 2407 are used for discriminating the kind of recording medium. However, as in the second embodiment, it is possible to obtain the same effect by use of the discriminating table having the kind of recording medium, the brightness differences, and the number of peak pixels in histogram coordinated thereon.

Sixth Embodiment

Hereunder, with reference to the accompanying drawings, the detailed description will be made of a sixth embodiment that materializes the present invention.

Figure 29:
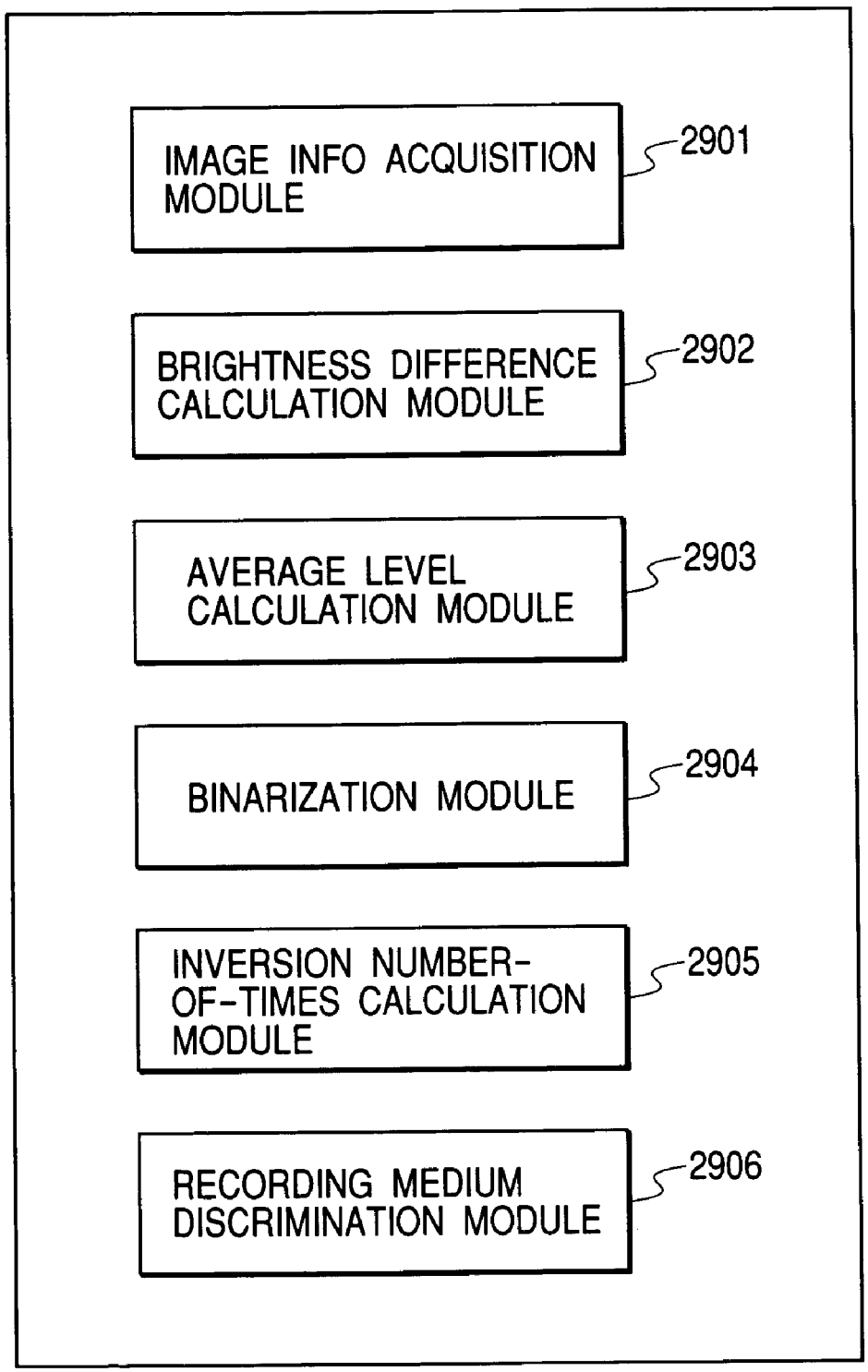
FIG. 29 is a view that shows the memory map of a storage medium in accordance with a sixth embodiment of the present invention.

FIG. 29 is a view that shows the memory map of a storage medium in accordance with the sixth embodiment.

In accordance with the present embodiment, the storage medium, which stores the programming codes of software for the implementation of the functions of each of the aforesaid embodiments, is supplied to a system or an apparatus, and then, the computer (or CPU or MPU) of the system or the apparatus reads out the programming codes stored on the storage medium for the execution thereof. In this way, the discrimination of the kind of recording medium is made possible. In this case, the programming codes themselves, which are read out from the storage medium, implement the functions of the aforesaid embodiments, and the storage medium that stores such programming codes embodies the present invention.

As the storage media capable of storing the programming codes, there are applicable, for example, magnetic disc such as FD (floppy (R) disc) and hard disc; optical disc such as CD-ROM, CR-R, CD-RW, DVD-RAM, DVD-R, DVD+R, DVD+RW, and others; magneto-optic disc such as MO; magnetic tape; non-volatile memory card such as flash memory; ROM and the like.

Also, with the execution of the programming codes read out by the computer, not only the functions of the aforesaid embodiments are implemented, but also, the OS (operating system) and others, which operate on the computer in accordance with the commands of the programming codes, are enabled to carry out the actual process partly or totally. There is also included the case where the functions of the aforesaid embodiments are implemented by the process thus carried out.

Further, the programming codes read out form the storage medium are written on the memory provided for the feature expansion board inserted into the computer or the feature expansion unit connected with the computer, and then, the CPU or the like provided for the feature expansion board or the feature expansion unit carries out the actual process partly or totally. There is also included also the cases where the functions of the aforesaid embodiments are implemented by the process thus carried out.

When the present invention is applied to the aforesaid storage medium, the programming codes, which correspond to each of the flowchart that shows the flow of discriminating process of the kind of recording medium represented in FIG. 7, FIG. 16, and FIG. 27, respectively, are stored on the storage medium. Now, the basis of the flowchart shown in FIG. 7 in accordance with the first embodiment, this arrangement will be described briefly. Here, each of the modules indicated on the memory may shown in FIG. 29 is stored on the storage medium. In other words, it should be good enough if each of the programming codes of at least an image information-acquisition module 2901, a brightness difference-calculation module 2902, an average level-calculation module 2903, a binarization module 2904, a number of inversions-calculation module (or inversion number-of-times calculation module) 2905, and the recording medium-discrimination module 2906 is stored on the storage medium. Also, corresponding to each of the aforesaid other embodiments, it is possible to replace the number of inversions-calculation module 2905 with the run-length number of bits-calculation module or the number of isolated pixels-calculation module. Further, the binarization module 2904 and the number of inversions-calculation module 2905 can also be replaced with the number of plus/minus sign inversions-calculation module or the number of peak pixels-calculation module.

As described above, even if the structures for implementing the functions are the storage medium having the programming codes capable of being read out by a computer, and the software, which is the programming codes themselves, it is possible to acquire the characteristics that indicate the surface condition of a recording medium from the specific area on the surface of the target recording medium, and discriminate the kind of recording medium in high precision on the basis of the characteristics thus acquired.

Other Embodiment

Hereunder, the other embodiment that materializes the present invention will be described.

For the present invention, the image information on the surface of recording medium is generated. Then, it is described that such image may be either one-dimensional or two-dimensional without any problem. However, for the aforesaid embodiments, the description has been made on the assumption that the parameters for use of discriminating the kind of recording medium are extracted from a one-dimensional image. Now, therefore, the brief description will be made of the processing method when the two-dimensional image information is generated by use of an area sensor or the like.

Figure 30:
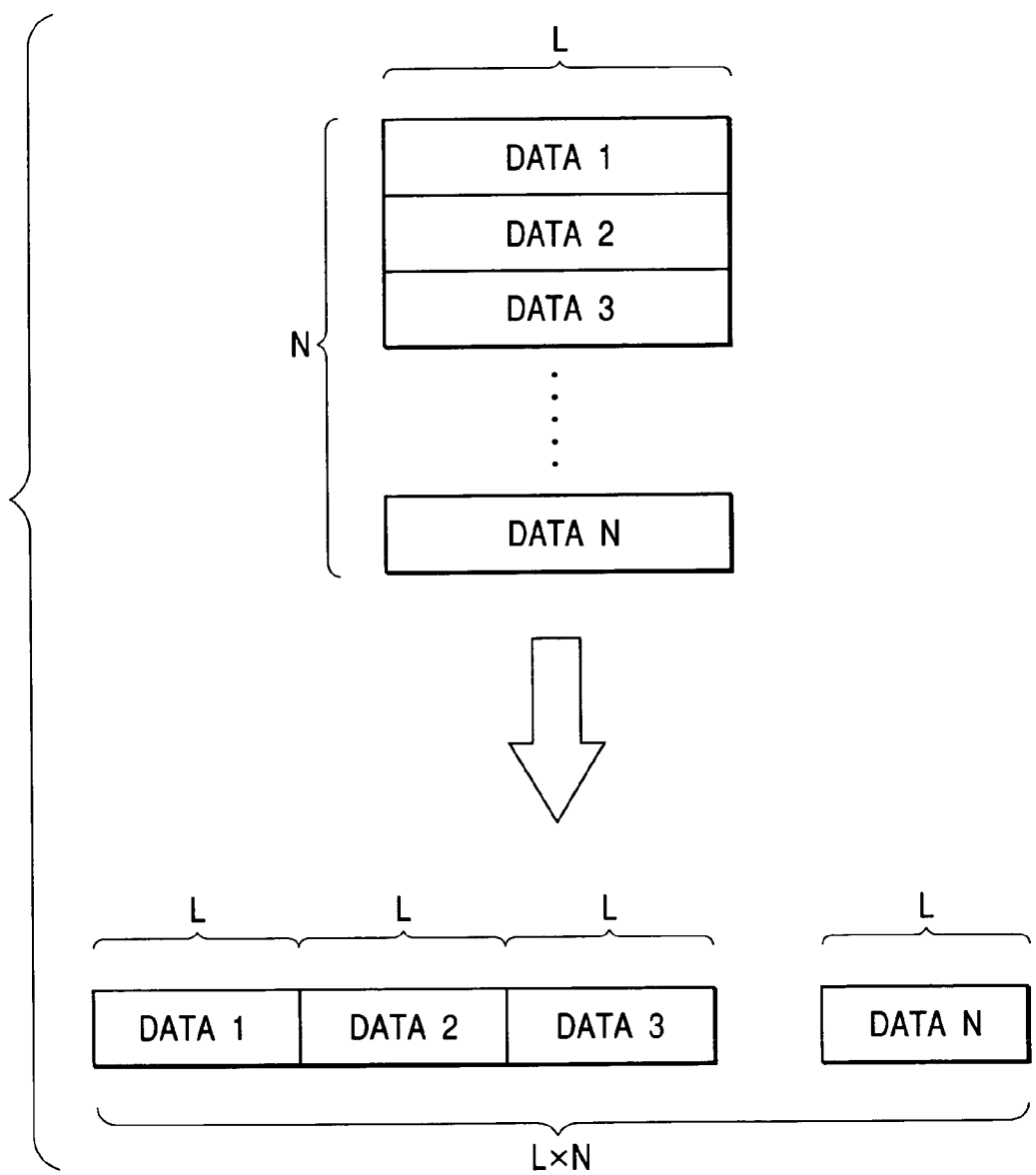
FIG. 30 is a view that shows the conversion of the two-dimensional information to the one-dimensional information in accordance with another embodiment.
Figure 31:
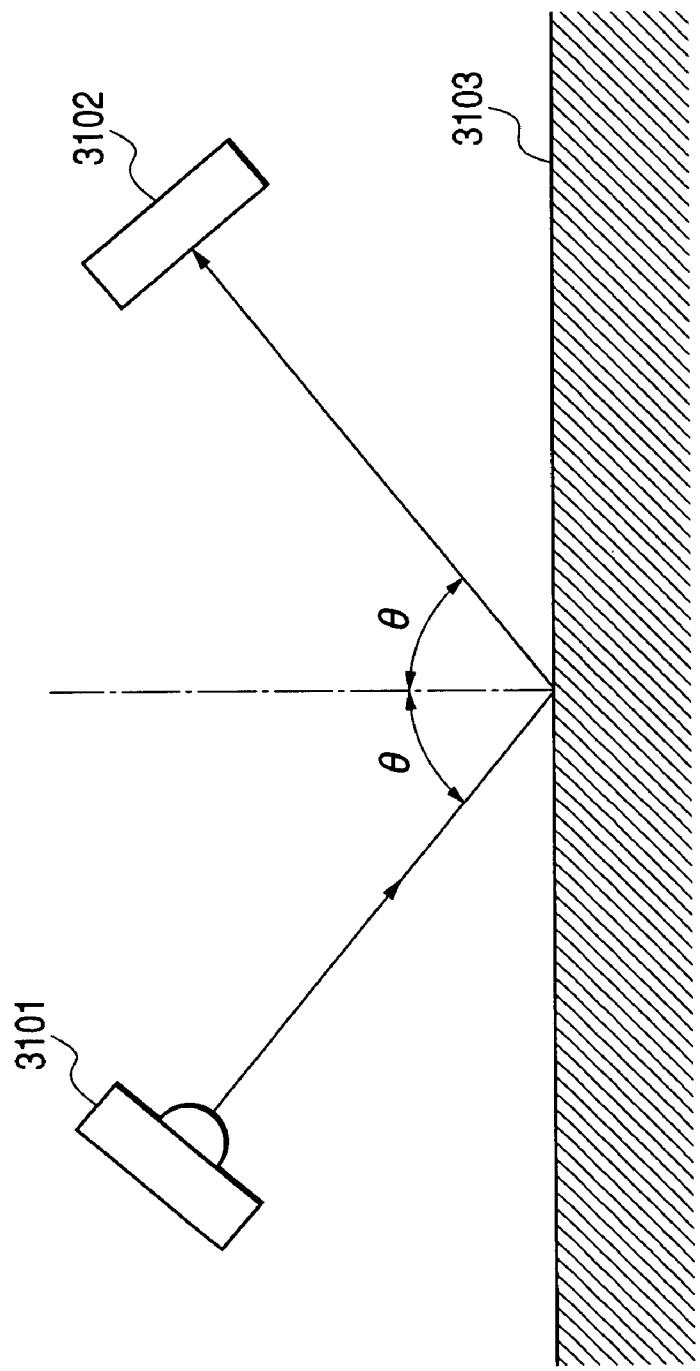
FIG. 31 is a view that schematically shows a sensor structure in accordance with the conventional embodiment.
Figure 32:
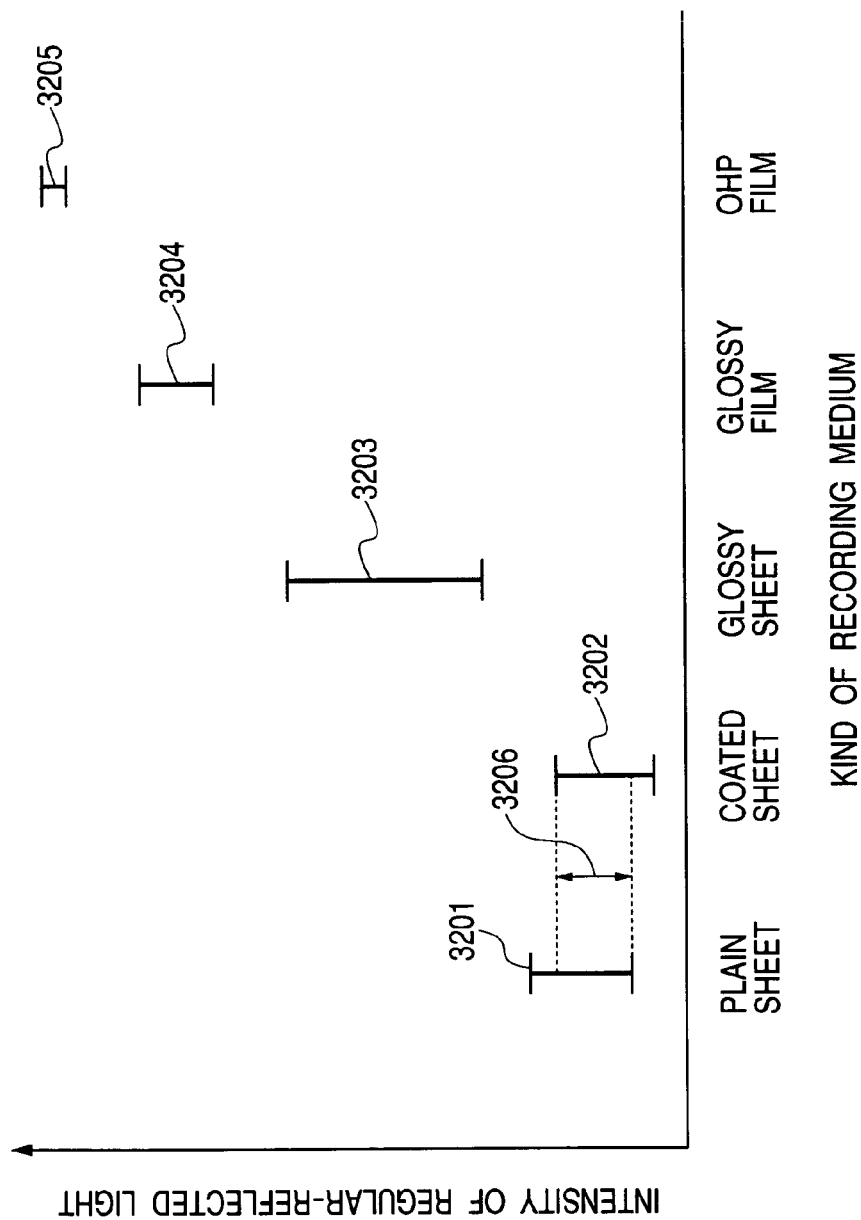
FIG. 32 is a view that shows the relations between each kind of recording medium and the intensity of regularly reflected light in accordance with the conventional embodiment.
Figure 33:
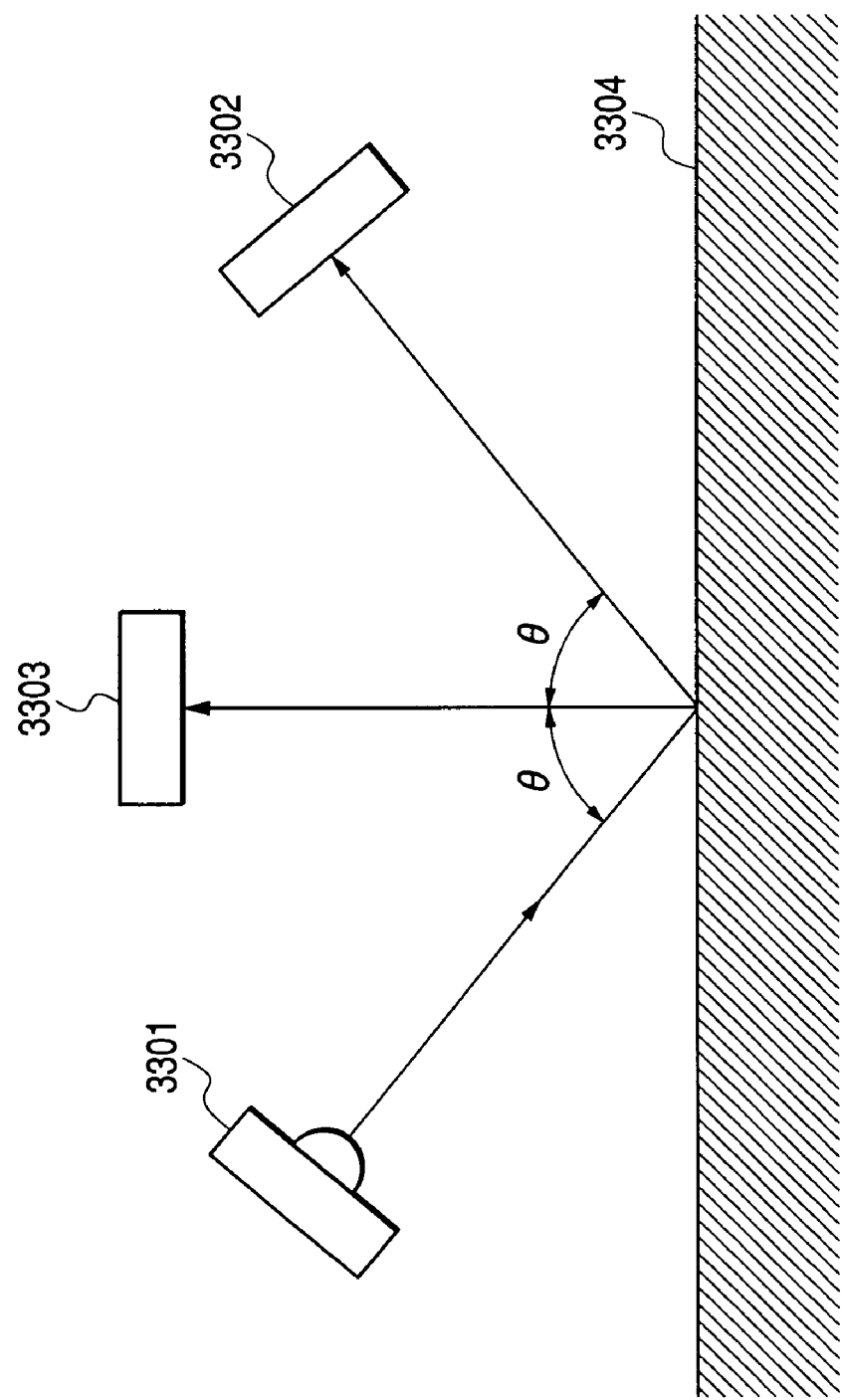
FIG. 33 is a view that schematically shows a sensor structure in accordance with the conventional embodiment.
Figure 34:
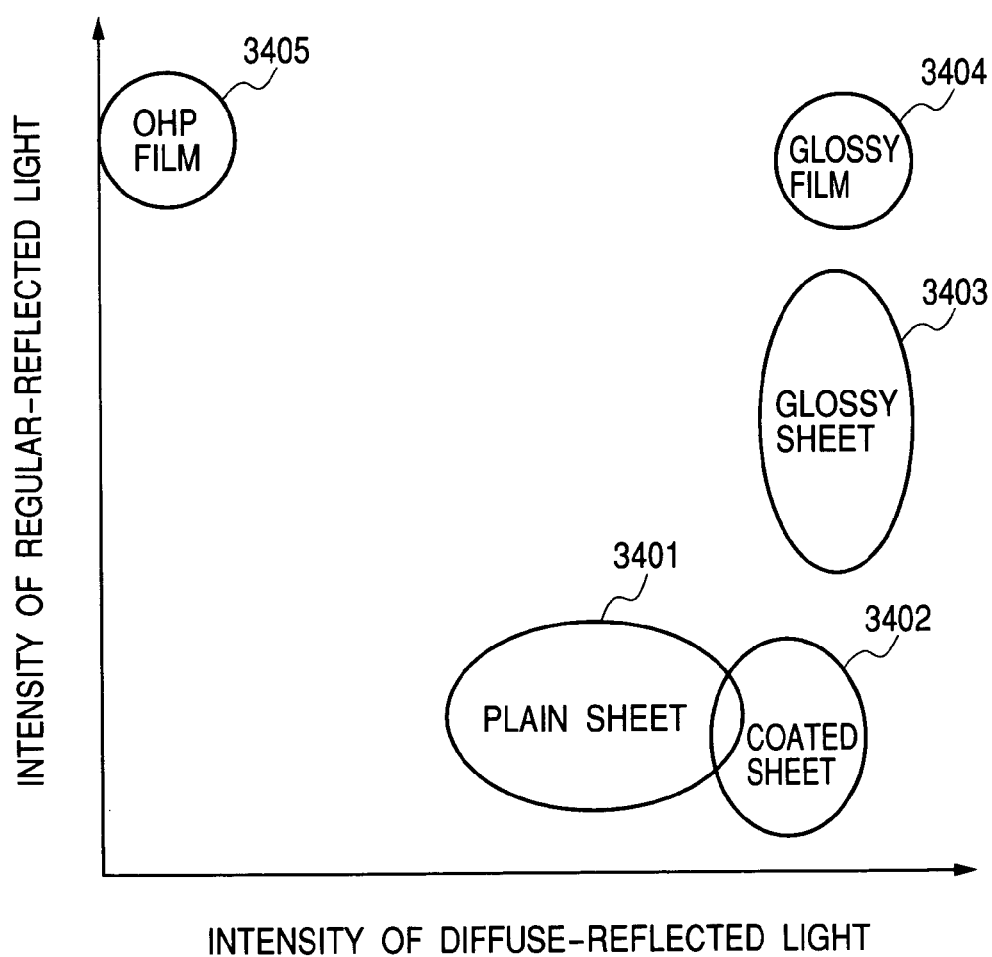
FIG. 34 is a view that shows the relations between each kind of recording medium, the regularly reflected light, and the diffused reflection light in accordance with the conventional embodiment.

FIG. 30 is a view that shows the conversion from two-dimensional image information to one-dimensional image information.

It is conceivable that N numbers of the one-dimensional linear image information, the length of which is L as shown in FIG. 30 are collected to form the two-dimensional image information. The total pixel number in this case is L×N. Now, data (image information) of each line is given as Data 1, Data 2, . . . . Then, the line data Data 1, Data 2, . . . are serially connected and converted into the one-dimensional image information. At this juncture, the line data of L×N length is generated, which becomes the one-dimensional image information.

Here, the conversion form the two-dimensional image information into the one-dimensional image information is represented schematically, but it may be possible to process each line data when the actual processing is carried out, and then, the resultant integration thereof may be used as parameter for discriminating the kind of recording medium. For example, with respect to the first line Data 1, binarizing process is given, and the number of inversions is worked out from the binary image obtained from the result of such binarization. Likewise, with respect to the second Data 2, process is also given, and thereafter, the process is repeated. Lastly, the number of inversions obtained from the result of each process executed for each line is added up to the processed line numbers accordingly. The total sum of the inversion numbers thus obtained may be used as the parameter for discriminating the kind of recording medium.

In general, the average level, arithmetic mean value, or the brightness at the peak, which is obtained from all the pixels of L×N is used as the threshold value for binarizing process. However, in order to make the process lighter, it may be possible to arrange the structure so that the threshold value is worked out per line unit for the execution of binarizing process. Here, nevertheless, it is desirable to work out the brightness difference for the entire pixels in order to enhance the precision of the kind discrimination for recording medium.

For the embodiment described earlier, the two parameters, such as brightness difference and the number of inversions or the mean value (average level) and the number of run-length bits, are used, and by means of interrelations between them, the kind of recording medium are discriminated. It is also possible to combine three parameters or more, such as the mean value, the brightness difference, the number of inversion after the execution of binarizing process, the number of plus/minus signs inversions, and some others, which are referred to in the aforesaid embodiments, for the formation of the structure that makes it possible to implement the discrimination more minutely in higher precision.

Also, for the aforesaid embodiments, it may be possible to arrange the structure corresponding to a target recording medium to be discriminated as in the case of plain sheet and coated sheet for ink jet use being discriminated by means of parameters regarding the surface roughness or parameters regarding the surface configuration.

What is claimed is:

1. A method for discriminating recording medium for discriminating the kind thereof, comprising the steps of:
generating image information containing information corresponding to each of plural pixels included in a specific area on the surface of a recording medium as image information indicating the surface condition of the recording medium;
obtaining a first parameter regarding the surface roughness of the recording medium from the image information;
obtaining a second parameter regarding the surface configuration of the recording medium from the image information; and
discriminating the kind of the recording medium on the basis of the first parameter and the second parameter.

2. A method for discriminating recording medium according to claim 1, wherein the image information contains brightness information of each of the plural pixels, and the first parameter is obtainable from the brightness information, and relates to the magnitude of unevenness on the surface of the recording medium.

3. A method for discriminating recording medium according to claim 1, wherein the image information contains brightness information of each of the plural pixels, and the second parameter is obtainable corresponding to the changes in the brightness information along the arrangement of the plural continuous pixels, and relates to the cycle of unevenness on the surface of the recording medium.

4. A method for discriminating recording medium for discriminating the kind thereof, comprising the steps of:
generating image information composed by plural pixels coffesponding to a specific area on the surface of a recording medium, and containing brightness information corresponding to each of the plural pixels as image information indicating a surface condition of the recording medium;
obtaining a first parameter by statistical process in accordance with the brightness information;
obtaining a second parameter regarding changes in the brightness information along an arrangement of the plural continuous pixels; and
discriminating the kind of the recording medium on the basis of the first parameter and the second parameter.

5. A method for discriminating recording medium according to claim 4, wherein the first parameter is either one of a brightness difference between the maximum value and the minimum value of the brightness information, the mean value of the brightness information, and the brightness at the peak of a histogram prepared from the plural pixels.

6. A method for discriminating recording medium according to claim 5, wherein the mean value of the brightness information is either the arithmetic mean value of the maximum value and the minimum value of the brightness information or the arithmetic mean value of the respective brightness information of the plural pixels.

7. A method for discriminating recording medium according to claim 4, wherein the second parameter is obtainable on the basis of binary data prepared by binarizing the image information, being either one of the number of inversions of the values of adjacent pixels in the binary data, the run-length coded amount at the time of allocating codes to the binary data in accordance with the run-length coding, and the number of isolated pixels discriminated as isolated pixels on the basis of the values of adjacent pixels on both sides in accordance with the binary data.

8. A method for discriminating recording medium according to claim 7, wherein a threshold value used for the binarizing process is either the mean value of the brightness information or the brightness at the peak of a histogram prepared from the plural pixels.

9. A method for discriminating recording medium according to claim 4, wherein the second parameter is a number of changes of plus/minus signs of adjacent pixels.

10. A method for discriminating recording medium according to claim 4, wherein the discriminating process discriminates the kind of the recording medium by use of a table in which the first and second parameters and the kind of the recording medium are correlated.

11. A method for discriminating recording medium according to claim 4, wherein the discriminating process discriminates the kind of the recording medium on the basis of plural threshold values corresponding to the first parameter and the second parameter, respectively.

12. A method for discriminating recording medium according to claim 11, wherein the plural threshold values are values determined on the basis of the distributions the first parameter and the second parameter can exhibit per kind of the recording medium.

13. A method for discriminating recording medium according to claim 4, wherein a plain sheet and a coated sheet are discriminated on the basis of the first parameter and the second parameter.

14. A method for discriminating recording medium according to claim 13, the threshold value of the second parameter for discriminating a glossy film and a glossy sheet is greater than the threshold value of the second parameter for discriminating the glossy sheet and the coated sheet.

15. A method for discriminating recording medium according to claim 4, wherein the step of generating the image information obtains the image information by picking up an image regarding a specific area on the recording medium.

16. A method for discriminating recording medium according to claim 4, wherein the image information is either one-dimensional image information or two-dimensional image information.

17. A method for discriminating recording medium according to claim 16, wherein if the image information generated is two-dimensional image information, said step of generating the image information converts it into one-dimensional image information.

18. A method for discriminating recording medium for discriminating the kind thereof, comprising the steps of:

generating image information composed by plural pixels corresponding to a specific area on the surface of a recording medium as image information indicating a surface condition of the recording medium;

obtaining as a parameter the number of pixels at peak brightness in a histogram prepared by the plural pixels; and discriminating the kind of recording medium on the basis of the parameter.

19. A method for discriminating recording medium according to claim 18, further comprising the step of obtaining a second parameter related to the magnitude of the unevenness on the surface of the recording medium from the brightness information of each of the plural pixels, wherein the discriminating step discriminates the kind of recording medium on the basis of the parameter and the second parameter related to the magnitude of the unevenness of the surface of the recording medium.

20. A recording apparatus for recording on a recording medium conveyed by conveying means in accordance with recording data, comprising:

image information-generating means for generating image information composed by plural pixels corresponding to a specific area on the surface of the recording medium, and containing brightness information of each of the plural pixels as the image information indicating a surface condition of the recording medium conveyed by the conveying means; and discriminating means for discriminating the kind of the recording medium in accordance with a first parameter obtainable by statistical process on the basis of the brightness information, and a second parameter obtainable with respect to changes in the brightness information along an arrangement of the plural continuous pixels.

* * * * *

UNITED STATES PATENT AND TRADEMARK OFFICE
CERTIFICATE OF CORRECTION

PATENT NO. : 7,336,394 B2  
APPLICATION NO. : 10/614047  
DATED : February 26, 2008  
INVENTOR(S) : Tsujimoto It is certified that error appears in the above-identified patent and that said Letters Patent is hereby corrected as shown below:

ON THE TITLE PAGE:  
At Item (57), Abstract, Line 11, "affanged" should read --arranged--.

COLUMN 1:  
Line 28, "form" should read --from--.

COLUMN 2:  
Line 42, "been practiced to made" should read --been practice to make a--.

COLUMN 3:  
Line 15, "form" should read --from--.  
Line 23, "use" should read --uses--.

COLUMN 10:  
Line 40, "form" should read --from--.

COLUMN 11:  
Line 39, "FIG. 4,A." should read --FIG. 4A.--.

COLUMN 15:  
Line 11, "kind" should read --kind of--.

COLUMN 16:  
Line 36, "executed," should read --executed--.

COLUMN 17:  
Line 7, "tat" should read --that--.  
Line 35, "type ones" should read --types--.

COLUMN 18:  
Line 31, "executes" should read --execute--.

COLUMN 20:  
Line 20, "a" should read --an--.  
Line 57, "form" should read --from--.

COLUMN 24:  
Line 23, "plan" should read --plain--.

UNITED STATES PATENT AND TRADEMARK OFFICE
CERTIFICATE OF CORRECTION

PATENT NO. : 7,336,394 B2
APPLICATION NO. : 10/614047
DATED : February 26, 2008
INVENTOR(S) : Tsujimoto It is certified that error appears in the above-identified patent and that said Letters Patent is hereby corrected as shown below:

COLUMN 25:
Line 4, "material" should read --materialize--.
Line 9, "material" should read --materialize--.
Line 11, "plan" should read --plain--.
Line 41, "form" should read --from--.

COLUMN 26:
Line 57, "Pixel" should read --pixel--.

COLUMN 27:
Line 40, "in" should read --in Table 4.--.

COLUMN 28:
Line 37, "form" should read --from--.

COLUMN 31:
Line 44, "minis" should read --minus--.

COLUMN 32:
Line 5, "form" should read --from--.

COLUMN 33:
Line 29, "wide" should read --width--.
Line 33, "plan" should read --plain--.
Line 41, "wide" should read --width--.

COLUMN 34:
Line 34, "wide" should read --width--.
Line 54, "plan" should read --plain--.
Line 57, "plane" should read --plain--.
Line 65, "pixels" should read --pixels is--.

COLUMN 35:
Line 27, "the indicate" should read --that indicate--.

COLUMN 36:
Line 26, "form" should read --from--.
Line 32, "also the" should be deleted.
Line 43, "may" should be deleted.

UNITED STATES PATENT AND TRADEMARK OFFICE
CERTIFICATE OF CORRECTION

PATENT NO.        : 7,336,394 B2
APPLICATION NO.   : 10/614047
DATED             : February 26, 2008
INVENTOR(S)       : Tsujimoto It is certified that error appears in the above-identified patent and that said Letters Patent is hereby corrected as shown below:

COLUMN 37:
Line 31, "form" should read --from--.
Line 56, "kind" should read --kind of--.

COLUMN 38:
Line 42, "coffesponding" should read --corresponding--.

Signed and Sealed this

Third Day of February, 2009

JOHN DOLL
*Acting Director of the United States Patent and Trademark Office*